US006118821A

United States Patent [19]

Matsumoto et al.

[11] Patent Number: 6,118,821

[45] Date of Patent: Sep. 12, 2000

[54] COMPRESSED CODE DECODING DEVICE AND AUDIO DECODING DEVICE

[75] Inventors: Masaharu Matsumoto; Takashi Katayama, both of Katano; Masahiro Sueyoshi; Shuji Miyasaka, both of Neyagawa; Takeshi Fujita, Takatsuki; Akihisa Kawamura, Hirakata; Tsukuru Ishito, Kyoto; Eiji Otomura, Ibaraki; Tsuyoshi Nakamura, Fukuoka-ken, all of Japan

[73] Assignee: Matsushita Electric Industrial Co., Ltd., Osaka, Japan

[21] Appl. No.: 09/080,133

[22] Filed: May 15, 1998

[30] Foreign Application Priority Data

May 15, 1997 [JP] Japan .................................... 9-125425
May 15, 1997 [JP] Japan .................................... 9-125426
Jan. 16, 1998 [JP] Japan .................................... 10-006599

[51] Int. Cl.[7] ........................................ H04N 7/12

[52] U.S. Cl. .......................... 375/240; 348/398; 348/423; 348/403

[58] Field of Search .................................... 348/398, 391, 348/423, 462, 403, 465, 845.1, 845.3, 416

[56] References Cited

U.S. PATENT DOCUMENTS 5,121,202 6/1992 Tanoi ...................................... 348/416
5,815,634 9/1998 Daum et al. ............................ 348/423
5,930,526 7/1999 Iverson .................................... 348/391

FOREIGN PATENT DOCUMENTS 0 648 056 4/1995 European Pat. Off. .
0 663 735 7/1995 European Pat. Off. .
0 716 547 6/1996 European Pat. Off. .
195 47 117 2/1997 Germany .
6-275053 9/1994 Japan .
2 181 325 4/1987 United Kingdom .
WO 93/19542 9/1993 WIPO .
WO 96/10889 4/1996 WIPO .
WO 96/19078 6/1996 WIPO .

OTHER PUBLICATIONS

European Search Report dated Oct. 14, 1999 EP 98 10 8809.

*Primary Examiner*—Chris S. Kelley
*Assistant Examiner*—Allen Wong
*Attorney, Agent, or Firm*—Ratner & Prestia

[57] ABSTRACT

A compressed code decoding device of the present invention includes: a decoding section for receiving a plurality of groups of blocks of compressed codes and decoding each of the blocks of compressed codes; a buffer section for storing decoded signals decoded by the decoding section; a reproduction time acquisition section for acquiring a reproduction time at which to reproduce a predetermined one of the blocks; an output section for externally outputting the decoded signals stored in the buffer section; a detection section for detecting that the predetermined block of compressed codes has been decoded and output via the output section; an addition section for, at a time when the detection section detects that the predetermined block has been output, adding a time required for reproducing the predetermined block to the reproduction time acquired by the reproduction time acquisition section so as to produce a synchronization time; a synchronization section for comparing the synchronization time produced by the addition section and a current time so as to determine whether the synchronization time is ahead of or behind the current time; a code discarding section for, if the synchronization section determines that the synchronization time is ahead of the current time, discarding either compressed codes of one of the blocks next to the predetermined block or compressed codes of one of the groups next to the group including the predetermined block; and a reproduction delay section for, if the synchronization section determines that the synchronization time is behind the current time, delaying output of either decoded signals of the compressed codes of one of the blocks next to the predetermined block or decoded signals of the compressed codes of one of the groups next to the group including the predetermined block.

8 Claims, 45 Drawing Sheets

FIG. 12

| Virtual address (hexadecimal) | Actual address (hexadecimal) |
|---|---|
| 0x000 ~ 0x0ff | 0x000 ~ 0x0ff |
| 0x100 ~ 0x1ff | 0x100 ~ 0x1ff |
| 0x200 ~ 0x2ff | 0x200 ~ 0x2ff |
| 0x300 ~ 0x3ff | 0x300 ~ 0x3ff |
| 0x400 ~ 0x4ff | 0x400 ~ 0x4ff |
| 0x500 ~ 0x5ff | 0x500 ~ 0x5ff |
| 0x600 ~ 0x6ff | 0x600 ~ 0x6ff |
| 0x700 ~ 0x7ff | 0x700 ~ 0x7ff |
| 0x800 ~ 0x8ff | 0x800 ~ 0x8ff |
| 0x900 ~ 0x9ff | 0x900 ~ 0x9ff |
| 0xa00 ~ 0xaff | 0xa00 ~ 0xaff |
| 0xb00 ~ 0xbff | 0xb00 ~ 0xbff |
| 0xc00 ~ 0xcff | 0x400 ~ 0x4ff |
| 0xd00 ~ 0xdff | 0x500 ~ 0x5ff |
| 0xe00 ~ 0xeff | 0x600 ~ 0x6ff |
| 0xf00 ~ 0xfff | 0x700 ~ 0x7ff |

Transfer chart 6

Transfer chart 2

Transfer chart 4

PRIOR ART

COMPRESSED CODE DECODING DEVICE AND AUDIO DECODING DEVICE

BACKGROUND OF THE INVENTION

1. Field of the Invention

The present invention relates to a compressed code decoding device used in AV (audio visual) equipment for decoding and reproducing compressed video signals and audio signals in synchronization with each other. The present invention also relates to an audio signal decoding device for decoding encoded audio data in multiple channels based on a standard such as MPEG 2 so as to obtain a decoded audio signal.

2. Description of the Related Art

In the field of video and audio equipment, CD players and VTRs have become widespread in recent years, and thus there is an increasing demand for large screen display and reproduction of realistic images and sounds for enjoying musics and films at home. In an attempt to satisfy such a demand, media containing video and audio signals have been developed such as DVDs. Meanwhile, methods for compressing signals to be stored on such media have been developed in order to store a large amount of video and audio signals on a single medium. For example, known methods for compressing audio signals include MPEG Audio and Dolby® AC-3.

In order to obtain such compressed codes, an audio signal is divided into "blocks" each of a certain length of time, and the signal is compressed by blocks. Then, a certain number of the blocks are grouped together to form another unit called a "frame". Each frame is provided with additional data for distinguishing the frame from others in the decoding process. The decoding device typically performs a decoding process by frames.

Moreover, a number of frames are grouped together to form a "packet". Each packet contains time data for each of the frames in the packet indicating when to reproduce the decoded signal of the first block in the frame. The decoding device externally outputs a decoded signal, obtained by decoding a compressed signal of the block, in accordance with the time data. The time data is used mainly for reproducing video and audio signals in synchronization with each other.

Hereinafter, a conventional device for decoding compressed codes will be described with reference to the accompanying figures. FIG. 44 is a block diagram illustrating an exemplary configuration of a conventional device for decoding compressed codes.

In FIG. 44, a decoding circuit 402 receives and decodes compressed audio codes which are input by frames via an input terminal 401. An output buffer 403 temporarily stores the decoded audio signals. An output circuit 404 externally outputs the audio signals stored in the output buffer 403.

In such a configuration, compressed codes are first input by frames to the input terminal 401. The codes are input by frames because frames are made distinguishable from one another as described above. The codes contained in a frame is decoded by the decoding circuit 402 using a decoding method in conformity with the used compression method so as to form an audio signal. The audio signal is temporarily stored in the output buffer 403. When decoding of one frame is completed, the audio signals are externally output via the output circuit 404. At this point of time, the next frame of codes is input to the input terminal 401, decoded by the decoding circuit 402, and then written in the output buffer 403. Such a process is repeated for decoding the compressed codes.

However, the conventional device does not reproduce the audio signals in synchronization with other signals such as video signals and timer signals which serve as reference time for reproduction, but merely outputs the audio signals at a separate timing. There is also a problem that a storage capacity as large as one frame is required for the output buffer.

Moreover, in order to perform calculations for decoding coded signals, a memory capable of high-speed access is needed as a memory for temporarily storing coded signals to be calculated. Such type of memory is expensive, and there has been a strong demand for reducing the required storage capacity for the memory.

The necessity for such a high-speed access memory will be described in detail in connection with MPEG2, for example.

In accordance with the MPEG audio algorithm, the coding device divides an audio signal before band compression into 32 bands of sub-band signals by using a sub-band analysis filter bank. The division into the sub-band signals is performed by, for example, a 512-tap polyphase filter (PFB), in the following steps (1)–(3):

(1) perform the following calculation for 512 samples of input signal, X0 . . . X511:

$$Zi=Ci\times Xi \qquad (1);$$

(2) calculate periodic addition signals Yi based on the following expression (2):

$$Y_i = \sum_{j=0}^{7} Z_{64j+i}; \text{ and} \qquad (2)$$

(3) calculate sub-band samples Si based on the following expression (3):

$$S_i = \sum_{k=0}^{63} Y_k \cdot \cos(2i+1)(k-16)\pi/64. \qquad (3)$$

The sub-band samples Si are referred to as sub-band signals.

Moreover, at the decoding device, each time 32 sub-band samples are inverse-quantized for each channel, the 32 audio samples Si are processed by the synthesis filter bank in the following steps based on the following expressions (4)–(7):

(4) calculate Vi by frequency-shifting the 32 sub-band samples Si based on the following expression (4):

$$V_i = \sum_{k=0}^{31} S_k \cdot \cos(2i+1)(i+16)\pi/64; \qquad (4)$$

(5) obtain the series Ui of 512 samples by switching the order of Vi base on the following expression (5):

$$U64i+j=V128i+j \quad U64i+32+j=V128i+96+j \qquad (5);$$

(6) calculate Wi by multiplying the series Ui of the samples by the impulse response based on the following expression (6):

$$Wi=Ui\times Di \qquad (6); \text{ and}$$

(7) obtain output signals Sj by periodic addition as in the following expression (7):

$$S_j = \sum_{i=0}^{15} W_{32i+j}. \tag{7}$$

In the above calculation process, the data Vi and Ui are referred to as sub-band synthesis filter data while the output signal Sj is referred to as PCM data.

The decoding process based on the expressions (4)–(7) is performed by a conventional decoding device 500 as illustrated in FIG. 45.

The decoding device 500 includes a memory section 510 and an operation section 520. The operation section 520 includes a sub-band signal generation section 521 and a sub-band synthesis section 522, and decodes n channels of input coded signals into respective sub-band signals and performs sub-band synthesis filter operation for the sub-band signals for each channel so as to generate and output audio signals. The memory section 510 is formed of a high-speed access memory such as an SRAM and includes memory areas 511 to 514 for storing the sub-band synthesis filter data and a memory area 515 for storing the sub-band signals.

The decoding device having such a configuration operates as follows. When the coded signals are first input to the operation section 520, the sub-band signal generation section 521 decodes the coded signals into sub-band signals and temporarily stores the sub-band signals in the memory area 515. Then, the sub-band synthesis section 522 reads the sub-band signals from the memory area 515 and performs sub-band synthesis filter operation for the sub-band signals, so as to generate and output audio signals.

The sub-band synthesis filter data in the memory areas 511 to 514 is partially updated by the sub-band synthesis filter data generated from the sub-band signals in the memory area 515. Accordingly, the operation section 520 needs to read the sub-band synthesis filter data from the memory section 510 when performing the sub-band synthesis filter operation and write again the sub-band synthesis filter data to the memory section 510 after the operation.

The memory section 510 needs to be a memory capable of high-speed access. In the case where the decoding device 500 corresponds to multiple channels, e.g., four channels, the memory section 510 needs to have four memory areas 511 to 514 so as to store sub-band synthesis filter data for the four channels.

A high-speed access memory such as an SRAM used for the memory section 510 needs to have a sufficiently large memory capacity to retain the sub-band synthesis filter data for at least four channels, for example, in order to perform real-time reproduction of four-channel data. Such a memory, which is generally expensive, significantly increases the cost of the audio decoding devices.

SUMMARY OF THE INVENTION

According to one aspect of this invention, a compressed code decoding device includes: a decoding section for receiving a plurality of groups of blocks of compressed codes and decoding each of the blocks of compressed codes; a buffer section for storing decoded signals decoded by the decoding section; a reproduction time acquisition section for acquiring a reproduction time at which to reproduce a predetermined one of the blocks; an output section for externally outputting the decoded signals stored in the buffer section; a detection section for detecting that the predetermined block of compressed codes has been decoded and output via the output section; an addition section for, at a time when the detection section detects that the predetermined block has been output, adding a time required for reproducing the predetermined block to the reproduction time acquired by the reproduction time acquisition section so as to produce a synchronization time; a synchronization section for comparing the synchronization time produced by the addition section and a current time so as to determine whether the synchronization time is ahead of or behind the current time; a code discarding section for, if the synchronization section determines that the synchronization time is ahead of the current time, discarding either compressed codes of one of the blocks next to the predetermined block or compressed codes of one of the groups next to the group including the predetermined block; and a reproduction delay section for, if the synchronization section determines that the synchronization time is behind the current time, delaying output of either decoded signals of the compressed codes of one of the blocks next to the predetermined block or decoded signals of the compressed codes of one of the groups next to the group including the predetermined block.

In one embodiment of the invention, the synchronization section includes a timer for timing a clock and compares the synchronization time with an output from the timer as the current time.

In another embodiment of the invention, the synchronization section compares the synchronization time with a video reproduction time as the current time, the video reproduction time being provided to a video signal which is reproduced in synchronization with the decoded signal.

In still another embodiment of the invention, the synchronization section compares the synchronization time with a reference reproduction time as the current time, the reference reproduction time being provided to a code other than the decoded signal.

In still another embodiment of the invention, the synchronization section compares the synchronization time with the current time by determining whether the synchronization time is ahead of or behind the current time based on whether a value obtained by subtracting the current time from the synchronization time is greater than a predetermined threshold value.

According to another aspect of this invention, a compressed code decoding device includes: a decoding section for receiving a plurality of groups of blocks of compressed codes and decoding each of the blocks of compressed codes; a buffer section for storing decoded signals decoded by the decoding section; a reproduction time acquisition section for acquiring a reproduction time at which to reproduce a predetermined one of the blocks; an output section for externally outputting the decoded signals stored in the buffer section; a detection section for detecting that the predetermined block of compressed codes has been decoded and output via the output section; a time setting section for externally setting a start time and a finish time of a gap provided between two outputs of decoded signals; an addition section for, at a time when the detection section detects that the predetermined block has been output, adding a time required for reproducing the predetermined block to the reproduction time acquired by the reproduction time acquisition section so as to produce a first synchronization time; a time detection section for determining whether the start time set by the time setting section is between the first synchronization time produced by the addition section and a second synchronization time, the second synchronization time being obtained by adding a time required for reproducing one block of compressed codes to the first synchronization time; a gap-based reproduction delay section for delaying, if the start time is between the first synchronization time and the second synchronization time, until the finish time of the gap, output of either the compressed codes of the predetermined block or the compressed codes of one of the groups including the predetermined block.

According to still another aspect of this invention, a compressed code decoding device includes: a decoding section for receiving a plurality of groups of blocks of compressed codes and decoding each of the blocks of compressed codes; first and second memory sections for alternately storing blocks of the decoded signals from the decoding section; an output section for externally outputting the decoded signals stored in the first and second memory sections; a block detection section for detecting that each of the blocks of compressed codes has been decoded and externally output via the output section; a state section for indicating whether a decoded signal being currently output by the output section is from the first memory section or from the second memory section; a write control section for, at a time when the output of each of the blocks is detected by the block detection section, controlling a write operation of the block so that the block is written to one of the first memory section and the second memory section which is not indicated by the state section and alternately switching between read and write operations of the first and second memory sections.

In one embodiment of the invention, the write control section controls the write operation so that the decoded signals from a first and second ones of the blocks are respectively written to the first and second memory sections, while the decoded signals from a third one of the blocks are written to one of the first memory section and the second memory section which is not indicated by the state section.

According to still another aspect of this invention, an audio decoding device for decoding $N_A$ (where $NA_A>1$) channels of audio signals by a sub-band synthesis operation using sub-band synthesis filter data and sub-band signal data is provided. The device includes: a first memory section for storing $M_A$ (where $M_A<N_A$) channels of the sub-band synthesis filter data and the sub-band signal data used for the sub-band synthesis operation; a second memory section for storing at least some of $N_A$ channels of sub-band signal data and $N_A$ channels of sub-band synthesis filter data; an operation section for receiving encoded audio data and decoding the encoded audio data into sub-band signal data, performing a sub-band synthesis filter operation using the data stored in the first memory section so as to output $M_A$ channels of decoded audio data, and requesting to switch positions of new sub-band synthesis filter data calculated by the sub-band synthesis filter operation and next sub-band synthesis filter data required; and a data transfer section for, based on the request from the operation section, switching, by $M_A$ channels, the sub-band synthesis filter data and the sub-band signal data in the first memory section and the second memory section.

In one embodiment of the invention, the first memory section includes a first memory area for storing a channel of sub-band synthesis filter data and sub-band signal data and a second memory area for storing another channel of sub-band synthesis filter data and sub-band signal data. The operation section transfers a j'th channel of data stored in the second memory section to the second memory area in the first memory section when performing a sub-band synthesis filter operation for an i'th channel (where: i=1 to $N_A$; j=1 to $N_A$; and j≠i) using the data stored in the first memory area in the first memory section, while transferring a k'th channel of data stored in the second memory section to the first memory area in the first memory section when performing a sub-band synthesis filter operation for a j'th channel (where: k=1 to $N_A$; k≠i; and k≠j) using the data stored in the second memory area in the first memory section, thereby performing in parallel a data transfer operation and a sub-band synthesis filter operation.

In another embodiment of the invention, the operation section includes a continuous transfer instruction section for instructing, when instructing a data transfer operation between the first memory section and the second memory section, a plurality of data transfer operations with a single issuance of instruction.

In still another embodiment of the invention, the operation section includes a virtual address allocation section for providing virtual addresses following an actual address at a termination point of the memory area in the first memory section which stores the sub-band synthesis filter data, allocating a start point of the virtual addresses to a predetermined actual address in the memory area, and sequentially allocating other ones of the virtual addresses to actual addresses.

In still another embodiment of the invention, the first memory section includes, in addition to the first memory area and the second memory area, a third memory area for storing data not limited to use with the sub-band synthesis operation. The operation section includes a sub-band signal transfer section for, when a number of channels of input encoded audio data is three or greater, copying or transferring at least some of the sub-band signals for a particular channel stored in the first memory section to a particular area in the first memory section.

In still another embodiment of the invention, the operation section includes a sub-band signal addition/subtraction section for performing addition and subtraction of the sub-band signals, in parallel with a transfer operation for the sub-band synthesis filter data from the second memory section to the first memory section after the encoded audio data has been input and decoded into sub-band signal data.

In still another embodiment of the invention, the operation section includes an interleave section for taking samples of decoded data decoded by the sub-band synthesis operation, one sample from each of the channels, and rearranging the samples in a predetermined order, in parallel with a transfer operation for the sub-band synthesis filter data from the first memory section to the second memory section after a sub-band synthesis operation for a final channel has been completed.

In still another embodiment of the invention, the interleave section includes an interleave division section for dividing an interleave operation into r steps (where $r \geqq 2$).

In still another embodiment of the invention, the interleave section includes an interleave storage area selection section for selecting a data storage area in the first memory section to be used for an interleave operation depending on whether a number of channels to be decoded by the sub-band synthesis operation is even or odd.

In still another embodiment of the invention, the continuous transfer instruction section includes a specific data transfer completion detection indication section for indicating detected completion of a p'th transfer operation out of q (where: q>1; and $1 \leqq p<q$) data transfer operations performed between the first memory section and the second memory section.

In still another embodiment of the invention, the data transfer section includes a specific data transfer completion detection transmission section for detecting completion of a p'th transfer operation out of q data transfer operations performed between the first memory section and the second memory section as instructed by the continuous transfer instruction section and for transmitting to the operation section the detected completion of the p'th transfer operation.

In still another embodiment of the invention, the operation section includes a specific data transfer completion detection section for detecting completion of a p'th transfer operation out of q data transfer operations performed between the first memory section and the second memory section as instructed by the continuous transfer instruction section. The operation section performs an s'th one of the r (where: r≧2; and 2≧s≧r) steps of the interleave operation after the specific data transfer completion detection section detects completion of a data transfer operation for a specific area.

In still another embodiment of the invention, the continuous transfer instruction section includes a PCM data transfer instruction section for instructing a transfer operation of at least one channel of decoded PCM data between the first memory section and the second memory section when a number of channels of input decoded data decoded by the sub-band synthesis operation is t (where t≧3). The PCM data transfer instruction section temporarily transfers PCM data, for which the sub-band synthesis operation has been performed, from the first memory section to the second memory section and re-transfers PCM data which has been transferred to the second memory section to the first memory section in parallel with a sub-band synthesis operation for a final channel.

In still another embodiment of the invention, the continuous transfer instruction section includes a PCM data storage area selection section for selecting a storage area in the first memory section to be used for a transfer operation of PCM data from the second memory section to the first memory section performed in parallel with a sub-band synthesis operation for a final channel depending on whether a number of channels of input decoded data decoded by the sub-band synthesis operation is even or odd.

In still another embodiment of the invention, the operation section includes a division decoding section for dividing decoding processes from sub-band signal generation to output signal generation, or decoding processes from sub-band synthesis to output signal generation, so as to equally divide a number of audio output signal samples per frame into y blocks. Herein, a=bxcxy, where a denotes the number of audio output signal samples per frame for each channel of encoded audio signals, b denotes a number of sub-bands of the encoded audio signals, and c denotes a number of samples to be generated while processing one block.

According to still another aspect of this invention, an audio decoding device for decoding $N_A$ (where $N_A>1$) channels of audio signals by a sub-band synthesis operation using sub-band synthesis filter data and sub-band signal data is provided. The device includes: a first memory section for storing at least one channel of the sub-band synthesis filter data and the sub-band signal data used for the sub-band synthesis operation; a second memory section for storing sub-band signal data and $N_A$ channels of sub-band synthesis filter data; an operation section for receiving encoded audio data and decoding the encoded audio data into sub-band signal data, performing a sub-band synthesis filter operation using the data stored in the first memory section so as to output one channel of decoded audio data, and requesting to switch positions of new sub-band synthesis filter data calculated by the sub-band synthesis filter operation and next sub-band synthesis filter data required; and a data transfer section for, based on the request from the operation section, switching, by one channel, the sub-band synthesis filter data and the sub-band signal data in the first memory section and the second memory section.

Thus, the invention described herein makes possible the advantages of: (1) providing a compressed code decoding device for decoding and outputting compressed codes of audio signals in synchronization with timer and video signals by using a buffer of a relatively small memory capacity; and (2) providing an audio decoding device with improved capability of processing audio signals of a band division coding system by using both a high-speed access memory and a memory whose access speed is relatively low (e.g., a DRAM) for a memory section, thereby minimizing the cost of the memory used for decoding coded signals.

These and other advantages of the present invention will become apparent to those skilled in the art upon reading and understanding the following detailed description with reference to the accompanying figures.

BRIEF DESCRIPTION OF THE DRAWINGS

FIG. 12 is a diagram illustrating correspondence between virtual address areas and actual address areas.

DESCRIPTION OF THE PREFERRED EMBODIMENTS

Examples 1–3 described hereinafter each provide a compressed code decoding device which realizes the advantage (1) of providing a compressed code decoding device for decoding and outputting compressed codes of audio signals in synchronization with timer and video signals by using a buffer of a relatively small memory capacity.

Examples 4–6 each provide an audio decoding device which realizes the advantage (2) of providing an audio decoding device with improved capability of processing audio signals of a band division coding system by using both a high-speed access memory and a memory whose access speed is relatively low (e.g., a DRAM) for a memory section, thereby minimizing the cost of the memory used for decoding coded signals.

EXAMPLE 1

Figure 1:
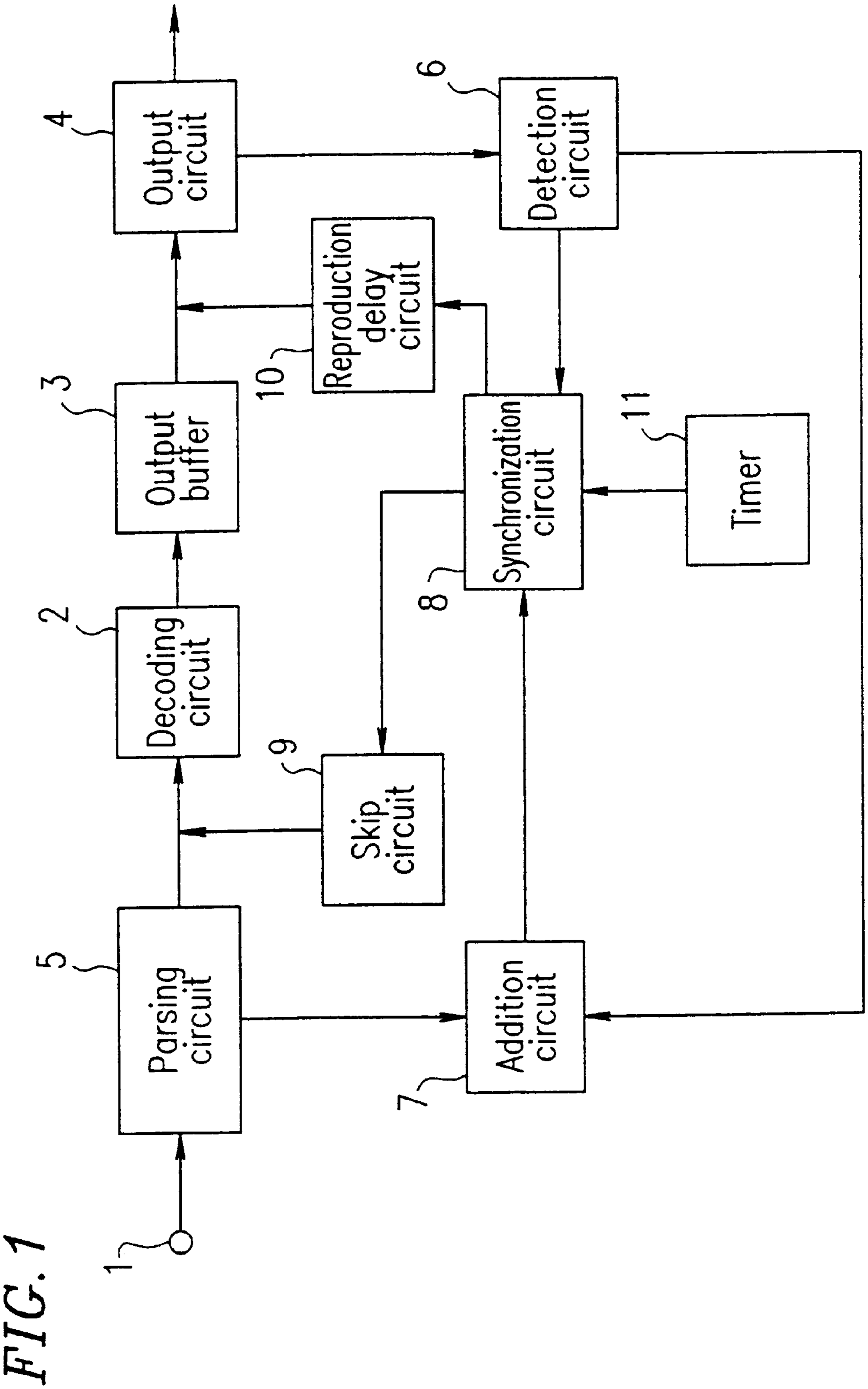
FIG. 1 is a block diagram illustrating a compressed code decoding device according to Example 1 of the present invention.
Figure 2:
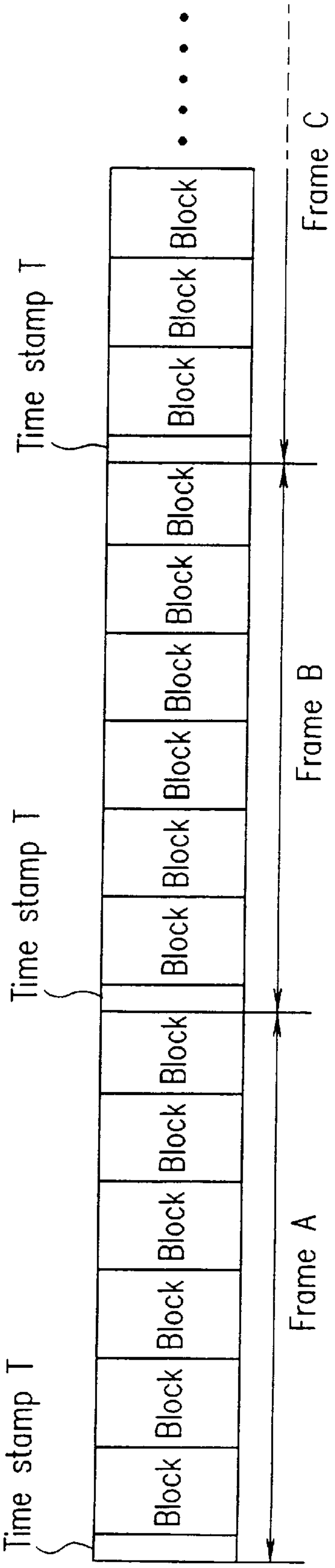
FIG. 2 is a diagram illustrating a configuration of data input to the device illustrated in FIG. 1.

Hereinafter, Example 1 of the present invention will be described with reference to the accompanying figures. FIG. 1 is a block diagram illustrating a configuration of the compressed code decoding device according to Example 1 of the present invention. FIG. 2 is a diagram illustrating an exemplary configuration of grouped compressed audio codes input to the compressed code decoding device illustrated in FIG. 1.

As is apparent from FIG. 2, the compressed audio codes are grouped in blocks. The blocks are further grouped in frames, e.g., frames A, B, C, . . . . Each frame includes a time stamp T indicating a reproduction time at the beginning of the frame, followed by compressed codes for the frame. The time stamp T indicates a reproduction time when to decode a first block of compressed codes in the frame so as to reproduce audio signals.

A plurality of frames of compressed codes form a packet, and the compressed codes are transferred by packets. Thus, blocks of compressed codes are grouped in frames and packets.

Frames as illustrated in FIG. 2 are input to the compressed code decoding device illustrated in FIG. 1 via an input terminal 1. A parsing circuit 5, for each input frame, reads the time stamp T at the beginning thereof, thereby obtaining the reproduction time T0. Thus, the parsing circuit 5 acquires the time when the first block of coded signals in the first frame is output.

A decoding circuit 2 decodes each block of compressed codes in the frame so as to output audio signals. An output buffer 3 temporarily stores at least two blocks of audio signals. An output circuit 4 externally outputs the audio signals read out from the output buffer 3.

A detection circuit 6 detects that all of the audio signals corresponding to the first block of the current frame have been externally output via the output circuit 4. An addition circuit 7, in response to the detection output from the detection circuit 6, calculates the time interval from when the first block is input until the audio signals corresponding to the first block have been completely output, i.e., time a required for reproducing the audio signals of the first block, and then adds the time a to the reproduction time T0 obtained by the parsing circuit 5, thereby obtaining the synchronization time (T0+α). A timer 11 times the clock and outputs the current time R1.

A synchronization circuit 8 compares between the synchronization time (T0+α) obtained by the addition circuit 7 and the current time R1 timed by the timer 11, and determines that the reproduction of audio signals is behind the schedule if the synchronization time (T0+α) is greater than the current time R1, while it determines that the reproduction is ahead of schedule if the synchronization time (T0+α) is less than the current time R1.

That is, the timer 11 and the synchronization circuit 8 are used for comparison between the synchronization time (T0+α) and the current time R1 so as to determine whether the synchronization time (T0+α) is ahead of the current time R1.

A skip circuit 9 discards the next frame of compressed codes when the synchronization circuit 8 indicates "behind" (i.e., T0+α<R1) while it does nothing when the synchronization circuit 8 indicates "ahead" (i.e., T0+α>R1). A reproduction delay circuit 10, when the synchronization circuit 8 outputs "ahead" (i.e., T0+α>R1), delays the time when the second next block of audio signals is output via the output circuit 4 by the amount of time the synchronization time (T0+α) is ahead of the current time R1. This adjustment of time is performed by the reproduction delay circuit 10 controlling the output time of the output buffer 3.

Next, the operation of the compressed code decoding device according to the present example will be described in more detail.

First, a stream of packets of codes is input via the input terminal 1. Each packet includes a plurality of frames, while each frame includes a plurality of blocks.

The parsing circuit 5 extracts the header information of the first frame and obtains the reproduction time T0 therefrom at which to output the audio signals corresponding to the first block. Moreover, the decoding circuit 2 receives from the parsing circuit 5 blocks of compressed codes in the first frame, and decodes the compressed codes by blocks so as to output audio signals.

The first block of audio signals decoded by the decoding circuit 2 is temporarily stored in the output buffer 3. When all of the audio signals in the single block have been ready, the block of audio signals is externally output via the output circuit 4. When the output circuit 4 begins to output the first block of audio signals, the second block of audio signals in turn begins to be written in the output buffer 3. Then, successively after the first block of audio signals has been completely output, the second block of audio signals is output.

The addition circuit 7, in response to the detection output from the detection circuit 6, calculates the time α required for reproducing and outputting the first block of audio signals, and then adds the output time α of the first block to the time T0 obtained by the parsing circuit 5, thereby obtaining the synchronization time (T0+α). The synchronization circuit 8 obtains the difference between the synchronization time (T0+α) and the time R1 from the timer 11, and determines whether the difference (T0+α)−R1 is greater than the predetermined value TH.

When the difference (T0+α)−R1 is greater than the predetermined value TH, and thus the following expression (8):

$$(T0+\alpha)-R1>TH \tag{8}$$

is satisfied, the synchronization time (T0+α) is determined to be ahead of the current time R1.

When the difference (T0+α)−R1 is less than the predetermined value TH, and thus the following expression (9):

$$(T0+\alpha)-R1<TH \tag{9}$$

is satisfied, the synchronization time (T0+α) is determined to be behind the current time R1.

When the determination result of the synchronization circuit 8 satisfies the above expression (8), the skip circuit 9 discards the second frame of compressed codes when it is input from the parsing circuit 5 to the decoding circuit 2. The skip circuit 9 does nothing when the above expression (9) is satisfied.

Moreover, when the determination result of the synchronization circuit 8 satisfies the above expression (9), the reproduction delay circuit 10 outputs the third block of audio signals in the first frame at a time delayed by the amount of delay (i.e., the difference (T0+α)−R1). The reproduction delay circuit 10 does nothing when the above expression (8) is satisfied.

The above-described control allows for audio signals to be output in accordance with the reproduction time provided to the frame. By providing a decoding device for decoding compressed video codes with a configuration as that of the compressed code decoding device of the present example, audio and video codes can be reproduced by the respective devices in synchronization with each other. In such a case, reproduction time data is provided to the video codes such that the video codes are in synchronization with the audio codes, while the video decoding device uses the same type of timer as the timer 11 or shares the timer 11.

According to the present example, only a capacity as large as two blocks is required for the output buffer 3, thereby allowing for reduction of the amount of data to be stored.

In the above example, the detection circuit 6 detects that the audio signals corresponding to the first block have been externally output. The block is not limited to the first block, but may be any other one of the blocks. However, note that the time α for the block which is added by the addition circuit 7 has to correspond to the number of the block.

In particular, when the number of blocks for which the completion of output is detected by the detection circuit 6 is n, the value of α which is added by the addition circuit 7 is as follows:

$$\alpha=(\text{output completion time for one block of audio signals})\times n.$$

Moreover, the reproduction time T0 read out by the parsing circuit 5 is the reproduction time for a frame which follows the current frame being decoded. Therefore, similar effects can be realized even when a negative value in accordance with the block number is taken for the time α for the block which is added by the addition circuit 7. Thus, when the number of blocks for which the completion of output is detected by the detection circuit 6 is n, the value of α which is added by the addition circuit 7 is as follows:

$$\alpha=-(\text{output completion time for one block of audio signals})\times(6-n).$$

EXAMPLE 2

Figure 3:
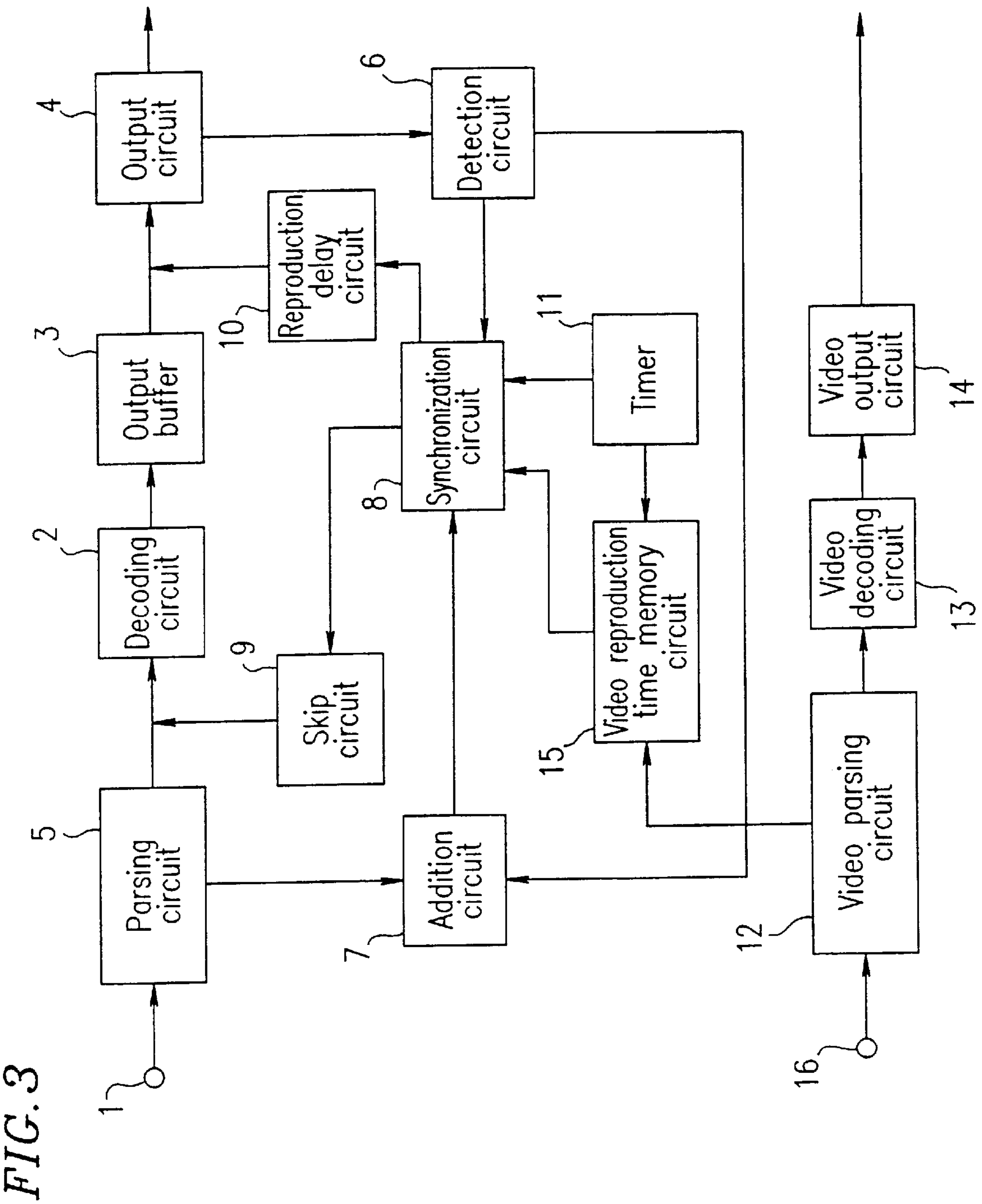
FIG. 3 is a block diagram illustrating a compressed code decoding device according to Example 2 of the present invention.

Hereinafter, a compressed code decoding device according to Example 2 of the present invention will be described with reference to the accompanying figures. FIG. 3 is a block diagram illustrating a configuration of the compressed code decoding device of Example 2.

Figure 4:
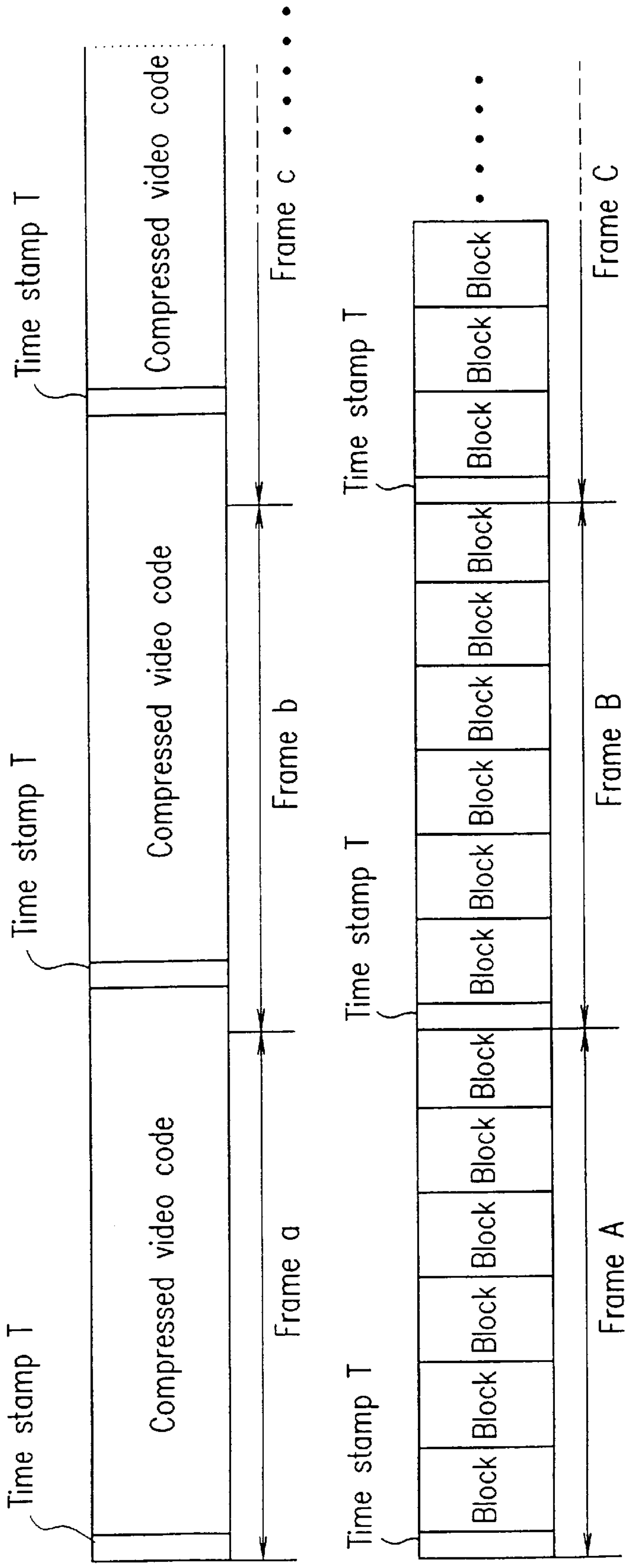
FIG. 4 is a diagram illustrating a configuration of data input to the device illustrated in FIG. 3.

FIG. 4 is a diagram illustrating an exemplary configuration of grouped compressed audio codes input to the compressed code decoding device illustrated in FIG. 3.

In the device of the present example, it is assumed that the compressed audio codes and the compressed video codes are transmitted in parallel, as illustrated in FIG. 4, and the respective reproduction times of the frames A, B, C, . . . , of compressed audio codes are synchronized with the respective reproduction times of the frames a, b, c, . . . , of compressed video codes.

As compared to the device of FIG. 1, the compressed code decoding device illustrated in FIG. 3 is additionally provided with a video parsing circuit 12, a video decoding circuit 13, a video output circuit 14, a video reproduction time memory circuit 15 and a video input terminal 16.

The elements such as the decoding circuit 2, the output buffer 3, the output circuit 4, the parsing circuit 5, the detection circuit 6, the addition circuit 7, the skip circuit 9, the reproduction delay circuit 10 and the timer 11 function as those in the device of FIG. 1.

The compressed video codes are decoded by the video decoding circuit 13 and externally output via the video output circuit 14.

As in the case of compressed audio codes, compressed video codes grouped in frames are input to the video parsing circuit 12, which obtains, from the beginning of each frame, the reproduction time V0 at which the video signals are reproduced. The video reproduction time memory circuit 15 obtains and stores the difference (V0−R1)between the video reproduction time V0 and the current time R1 from the timer 11. The video decoding circuit 13 receives and decodes the compressed video codes. The video output circuit 14 externally outputs the decoded video signals.

In such a configuration, the video parsing circuit 12 obtains the video reproduction time V0 for when the frame should be reproduced. The video reproduction time memory circuit 15 obtains and stores the difference (V0−R2)between the video reproduction time V0 and the time R2 from the timer 11.

When detection circuit 6 detects that the first block of audio signals has been completely output, the synchronization circuit 8 adds the time (V0−R2)stored in the video reproduction time memory circuit 15 to the time R1 from the timer 11, thereby obtaining the time TV (=V0−R2+R1), and further obtains the difference (T0+α)−TV between the time TV and the synchronization time (T0+α) obtained by the addition circuit 7.

Based on the above difference (T0+α)−TV, the synchronization circuit 8 determines whether the reproduction of the audio signals is ahead of or behind the schedule.

When the value (T0+α)−TV is greater than the predetermined value TH, and thus $$(T0+\alpha)-TV>TH \tag{10}$$

is satisfied, the synchronization time (T0+α) is determined to be ahead of the current time R1.

When the (T0+α)−TV is less than the predetermined value TH, and thus $$(T0+\alpha)-TV<TH \tag{11}$$

is satisfied, the synchronization time (T0+α) is determined to be behind the current time R1.

Note that it is assumed herein that the time required for the decoding of the compressed video codes by the video decoding circuit 13 is 0, while the video reproduction time V0 represents the time at which the video signal is output from the video output circuit 14.

In the present example, compressed video codes are input to the video input terminal 16. However, also when other compressed codes including a reference reproduction time, instead of the compressed video codes, is input along with the compressed audio codes, the present invention can be used to reproduce the compressed audio codes and the other compressed codes in synchronization with each other. The only difference would be the use of the reference reproduction time instead of the video reproduction time V0.

EXAMPLE 3

Figure 5:
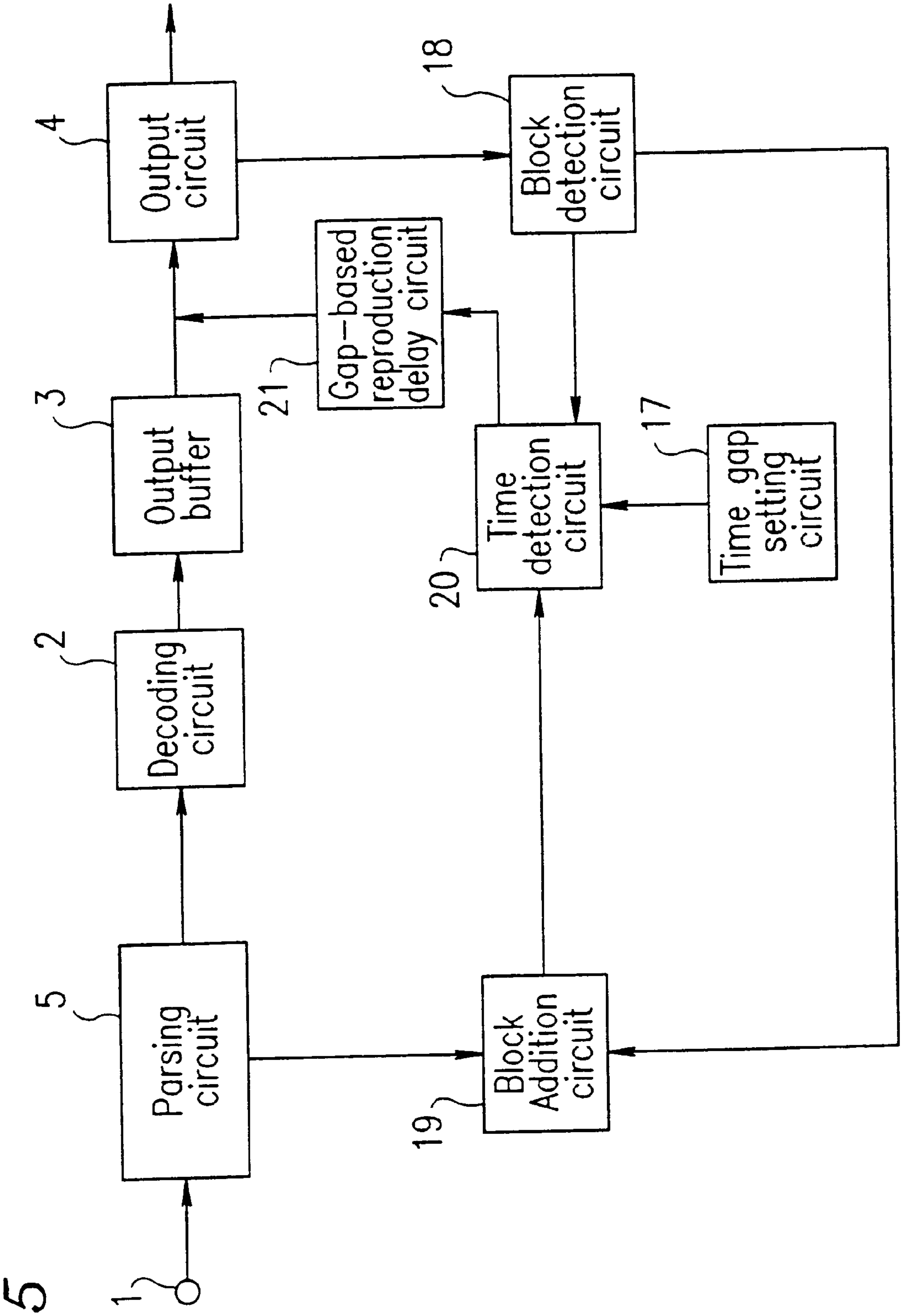
FIG. 5 is a block diagram illustrating a compressed code decoding device according to Example 3 of the present invention.
Figure 6:
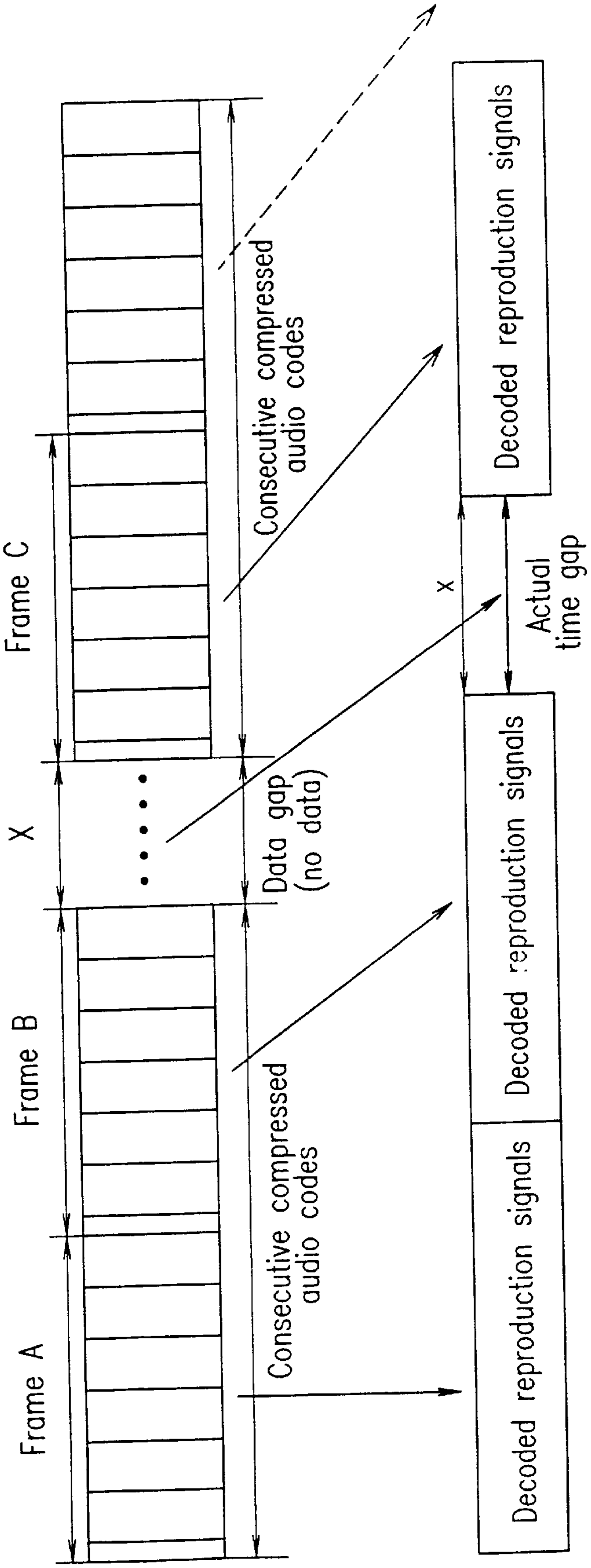
FIG. 6 is a diagram illustrating a configuration of data input to the device illustrated in FIG. 5.

Hereinafter, a compressed code decoding device according to Example 2 of the present invention will be described with reference to the accompanying figures. FIG. 5 is a block diagram illustrating a configuration of the compressed code decoding device of Example 3. FIG. 6 is a diagram illustrating an exemplary configuration of grouped compressed audio codes input to the compressed code decoding device illustrated in FIG. 5.

As illustrated in FIG. 6, it is assumed in the present example that a blank period X with no frame exists at predetermined intervals in a series of frames being transmitted. The device of the present example detects the blank period X and reproduces the next frame C after waiting for a length of time corresponding to the blank period X. For example, when compressed audio codes and compressed video codes are transmitted in parallel, since the compressed video codes contain a larger amount of information than the compressed audio codes (and thus the code length thereof is greater), there occurs the blank period X between two frames of compressed audio codes. Thus, it is necessary to reproduce the next frame C after waiting for the time x corresponding to the blank period X.

As compared to the device of FIG. 1, the compressed code decoding device illustrated in FIG. 5 is additionally provided with a time gap setting circuit 17, a block detection circuit 18, a block addition circuit 19, a time detection circuit 20 and a gap-based reproduction delay circuit 21.

The elements such as the decoding circuit 2, the output buffer 3 and the output circuit 4 function as those in the device of FIG. 1.

Start time Ts and finish time Tf of a gap (corresponding to the start and finish of the period x) are externally provided to, and set in, the time gap setting circuit 17. The block detection circuit 18 detects that a block of audio signals has been completely output from the output circuit 4.

The parsing circuit 5 obtains, from the first frame, the reproduction time T0 of the first block in the first frame, and provides the reproduction time T0 to the block addition circuit 19. Each time the block detection circuit 18 detects that a block of audio signals has been completely output, the block addition circuit 19 obtains the time $\beta$ required for reproducing the block, adds the time $\beta$ to the reproduction time T0, and further adds, to the sum, the time $\alpha$ required for reproducing the first block, thereby obtaining time $(T0+\alpha+\beta)$.

The time detection circuit 20 detects whether the gap start time Ts set in the time gap setting circuit 17 is between the time $(T0+\alpha+\beta)$ obtained by the block addition circuit 19 and the time $(T0+2\alpha+\beta)$ obtained by further adding the time $\alpha$ for the first block. When the time detection circuit 20 detects the gap start time Ts, the time at which the second next block is output via the output circuit 4 is delayed by the gap-based reproduction delay circuit 21 until the gap finish time Tf.

For example, when a length of time in a range between $(T0+\alpha+\beta)$ and $(T0+2\alpha+\beta)$ has passed since the reproduction time T0 of the first block in the first frame in the packet, the time at which to output the first block in the first frame in the next packet is delayed until the gap finish time Tf. In this way, the period of time x is inserted in the reproduced audio signals.

Figure 7:
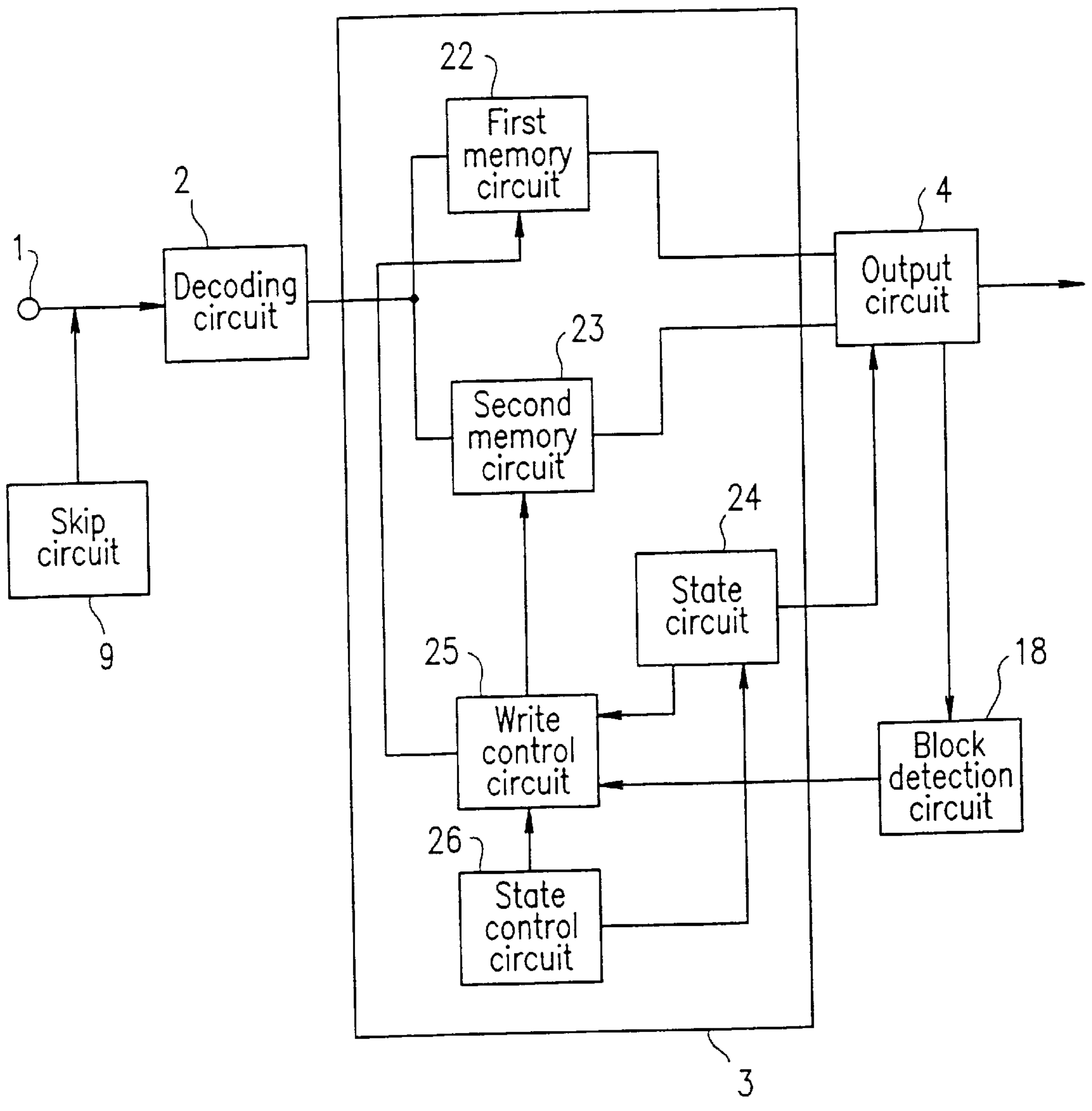
FIG. 7 is a block diagram illustrating a configuration of a buffer in the device illustrated in FIG. 5.

FIG. 7 is a block diagram illustrating a configuration of the output buffer 3 in the device illustrated in FIG. 5. The output buffer 3 includes a first memory circuit 22, a second memory circuit 23, a state circuit 24, a write control circuit 25 and a state control circuit 26.

The first and second memory circuits 22 and 23 store the decoding results of the decoding circuit 2. The state circuit 24 indicates whether the audio signal being externally output is from the first memory circuit 22 or from the second memory circuit 23. The write control circuit 25 performs control such that the audio signal decoded by the decoding circuit 2 is written to one of the first and second memory circuits 22 and 23 which is not being indicated by the state circuit 24.

Each time the block detection circuit 18 detects that a block of audio signals has been completely output, the state control circuit 26 switches from one to another of the memory circuit which stores the audio signal from the output circuit 4 and the memory circuit to which the write control circuit 25 writes the decoded result. At the time when the block detection circuit 18 detects that a block of audio signals has been completely output, the write control circuit 25 and the state control circuit 26 control the write operation of the block of audio signals to the memory circuit which is not being indicated by the state control circuit 26, while switching between the read and write operations for the first and second memory circuits.

In such a configuration, the write control circuit 25 writes the decoded result of the first block to the first memory circuit 22 immediately after the decoding, and writes the decoded result of the second block to the second memory circuit 23 immediately after the decoding. Then, once all of the decoded results are written to the first memory circuit 22, the output circuit 4 begins to externally output the signals. The above-described write operation is continued for the decoded results of the third and subsequent blocks.

In practice, each of the above-described examples is implemented employing discrete ICs, a DSP (Digital signal processor) or a CPU.

The above-described compressed code decoding devices of Examples 1 to 3 provide the following effects.

The need for a large capacity memory for storing frames or packets of signals is eliminated, whereby it is possible to reduce the circuit scale of AV reproduction equipment, and also to decode and reproduce compressed audio codes in synchronization with a timer or video images.

EXAMPLE 4

An audio decoding device of Example 4 receives coded signals for multi-channels of the layer 2 of MPEG2 (the number of channels $N_A$ is four in this example) and decodes the coded signals into an audio signal. The layer 2 of MPEG2 is described in detail in ISO/IEC 11172-3:1993 and 13818-3:1996.

Figure 8:
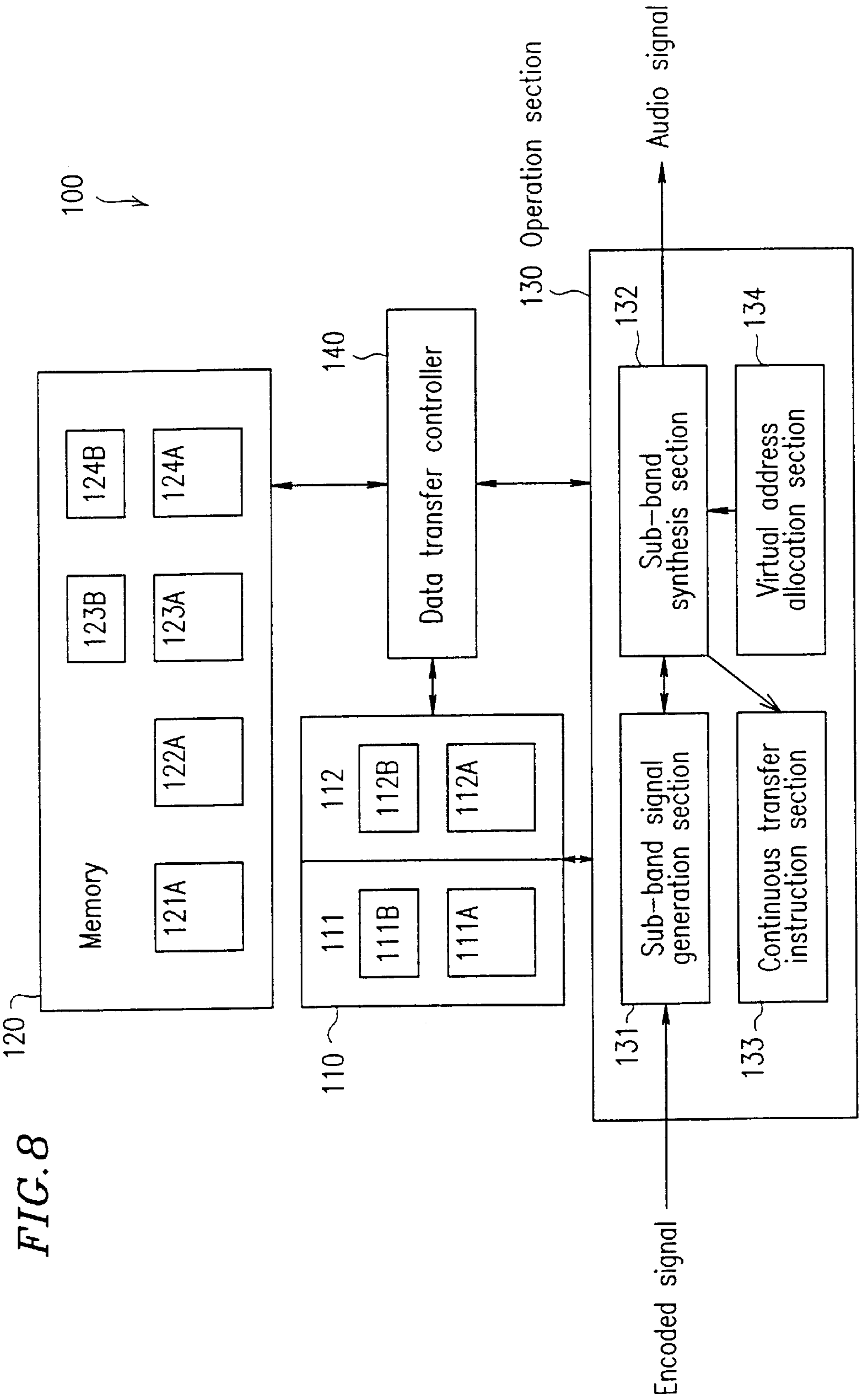
FIG. 8 is a block diagram illustrating an audio decoding device according to Example 4 of the present invention.

FIG. 8 is a block diagram of the audio decoding device 100 according to Example 4 of the present invention. The audio decoding device 100 includes a first memory section 110, a second memory section 120, an operation section 130 and a data transfer controller 140. The first memory section 110 includes an SRAM capable of high-speed access, and stores $M_A$ ($M_A<N_A$) channels of sub-band synthesis filter data and sub-band signals. In this example, $M_A=2$. The first memory section 110 is divided into a memory area 111 (first memory area) and a memory area 112 (second memory area). An important signal processing section of the audio decoding device 100 includes one-chip multimedia processor, which includes an internal memory. While the internal memory is used mainly for image data processing, the first memory section 110 is a memory area of the internal memory which is saved for processing audio data.

The first memory area 111 stores audio data for X channels, where X is an integer changing in the range of 1 through $N_A$, and includes two memory areas 111A and 111B. The memory area 111A stores sub-band synthesis filter data for X channels (corresponding to "V" produced by the matrix processing for sub-band synthesis based on the MPEG standard), and the memory area 111B stores sub-band signal data for X channels. The second memory area 112 stores audio data for Y channels, where Y is an integer changing in the range of 1 through $N_A$ and different from X, and includes two memory areas 112A and 112B. The memory area 112A stores sub-band synthesis filter data for Y channels, and the memory area 112B stores sub-band signal data for Y channels. In the following description, $N_A=4$.

The second memory section 120 is a memory including an inexpensive large capacity DRAM externally connected to the processor. The second memory section 120 includes memory areas 121A through 124A, 123B and 124B. The memory areas 121A through 124A each store sub-band synthesis filter data for one channel. For example, the sub-band synthesis filter data for a first channel is stored in the memory area 121A, the sub-band synthesis filter data for a second channel is stored in the memory area 122A, the sub-band synthesis filter data for a third channel is stored in the memory area 123A, and the sub-band synthesis filter data for a fourth channel is stored in the memory area 124A.

The sub-band signal data for the third channel is stored in the memory area 123B, and sub-band signal data for the fourth channel is stored in the memory area 124B.

The memory areas 111A and 112A in the first memory section 110 and the memory areas 121A through 124A in the second memory section 120 are all of identical size. For a more practical description, the area of each of these memory areas can include addresses 1 through 2048 (0x800 in hexadecimal).

The memory areas 111B and 112B in the first memory section 110 and the memory areas 123B and 124B in the second memory section 120 are all of identical size. For a more practical description, the area of each of these memory areas can include addresses 1 through 768 (0x300 in hexadecimal).

The operation section 130 includes a sub-band signal generation section 131, a sub-band synthesis section 132, a continuous transfer instruction section 133 and a virtual address allocation section 134.

The sub-band signal generation section 131 decodes a coded signal input from an external device into a sub-band signal. The sub-band synthesis section 132 performs channel-by-channel sub-band synthesis filter operation using the sub-band synthesis filter data and the sub-band signals, so as to generate an audio signal. The continuous transfer instruction section 133 designates a specific memory area in each of the first memory section 110 and the second memory section 120 and instructs the data transfer controller 140 to perform one or more data transfers.

The virtual address allocation section 134 assumes a virtual address exists following the actual address at a termination point of each of the memory areas 111A and 112A, and allocates the start point of the virtual address to the actual address at the start of each of the memory areas 111A and 112A. The virtual address allocation section 134 further allocates virtual addresses to the subsequent actual addresses in this manner sequentially.

The data transfer controller 140 transfers data from the first memory section 110 to the second memory section 120 or from the second memory section 120 to the first memory section 110 by the instruction of the continuous transfer instruction section 133.

The operation section 130 instructs data transfer between one of the memory areas 111 and 112 and the second memory section 120 externally connected to the processor. During the data transfer, the operation section performs sub-band synthesis filter operation for one channel using the other one of the memory areas 111 and 112.

Thus, the generation of an audio signal and the transfer of the data are parallel-processed. For example, when the data transfer is performed between the first memory area 111 in the first memory section 110 and the second memory section 120, the operation section 130 performs the operation using the data in the second memory area 112 in the first memory section 110. When the data transfer is performed between the second memory area 112 and the second memory section 120, the operation section 130 performs the operation using the data in the first memory area 111.

As shown by the format described in ISO/IEC 11172-3:1993 and 13818-3:1996, the number of sub-band signals generated by the sub-band signal generation section 131 at one time is 32 for each channel. The sample number of the sub-band signal samples in one frame is 1152 per channel. The sample number Sn of the sub-band signals generated by the sub-band signal generation section 131 for each channel in one time is 32×N, where N is an integer of 1 through 36 inclusive.

Furthermore, the minimum sample number of the sub-band signals required for one-time sub-band synthesis filter operation performed by the sub-band synthesis section 132 is 32 per channel. First, matrix processing is performed, based on the above expression (4), using the 32 samples of sub-band signal and the cosine coefficient to update 1/16 of the continuous sub-band synthesis filter data. Then, the multiply-accumulate operation is performed, as in the above expressions (6) and (7), using the updated sub-band synthesis filter data Ui and the window coefficient Di, to generate 32-sample audio signals. The 32-sample audio signals are each obtained by performing the multiply-accumulate operation 16 times. At this point, the sub-band synthesis filter data used in the operation is assigned sequentially sample by sample, starting from the newly updated sample. Specifically, one sample corresponding to 1/16 of the newly-updated sub-band synthesis filter data is first assigned, the next sample corresponding to 1/16 of the sub-band synthesis filter data updated by the immediately previous operation is then assigned, and so on. Thus, the process shown in FIGS. 9 to 11 is performed.

In this example, the value of N is assumed to be set to 6 for simplifying the description. Specifically, the sample number of the sub-band signals generated at one time by the sub-band signal generation section 131 is 192 (32×6). The sub-band synthesis section 132 performs the sub-band synthesis filter operation six times per channel using the sub-band signals. Thus, 192-sample (32×6) audio signals are generated. The sub-band synthesis filter data updated by the sub-band synthesis filter operation occupies 6/16 of the entire sub-band synthesis filter data.

Figure 9:
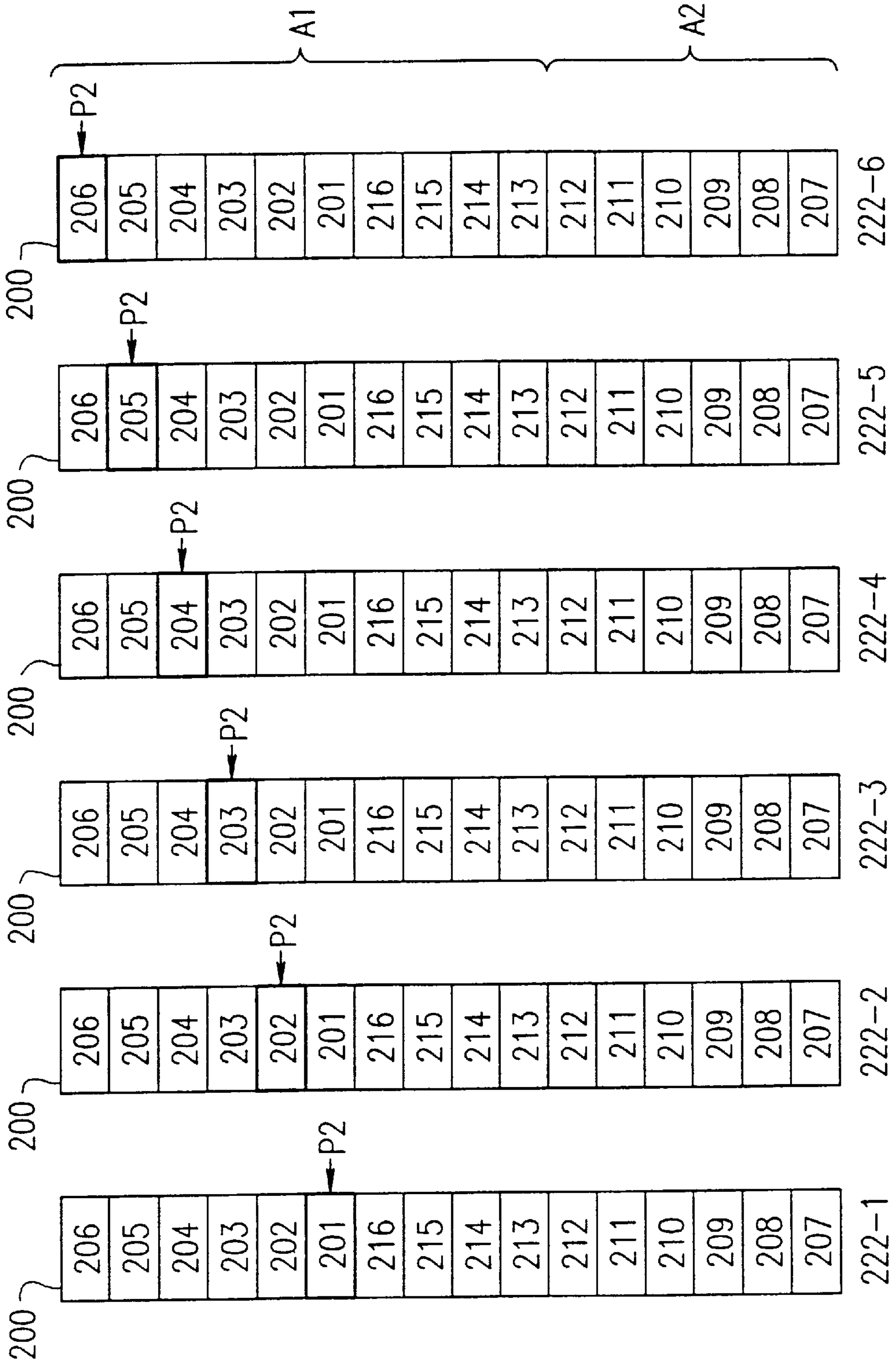
FIG. 9 is a diagram illustrating an arrangement of sub-band synthesis filter data and its change over time (No. 1).
Figure 10:
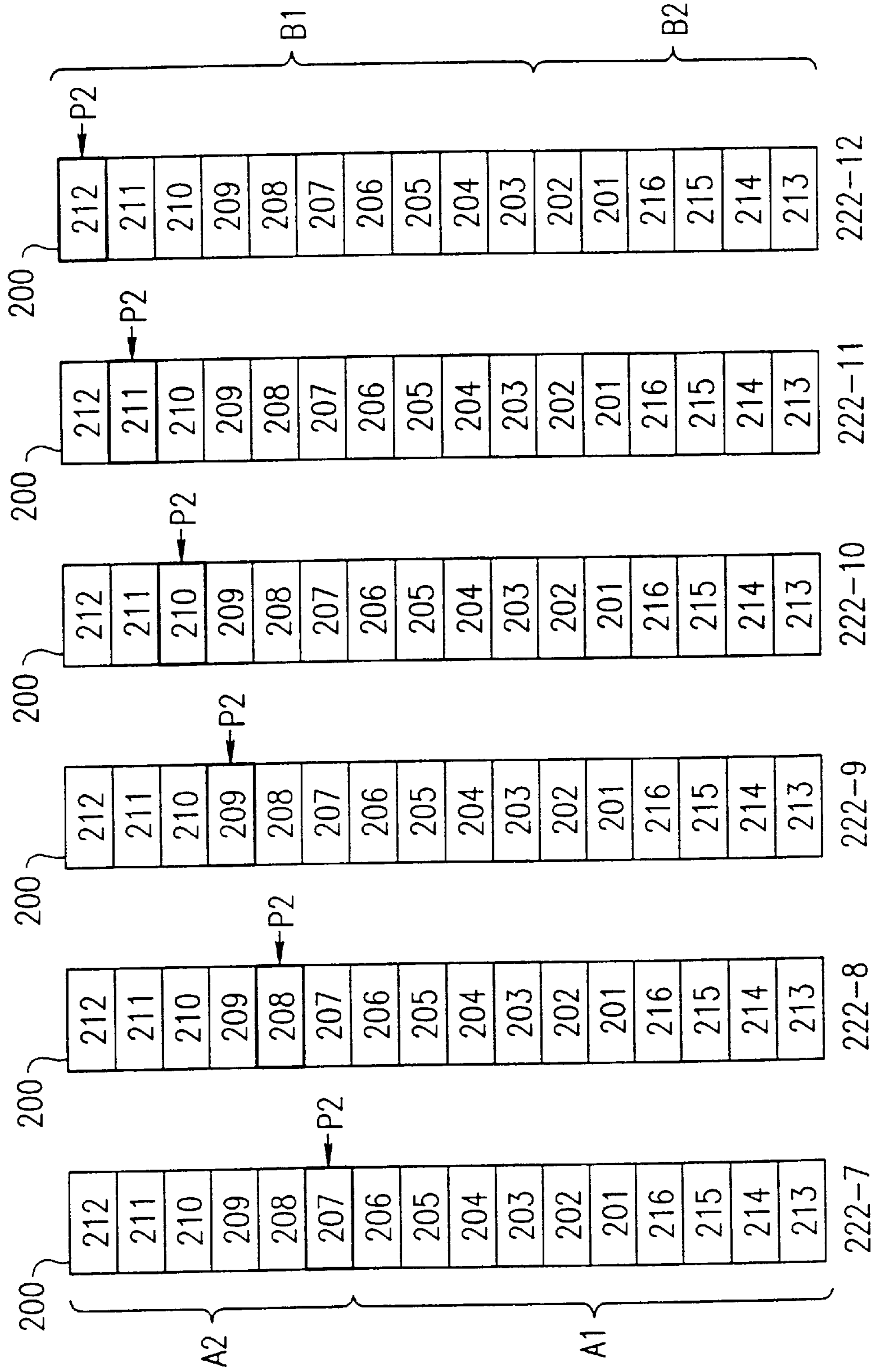
FIG. 10 is a diagram illustrating an arrangement of sub-band synthesis filter data and its change over time (No. 2).
Figure 11:
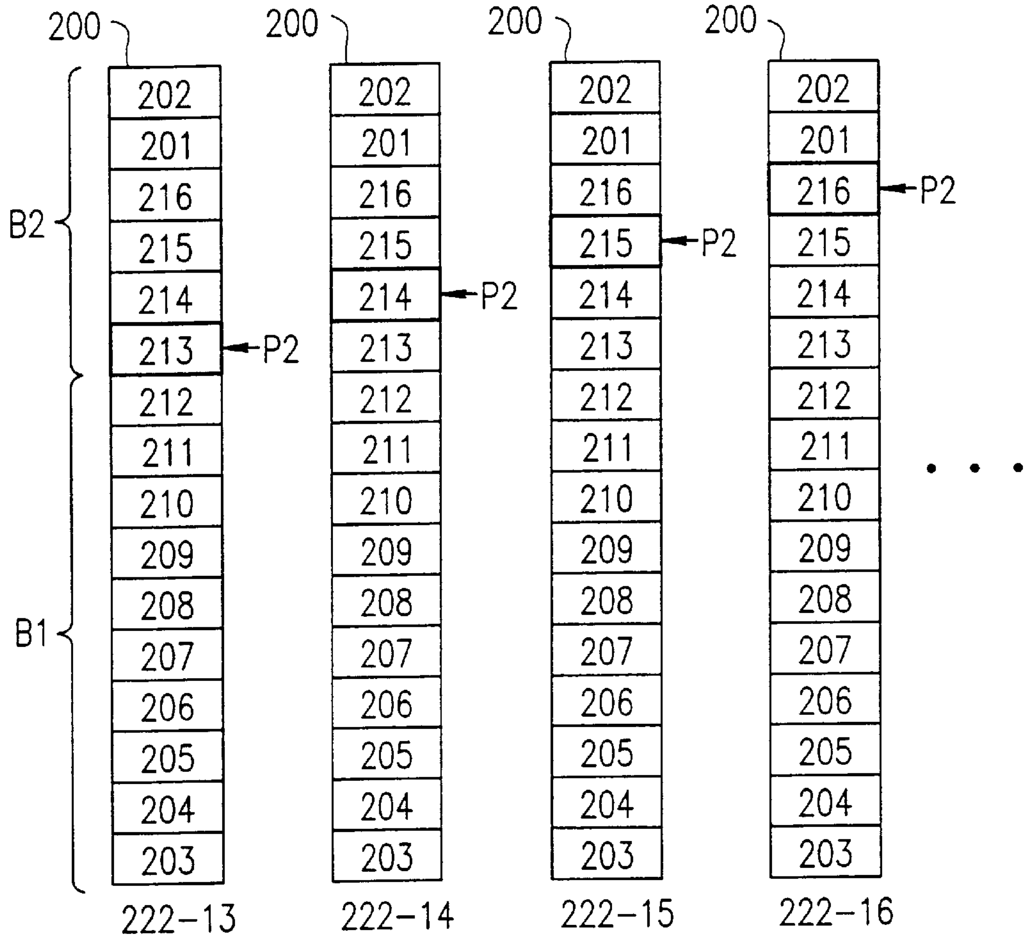
FIG. 11 is a diagram illustrating an arrangement of sub-band synthesis filter data and its change over time (No. 3).

FIGS. 9 to 11 show the arrangement of the sub-band synthesis filter data generated per channel and the change over time. In FIGS. 9 to 11, a number of rectangular areas 200 each represent the entire sub-band synthesis filter data. The sub-band synthesis filter data 200 is divided into 16 data areas 201 through 216. Reference numerals 222-1 through 222-16 under the region 200 indicate the order of change over time. The time interval between two adjacent rectangular areas 200 corresponds to the time period required to perform the sub-band synthesis filter data once. The data changes over time with the data 222-1 being the oldest and the data 222-16 being the newest. In this example, FIG. 9 shows the arrangement and the position of a pointer P2 of data 222-1 through 222-6, FIG. 10 shows the arrangement and the position of the pointer P2 of data 222-7 through 222-12, and FIG. 11 shows the arrangement and the position of the pointer P2 of data 222-13 through 222-16.

The arrow shown to the right of each rectangular area 200 represents a pointer P2 showing the area in which the data is updated. As described above, the sample number of the sub-band signals for each channel generated at one time is 192 (32×6) and corresponds to the sub-band synthesis filter operation performed six times. Assuming that the data 222-1 is sub-band synthesis filter data updated by the first sub-band synthesis filter operation immediately after the sub-band signal generation, 192-sample sub-band signals are generated by the sub-band signal generation section 131 during the change from the data 222-6 to the data 222-7 and during the change from the data 222-12 to the data 222-13. During the above time periods, data is transferred between the first memory section 110 and the second memory section 120 by the control by the data transfer controller 140. When the sub-band synthesis filter data is in the state shown in the rectangular area 222-1, the data in the data area 201 is updated. When the sub-band synthesis filter data is in the state shown in the rectangular area 222-2, the data in the data area 202 is updated. In the same manner, when the sub-band synthesis filter data is in the state shown in the rectangular areas 222-3 through 222-16, the data in the data area 203 through 216 is updated, respectively. Then, the data in the area 222-1 is again updated.

FIG. 12 is a table showing the correspondence between the virtual addresses which are virtually allocated to the first memory section 110 by the virtual address allocation section 134 of FIG. 8 and the actual addresses. As can be appreciated from FIG. 12, the addresses included in the memory areas 111 and 112 are respectively 0 through 3071 (0x000 through 0xbff in hexadecimal). The virtual addresses and the actual addresses have the same values where the virtual addresses are 0x000 through 0xbff. However, the virtual addresses 0xc00 through 0xfff indicate the actual addresses 0x000 through 0x7ff, respectively.

For example, the memory area 111B in the first memory area 111 is allocated to the addresses 0x100 through 0x3ff, and the memory area 111A is allocated to the addresses 0x400 through 0xbff. In the same manner, the memory area 112B in the second memory area 112 is allocated to the addresses 0x100 through 0x3ff, and the memory area 112A is allocated to the addresses 0x400 through 0xbff. Since the virtual address 0xc00 in each of the memory areas 111 and 112 is allocated to the actual address 0x400, the virtual address 0xc00 indicates the leading address of each of the memory areas 111A and 112A. The following virtual addresses indicate the actual addresses in the same manner.

Figure 13:
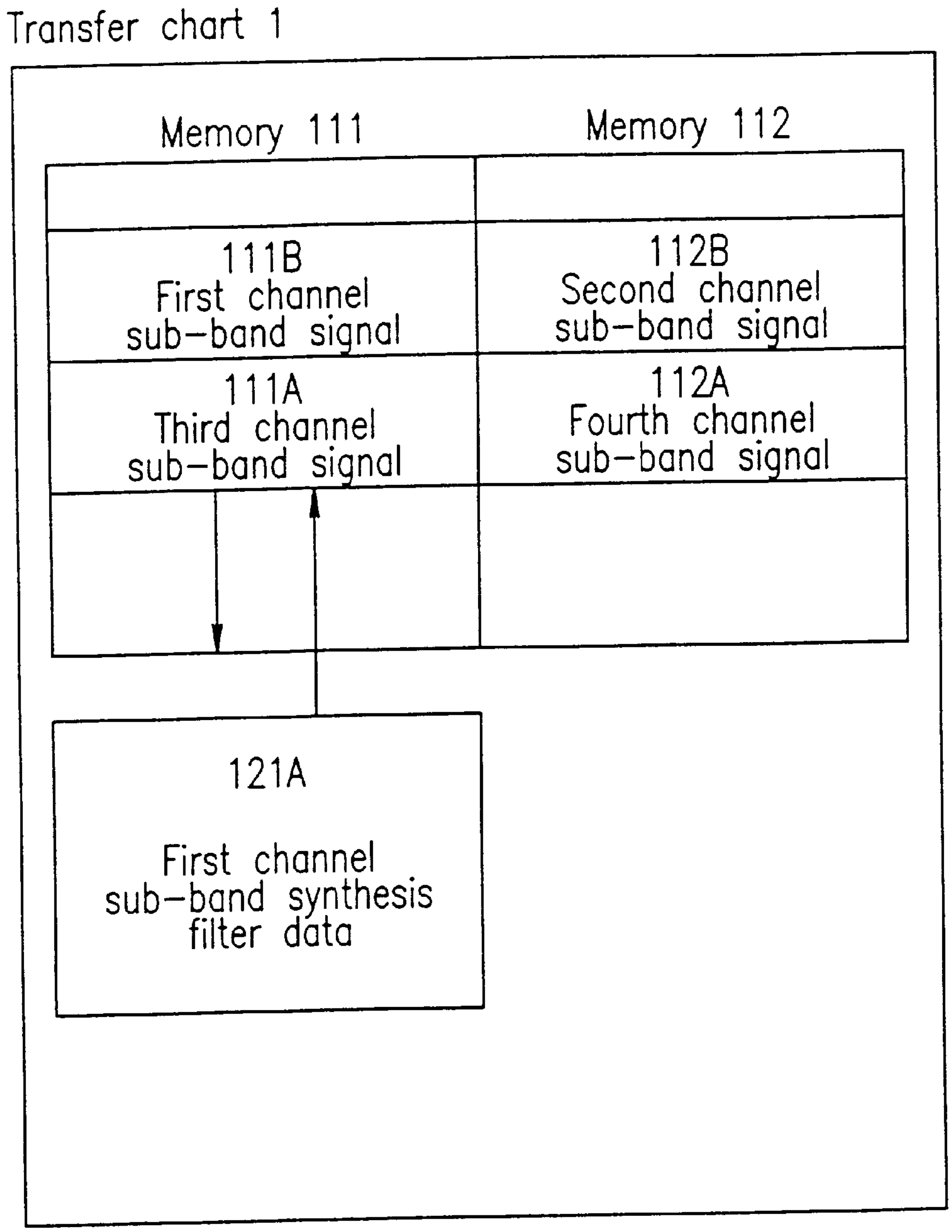
FIG. 13 is a timing chart (No. 1) for data transmission in the audio decoding device according to Example 4 of the present invention.
Figure 14:
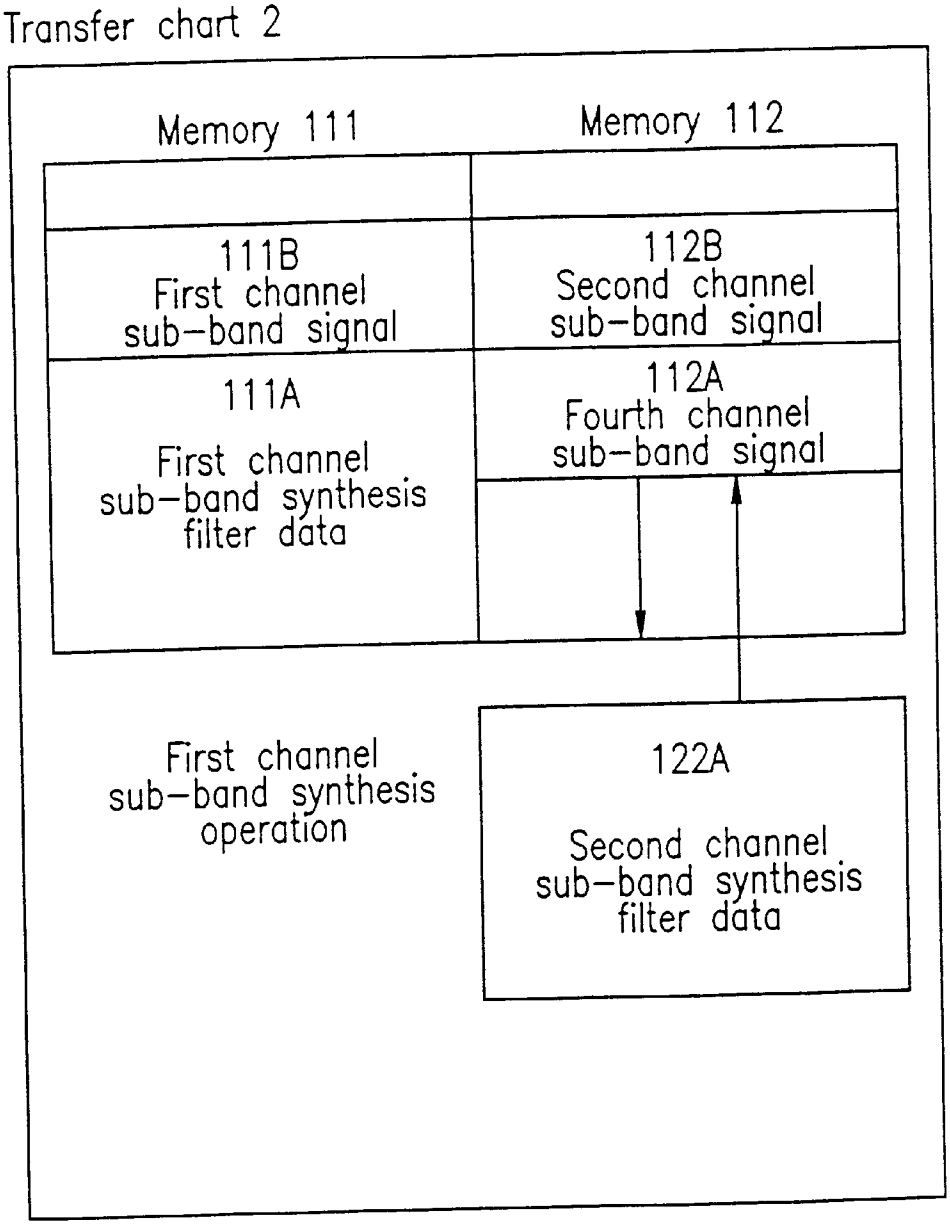
FIG. 14 is a timing chart (No. 2) for data transmission in the audio decoding device according to Example 4 of the present invention.
Figure 15:
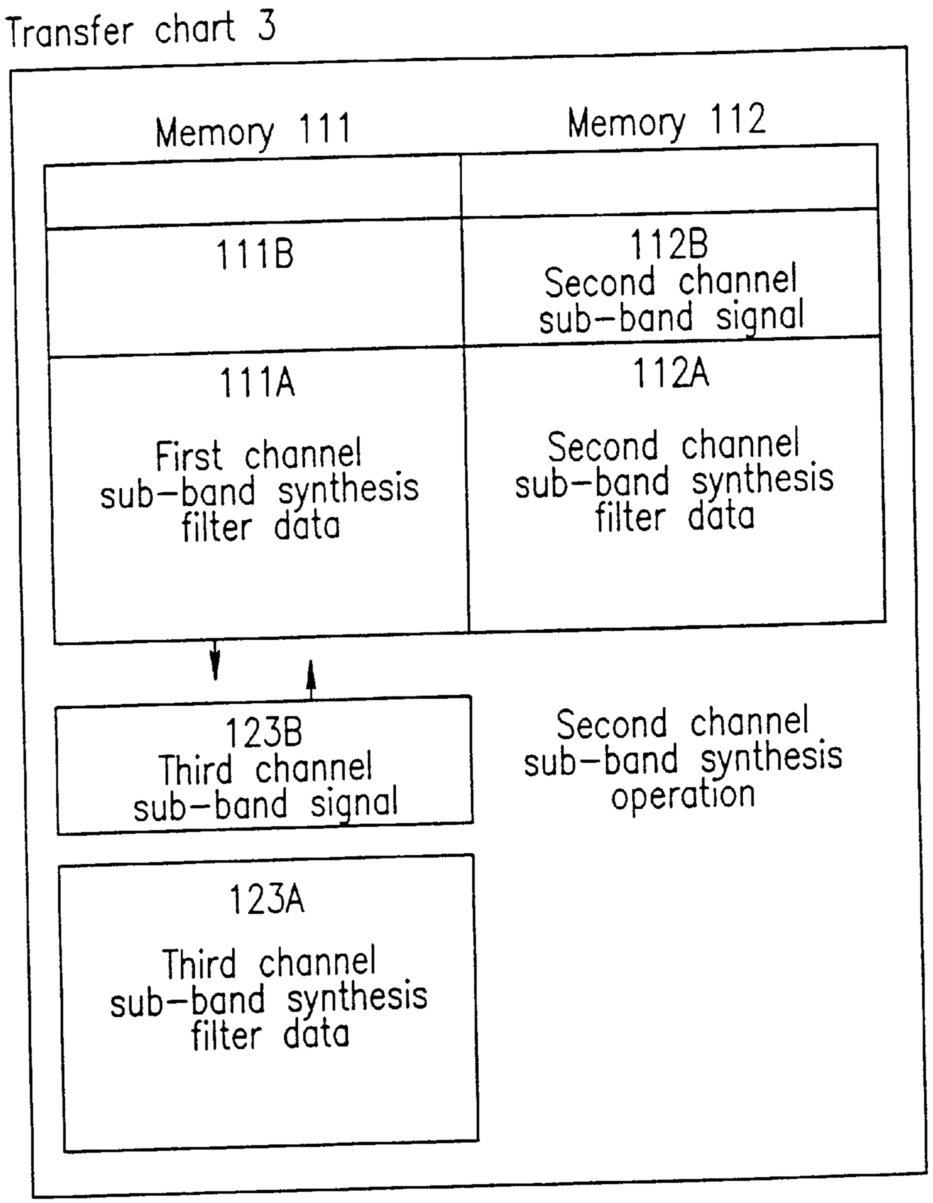
FIG. 15 is a timing chart (No. 3) for data transmission in the audio decoding device according to Example 4 of the present invention.
Figure 16:
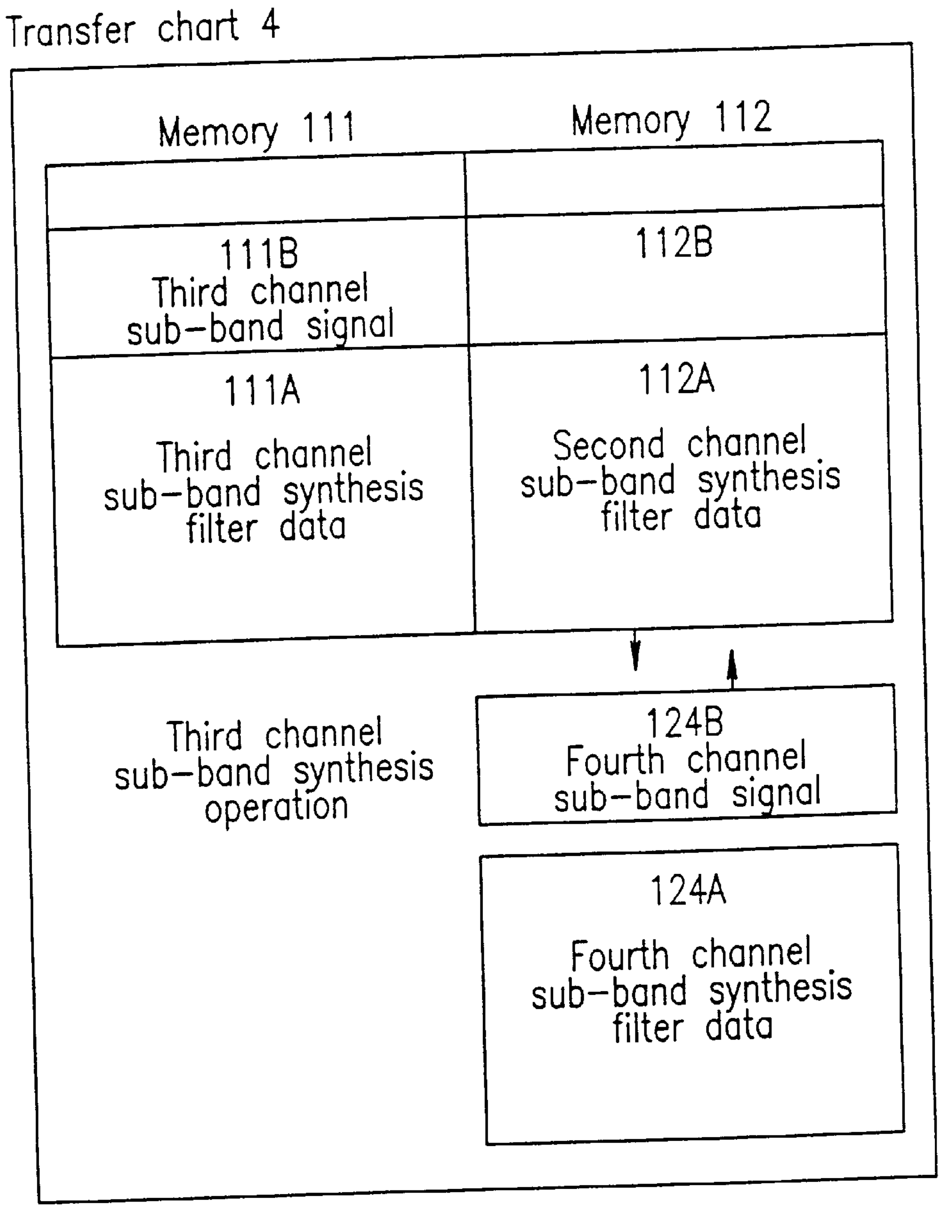
FIG. 16 is a timing chart (No. 4) for data transmission in the audio decoding device according to Example 4 of the present invention.
Figure 17:
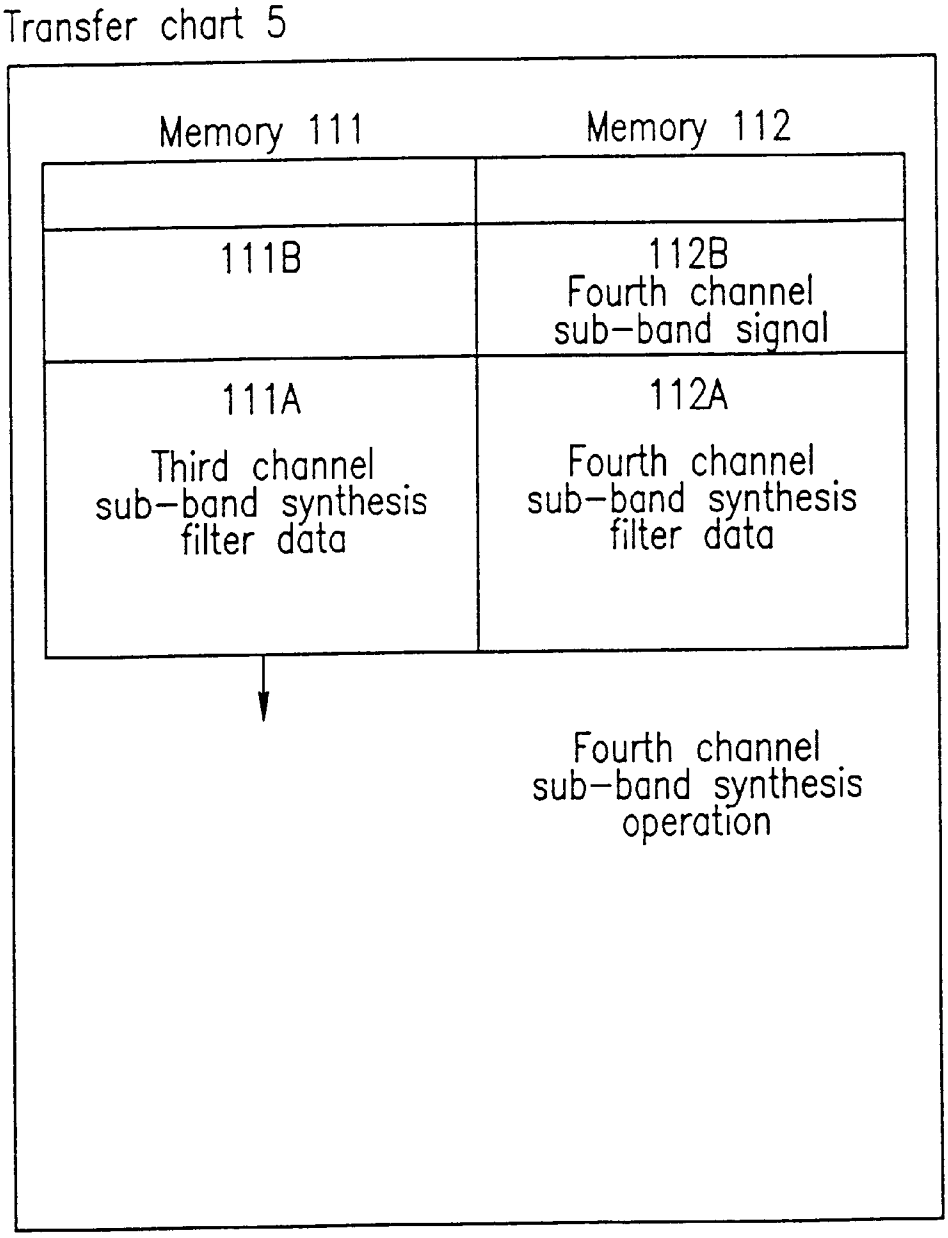
FIG. 17 is a timing chart (No. 5) for data transmission in the audio decoding device according to Example 4 of the present invention.
Figure 18:
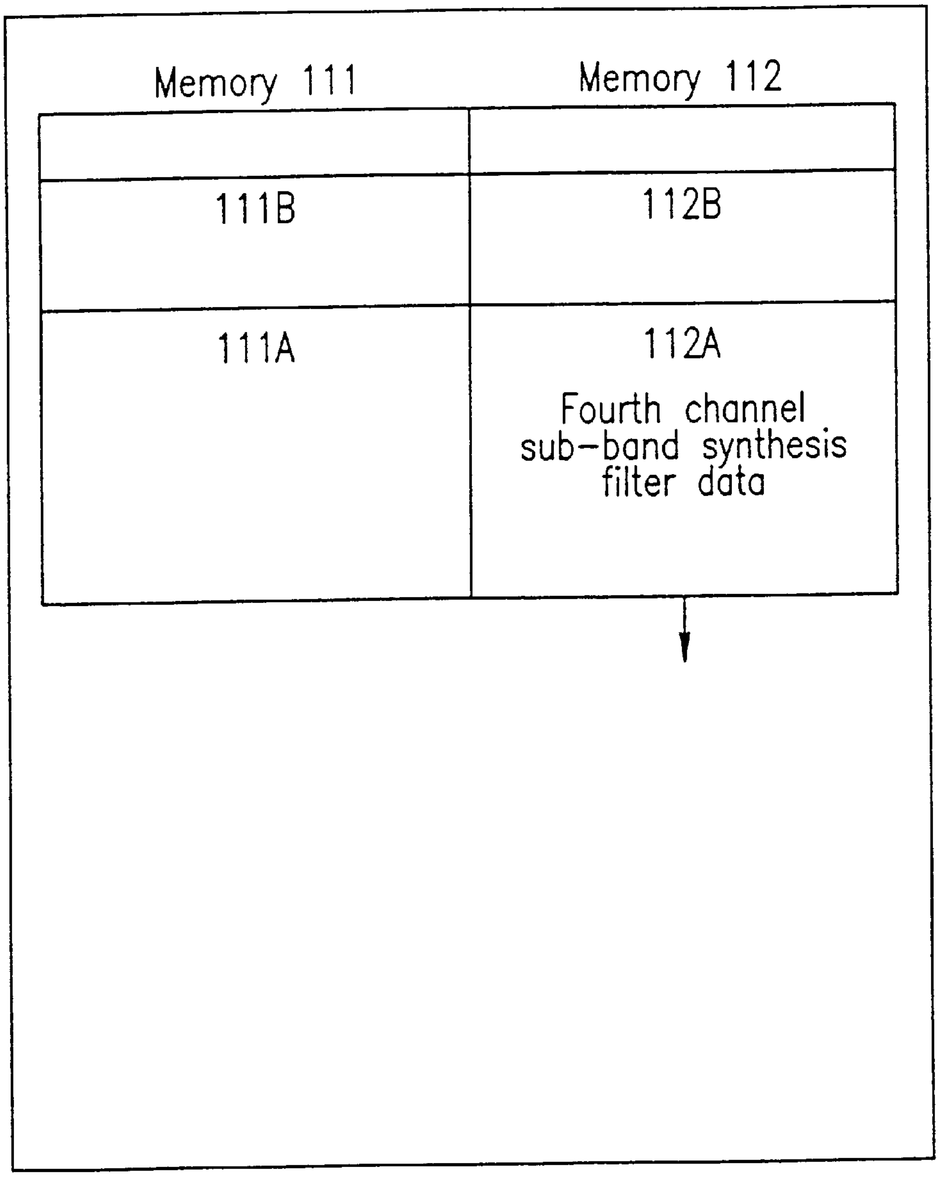
FIG. 18 is a timing chart (No. 6) for data transmission in the audio decoding device according to Example 4 of the present invention.

FIGS. 13 through 18 are timing charts of data transfer. FIGS. 13 through 18 respectively show transfer charts 1 through 6. Transfer chart 1 in FIG. 13 shows data transfer before sub-band synthesis, and transfer chart 2 in FIG. 14 shows data transfer during sub-band synthesis for the first channel. Transfer chart 3 in FIG. 15 shows data transfer during sub-band synthesis for the second channel, and transfer chart 4 in FIG. 16 shows data transfer during sub-band synthesis for the third channel. Transfer chart 5 in FIG. 17 shows data transfer during sub-band synthesis for the fourth channel, and transfer chart 6 in FIG. 18 shows data transfer after sub-band synthesis.

The audio decoding device 100 having the above-described structure operates in the following manner.

First, when a bit stream (including encoded audio signals) of multi-channels of MPEG2 (four channels) is input, the operation section 130 gives the bit stream to the sub-band signal generation section 131, which decodes the bit stream into four-channel sub-band signals. Then, the sub-band signals for the i'th channel (i=1 in this example) are written into the memory area 111B, and the sub-band signals for the j'th channel (j=2 in this example) are written into the memory area 112B. The sub-band signals for the k'th channel (k=3 in this example) are written into a part of the memory area 111A, and the sub-band signals for the 1'th channel (1=4 in this example) are written into a part of the memory area 112A.

Then, the continuous transfer instruction section 133 instructs the data transfer controller 140 to transfer data in the following manner based on a request from the operation section 130. As shown in transfer chart 1 (FIG. 13), the sub-band signal data for the third channel stored in the memory area 111A in the first memory section 110 is transferred to the memory area 123B in the second memory section 120. The sub-band synthesis filter data for the first channel stored in the memory area 121A in the second memory section 120 is transferred to the memory area 111A in the first memory section 110.

Thus, the data transfer controller 140 transfers the sub-band signal data for the third channel from the memory area 111A to the memory area 123B, and immediately thereafter, transfers the sub-band synthesis filter data for the first channel from the memory area 121A to the memory area 111A. When the data transfer is completed, the data transfer controller 140 notifies the operation section 130 of the completion of the data transfer.

The operation section 130, when to have been completed the data transfer is determined, requests the continuous transfer instruction section 133 to transfer data in the following manner.

As shown in transfer chart 2 (FIG. 14), the sub-band signal data for the fourth channel stored in the memory area 112A in the first memory section 110 is transferred to the memory area 124B in the second memory section 120. The sub-band synthesis filter data for the second channel stored in the memory area 122A in the second memory section 120 is transferred to the memory area 112A in the first memory section 110. In parallel with the above transfer operation, the operation section 130 starts the sub-band synthesis filter operation for the first channel by the sub-band synthesis section 132 using the data in the first memory area 111.

At this point, the sub-band synthesis filter data in the data area 201 of the data 222-1 (FIG. 9) is updated. In other words, the data at addresses 0x680 through 0x6ff in the first memory area 111 is updated. After that, the 32-sample audio signals are obtained by performing the multiply-accumulate operation 16 times. In order to uniformize the order of assignment of the coefficient D, the sub-band synthesis filter data used in the operation is assigned sequentially sample by sample, starting from the newly updated sample. Specifically, one sample corresponding to 1/16 of the newly-updated sub-band synthesis filter data, i.e., the data in the data area 201, is first assigned, the next sample corresponding to 1/16 of the sub-band synthesis filter data updated by the immediately previous operation, i.e., the data in the data area 216, is then assigned, and so on, for the data in the data areas 215, 214 . . . to 203 and 202.

When the sub-band synthesis filter data in the data area 206 and later (0x400-) is assigned after the sub-band synthesis filter data in the data area 207 (0xb80 through 0xbff) is assigned, circulating address processing is required on the actual addresses in order to set the addresses. The circulating address processing is performed by the following AND operation. Where the address before conversion is A, the address after the conversion B is:

$$B=\{(A-0x400)\times(0x7ff)\}+0x400$$

where × represents the AND operation.

However, the operation section 130 in this example includes the virtual address allocation section 134 and thus does not require the circulating address processing including the AND operation. The data up to sub-band synthesis filter data at the actual addresses 0x400 through 0x7ff, i.e., data areas 206 through 201, 216 and 215 can be allocated using the virtual addresses 0xc00 through 0xfff.

In the subsequent sub-band synthesis filter operation also, as shown in the rectangular area 222-2 (FIG. 9), the data in the data area 202 is updated, and the multiply-accumulate operation is performed using the sub-band synthesis filter data in the data areas 201, 216 through 207, and 206 through 202, thereby obtaining an audio signal.

Furthermore, also in the subsequent sub-band synthesis filter operation, as shown in the rectangular area 222-3 (FIG. 9), the data in the data area 203 is updated, and the multiply-accumulate operation is performed using the sub-band synthesis filter data in the data areas 202 and 201, 216 through 207, and 206 through 203, thereby obtaining an audio signal.

Also in the sixth sub-band synthesis filter operation immediately before the transfer of the audio signal, as shown in the rectangular area 222-6 (FIG. 9), the data in the data area 206 is updated, and the multiply-accumulate operation is performed using the sub-band synthesis filter data in the data areas 205 through 201, 216 through 207 and 206, thereby obtaining an audio signal. As described above, the multiply-accumulate operation with the coefficient D can be performed without circulating address processing in any of the sub-band synthesis filter operation performed six times.

The data transfer controller 140 performs data transfer while the operation section 130 performs the sub-band synthesis filter operation. When the transfer is completed, the data transfer controller 140 notifies the operation section 130 of the completion of the data transfer. When both the data transfer and the sub-band synthesis filter operation for the first channel are completed, the continuous transfer instruction section 133 instructs the data transfer controller 140 to transfer an audio signal in the following manner, based on a request of the operation section 130.

As shown in transfer chart 3 (FIG. 15), continuous transfer instruction section 133 instructs to transfer the sub-band synthesis filter data for the first channel stored in the memory area 111A in the first memory section 110 to the memory area 121A in the second memory section 120. The continuous transfer instruction section 133 further instructs to transfer the sub-band synthesis filter data for the third channel stored in the memory area 123A in the second memory section 120 to the memory area 111A in the first memory section 110. The continuous transfer instruction section 133 also instructs to transfer the sub-band signal data for the third channel stored in the memory area 123B in the second memory section 120 to the memory area 111B in the first memory section 110. The sub-band synthesis section 132 starts the sub-band synthesis filter operation for the second channel using the data in the second memory area 112.

The transfer of the sub-band synthesis filter data for the first channel and the third channel is performed between the rectangular areas 222-6 (FIG. 9) and the rectangular areas 222-7 (FIG. 10). The transfer of the sub-band synthesis filter data for the first channel is performed as follows. The area 200 is divided into Al including the data areas 206 through 201 and 216 through 213 and A2 including the data areas 212 through 207, and the data in one of them is first transferred and the data in the other is then transferred. By such an operation, the order of assigning the addresses of the sub-band synthesis filter data for the subsequent transfer of the data for the first channel is exactly the same as that of the previous transfer.

In this stage, the sub-band synthesis filter operation for the second channel is performed in the same manner as that for the first channel using the second memory area 112. The data transfer controller 140 performs data transfer while the sub-band synthesis section 132 performs the sub-band synthesis filter operation. When the transfer is completed, the data transfer controller 140 notifies the operation section 130 of the completion of the data transfer.

When both the data transfer and the sub-band synthesis filter operation for the second channel are completed, the operation section 130 requests the continuous transfer instruction section 133 to transfer data in the following manner.

As shown in transfer chart 4 (FIG. 16), the continuous transfer instruction section 133 instructs transfer of the sub-band synthesis filter data for the second channel stored in the memory area 112A in the first memory section 110 to the memory area 122A in the second memory section 120. The continuous transfer instruction section 133 further instructs transfer of the sub-band synthesis filter data for the fourth channel stored in the memory area 124A in the second memory section 120 to the memory area 112A in the first memory section 110. Then, the continuous transfer instruction section 133 instructs to transfer the sub-band signal data for the fourth channel stored in the memory area 124B in the second memory section 120 to the memory area 112B in the first memory section 110. The sub-band synthesis section 132 starts the sub-band synthesis filter operation for the third channel using the data in the first memory area 111 in parallel with the above-described transfer operation.

The transfer of the sub-band synthesis filter data for the second channel and the fourth channel is performed between the rectangular areas 222-6 (FIG. 9) and the rectangular areas 222-7 (FIG. 10) in the same manner as that between the first channel and the third channel. The area 200 is divided into A1 (FIG. 9) including the data areas 206 through 201 and 216 through 213 and A2 including the data areas 212 through 207, and the data in one of them is first transferred and the data in the other is then transferred.

When both the data transfer and the sub-band synthesis filter operation for the third channel are completed, the operation section 130 requests the continuous transfer instruction section 133 to transfer data in the following manner.

As shown in transfer chart 5 (FIG. 17), the sub-band synthesis filter data for the third channel stored in the memory area 111A in the first memory section 110 is transferred to the memory area 123A in the second memory section 120. The sub-band synthesis section 132 starts the sub-band synthesis filter operation for the fourth channel using the data in the second memory area 112.

When both the data transfer and the sub-band synthesis filter operation for the fourth channel are completed, the operation section 130 requests the continuous transfer instruction section 133 to transfer data in the following manner.

As shown in transfer chart 6 (FIG. 18), the continuous transfer instruction section 133 instructs to transfer the sub-band synthesis filter data for the fourth channel stored in the memory area 112A in the first memory section 110 to the memory area 124A in the second memory section 120.

Then, in the next step, 192-sample sub-band signals are generated for each channel by the sub-band signal generation section 131. Next, sub-band synthesis operation and data transfer are performed in parallel. The transfer of the sub-band synthesis filter data for any of the channels from the first memory section 110 to the second memory section 120 is performed between the rectangular areas 222-12 (FIG. 10) and the rectangular areas 222-13 (FIG. 11). The area 200 is divided into B1 (FIG. 10) including the data areas 212 through 203 and B2 including the data areas 202, 201 and 216 through 213, and the data in one of them is first transferred and the data in the other is then transferred.

As can be appreciated from the above description, the audio decoding device 100 in this example uses a DRAM, which costs less than an SRAM, for the second memory section 120 for storing the data corresponding to all the channels in the second memory section 120. The data in the second memory section 120 is transferred to the first memory section 110 using the data transfer controller 140 only when necessary. Accordingly, the multi-channel audio signals can be reproduced at a high speed without increasing the capacity of the internal memory in the processor. Since the SRAM does not need to be connected externally, the cost of the entire device can be reduced.

In the audio decoding device 100 in this example, the sub-band synthesis filter operation and the data transfer can be performed in parallel, and thus the time period required for the operation processing can be shortened by the time period required for the data transfer. Since an amount of data corresponding to a plurality of transfer operations can be transferred by a single transfer operation, the circulating address processing and the shift processing of the sub-band synthesis filter data are not required in the sub-band synthesis operation, where a virtual address allocation section is used. Further, since the data transfer can be performed a plurality of times, the data transfer is easier to schedule in accordance with the time period required for data transfer and for generation of the audio signal. Thus, the time loss caused by the data transfer can be reduced and the processing time can be shortened.

In this example, for simplicity of the description, the number of channels for input signals is assumed to be four. However, the number of channels is not limited to four.

In this example, any possible method is usable for the processing performed in parallel with the data transfer before the sub-band synthesis for the first channel or the processing in parallel with the transfer of the sub-band synthesis filter data for the final channel. For example, after the sub-band synthesis filter data for the final channel is transferred, a signal can be input to generate a sub-band signal. In such a case, loss caused by the data transfer can be reduced.

EXAMPLE 5

An audio decoding device of Example 5 receives coded signals for multi-channels (five channels) of the layer 2 of MPEG2 and decodes the coded signals into an audio signal. The layer 2 of MPEG2 is described in detail in ISO/IEC 11172-3:1993 and 13818-3:1996.

Figure 19:
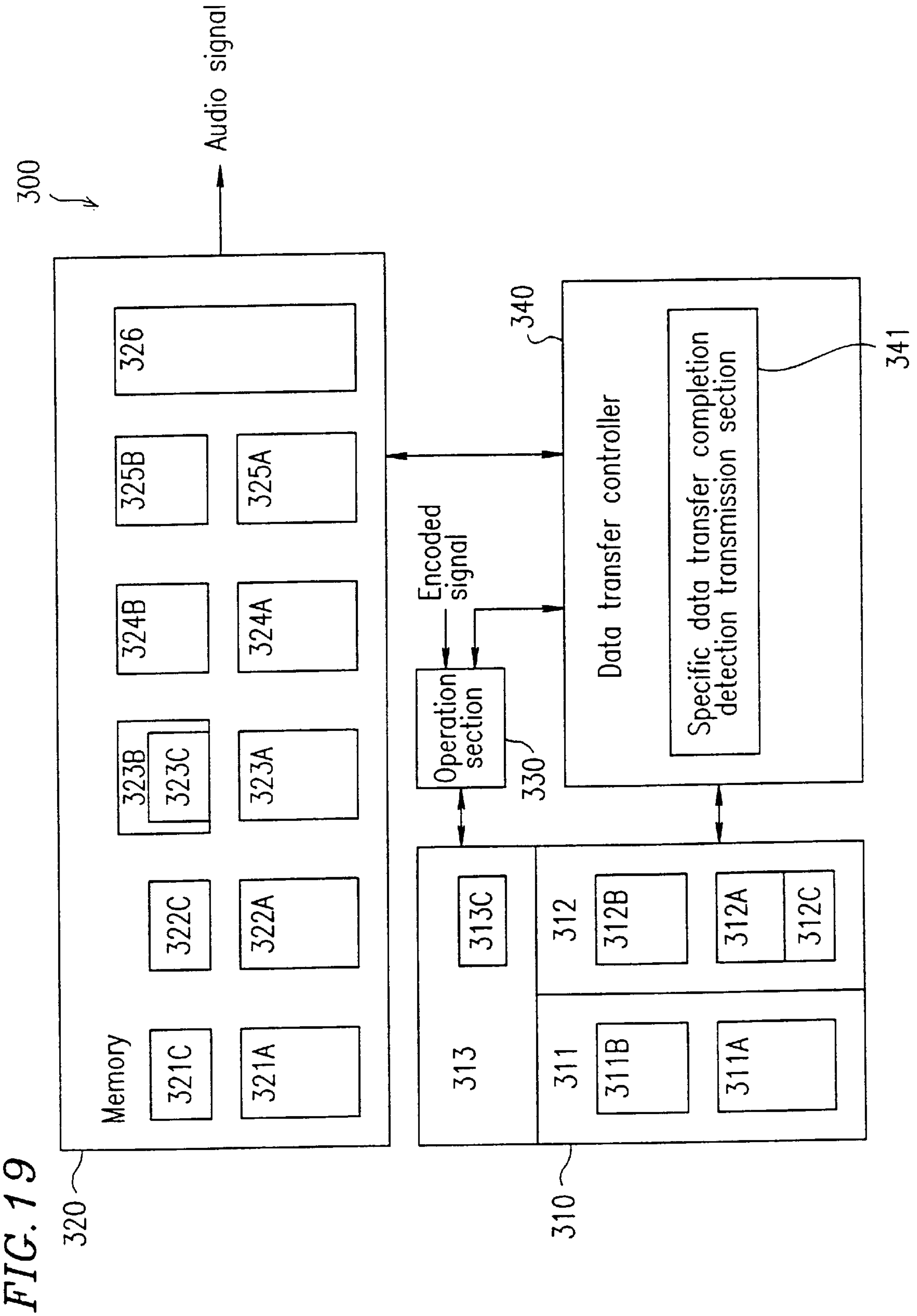
FIG. 19 is a block diagram illustrating an audio decoding device according to Example 5 of the present invention.

FIG. 19 is a block diagram of the audio decoding device 300 according to Example 5 of the present invention. The audio decoding device 300 includes a first memory section 310, a second memory section 320, an operation section 330 and a data transfer controller 340. The first memory section 310 includes an SRAM capable of high-speed access, and is divided into a memory area 311 (first memory area), a memory area 312 (second memory area) and a memory area 313 (third memory area). An important signal processing section of the audio decoding device 300 includes one-chip multimedia processor, which includes an internal memory. While the internal memory is used mainly for image data processing, the first memory section 310 is a memory area of the internal memory which is saved for processing audio data.

The first memory area 311 stores audio data for X channels, where X is an integer changing in the range of 1 through $N_A$, and includes two memory areas 311A and 311B. The memory area 311B primarily stores sub-band signals for X channels and the memory area 311A primarily stores sub-band synthesis filter data for X channels.

The second memory area 312 stores coded audio data for Y channels, where Y is an integer changing in the range of 1 through $N_A$ and different from X, and includes two memory areas 312A and 312B. A memory area 312C is provided inside the memory area 312A.

The memory area 312B primarily stores sub-band signals for Y channels, and the memory area 312A primarily stores sub-band synthesis filter data for Y channels. The memory area 312C is an area in which the operation section 330 temporarily (at least from the time when the sub-band signals have been generated to the time when the first sub-band synthesis for one of the channels is completed) stores some of the sub-band signals generated in the third sub-band synthesis for another one of the channels.

The memory area 313 is an area for storing data such as header information of the input signal. The memory area 313 is provided with a memory area 313C in which the operation section 330 temporarily (at least from the time when the sub-band signals have been generated to the time when sub-band synthesis for one of the channels is completed) stores sub-band signals of the other channels. In the following description, $N_A$=5.

The second memory section 320 is a memory including a large capacity DRAM externally connected to the processor. The second memory section 320 is divided into memory areas 321A through 325A, 323B through 325B, 321C through 323C, and 326.

The memory areas 321A through 325A each store sub-band synthesis filter data for one channel. For example, the sub-band synthesis filter data for a first channel is stored in the memory area 321A, the sub-band synthesis filter data for a second channel is stored in the memory area 322A, the sub-band synthesis filter data for a third channel is stored in the memory area 323A, the sub-band synthesis filter data for a fourth channel is stored in the memory area 324A, and the sub-band synthesis filter data for a fifth channel is stored in the memory area 325A.

Part of the sub-band signal data for the third channel is stored in the memory area 323B, the sub-band signal data for the fourth channel is stored in the memory area 324B, and the sub-band signal data for the fifth channel is stored in the memory area 325B.

The memory area 321C stores the PCM data for the first channel, the memory area 322C stores the sub-band signals for the second channel, and the memory area 323C stores the sub-band signals for the third channel.

The memory area 326 is used as an audio signal buffer and stores interleaved data in which the PCM data of the first to fifth channels is arranged in a data format comparable to that of the audio signal.

The memory areas 311A and 312A in the first memory section 310 and the memory areas 321A through 325A in the second memory section 320 are all of identical size. For a more practical description, the area of each of these memory areas can include addresses 1 through 2048 (0x800 in hexadecimal).

Similarly, the memory area 311B in the first memory section 310, the memory area 312B in the first memory section 310, the total of the memory areas 312C and 313C, and the total of the memory areas 324B and 325B are all of identical size. For a more practical description, the area of each of these memory areas can include addresses 1 through 768 (0x300 in hexadecimal).

Figure 20:
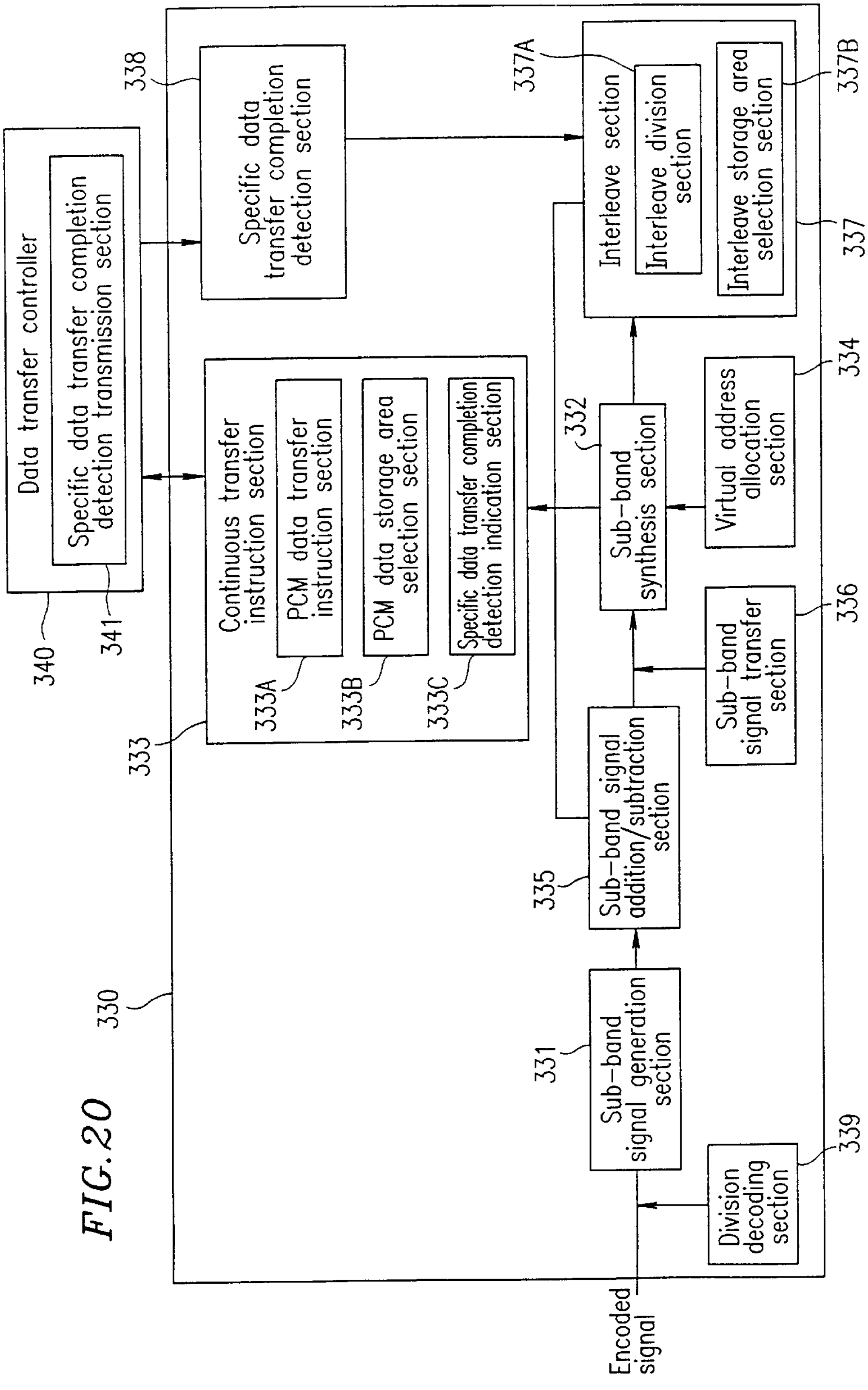
FIG. 20 is a block diagram illustrating an operation section in the device illustrated in FIG. 19.

FIG. 20 illustrates a configuration of the operation section 330. As illustrated in FIG. 20, the operation section 330 includes a sub-band signal generation section 331, a sub-band synthesis section 332, a continuous transfer instruction section 333, a virtual address allocation section 334, a sub-band signal addition/subtraction section 335, a sub-band signal transfer section 336, an interleave section 337, a specific data transfer completion detection section 338 and a division decoding section 339.

The sub-band signal generation section 331 decodes an externally input signal into a sub-band signal. The sub-band signal addition/subtraction section 335 performs a preparatory process for the sub-band signal prior to the sub-band synthesis operation in order to reduce the amount of calculation required for the sub-band synthesis (see Konstantinos Konstantinides, "Fast Subband Filtering in MPEG Audio Coding", IEEE 1994).

The sub-band synthesis section 332 performs a channel-by-channel sub-band synthesis filter operation using the sub-band synthesis filter data and the sub-band signals to generate an audio signal. The interleave section 337 takes samples of PCM data from the respective channels and rearranges them in a predetermined order. The interleave section 337 includes an interleave division section 337A and an interleave storage area selection section 337B. The interleave division section 337A divides the process into r steps, where r≧2.

In the present example, the interleave process is assumed to be performed in two steps (i.e., the first and second halves) as equally divided by the interleave division section 337A. The interleave storage area selection section 337B is for selectively using storage areas in the first memory section 310 for the interleave process depending upon whether the number of channels of the input audio coded signals to be decoded by the sub-band synthesis operation is even or odd. Specifically, when the number of channels to be decoded by the sub-band synthesis operation is even, the first memory area 311 is selected as the data storage area for the first half of the interleave process while the second memory area 312 is selected as the data storage area for the second half of the interleave process. When the number of channels to be decoded is odd, the second memory area 312 is selected as the data storage area for the first half of the interleave process while the first memory area 311 is selected as the data storage area for the second half of the interleave process.

The continuous transfer instruction section 333 specifies specific memory areas respectively in the first memory section 310 and the second memory section 320, and instructs the data transfer controller 340 to perform one or more data transfer operations. The continuous transfer instruction section 333 includes a PCM data transfer instruction section 333A, a PCM data transfer/storage area selection section 333B and a specific data transfer completion detection indication section 333C.

The PCM data transfer instruction section 333A instructs to transfer, between the first memory section 310 and the second memory section 320, t−2 channels of PCM data, out of the t channels of PCM data, which are decoded respectively in the first to (t−2)th sub-band synthesis operations, where the number of channels of the input audio signals to be decoded by the sub-band synthesis operation is t (t≧3). More specifically, the PCM data transfer instruction section 333A instructs to transfer the PCM data decoded respectively in the first to (t−2)th sub-band synthesis operations, along with the sub-band synthesis filter data of the respective channels, from the first memory section 310 to the second memory section 320. Moreover, the PCM data transfer instruction section 333A instructs to transfer, in parallel with the sub-band synthesis operation for the final channel, the PCM data decoded respectively in the first to (t−2)th sub-band synthesis operations from the second memory section 320 to the first memory section 310.

The PCM data storage area selection section 333B is for selectively using storage areas in the first memory section 310, to which PCM data is transferred, depending upon whether the number of channels of the audio coded signals to be decoded by the sub-band synthesis operation is even or odd, where the PCM data is transferred from the second memory section 320 to the first memory section 310 in parallel with the sub-band synthesis operation for the final channel at the PCM data transfer instruction section 333A. In the present example, the first memory area 311 is selected when the number of channels to be decoded is even, while the second memory area 312 is selected when the number of channels to be decoded is odd.

The specific data transfer completion detection indication section 333C notifies the data transfer controller 340 of the detected completion of the p'th (1≦p<q) transfer, where q (q>1) data transfer operations are performed between the first memory section 310 and the second memory section 320. In the present example, when it is instructed to transfer the sub-band synthesis filter data of the sub-band synthesis for the final channel from the first memory section 310 to the second memory section 320, the first transferred portion (corresponding to A2 in FIG. 10) of the sub-band synthesis filter data for the final channel is assumed to be the p'th transfer operation.

The sub-band signal transfer section 336 transfers some or all of the sub-band signals for a specific channel in the first memory section 310 to a specific area in the first memory section 310, only when the number of sub-band synthesis channels for the input audio coded data is 3 or more.

The specific data transfer completion detection section 338 receives, from the data transfer controller 340, a signal indicating the detected completion of the p'th (1≦p<q) transfer out of the q (q>1) data transfer operations between the first memory section 310 and the second memory section 320.

The virtual address allocation section 334 assumes a virtual address exists following the actual address at a termination point of each of the memory areas 311A and 312A, and allocates the start point of the virtual address to the actual address at the start of each of the memory areas 311A and 312A. The virtual address allocation section 334 further allocates virtual addresses to the subsequent actual addresses in this manner sequentially.

For the sub-band signal generation process, the sub-band synthesis process and the interleave process performed for decoding one frame of audio signals for each channel, the division decoding section 339 equally divides the processing unit, i.e., one frame, into y processing blocks (y≦2), and performs the sub-band synthesis process. When b denotes the number of sub-bands while c denotes the number of samples generated in one processing block, the number a of samples of PCM data generated for each channel in one frame is bxcxy. In this example, for simplicity of the description, y=6, and the processing unit in the divided processes is a block.

For example, as shown by the format described in ISO/IEC 11172-3:1993 and 13818-3:1996, the number of sub-bands for sub-band signals generated by the sub-band signal generation section 331 is 32 for each channel. The sample number of the sub-band signal samples in one frame is 1152 per channel. In the present example, since the sub-band signal generation process, the sub-band synthesis process and the interleave process performed for one frame for each channel are each divided into six processing blocks, the number of samples of sub-band signals and PCM data generated in one block is 192 (32x6) for each channel.

The data transfer controller 340 illustrated in FIG. 19 transfers data from the first memory section 310 to the second memory section 320 or from the second memory section 320 to the first memory section 310 based on the instructions from the continuous transfer instruction section 333. The data transfer controller 340 includes a specific data transfer completion detection transmission section 341 provided therein.

The specific data transfer completion detection transmission section 341, based on the instruction from the continuous transfer instruction section 333 detects completion of the p'th (1≦p<q) transfer out of the q (q>1) data transfer operations between the first memory section 310 and the second memory section 320.

The operation section 330 instructs data transfer between one of the memory areas 311 and 312 and the second memory section 320 externally connected to the processor. In parallel with the subsequent data transfer, the operation section performs operation processes. When the operation section 330 performs the sub-band synthesis process, the sub-band synthesis filter operation for one channel is performed using the other one of the memory areas. Moreover, for the operation processes, any of the memory areas 311, 312 and 313 may be used as long as the data transfer area in the first memory section 310 and the storage area for the calculated values do not overlap each other.

Thus, the generation of an audio signal and the transfer of the data are parallel-processed. For example, when the data transfer is performed between the first memory area 311 in the first memory section 310 and the second memory section 320, the operation section 330 performs the sub-band synthesis operation using the data in the second memory area 312 in the first memory section 310. When the data transfer is performed between the second memory area 312 and the second memory section 320, the operation section 330 performs the sub-band synthesis operation using the data in the first memory area 311.

In Example 5, the arrangement of the sub-band synthesis filter data generated per channel and the change over time are similar to those in Example 4 (FIGS. 9 to 11). The correspondence of the virtual addresses allocated to the first memory section 310 by the virtual address allocation section 334 in FIG. 20 with respect to the actual addresses is also similar to that in Example 4 (FIG. 12). Moreover, the operation described with reference to FIGS. 9 to 12 is the same as that illustrated in Example 4, and therefore will not be further described in the present example.

FIGS. 21 to 32 illustrate data transfer charts in accordance with the present example. Twelve transfer charts 1 to 12 are illustrated in detail.

The audio decoding device 300 having the above-described structure operates in the following manner.

First, when a bit stream (including encoded audio signals) of multi-channels of MPEG2 (five channels) is input, the operation section 330 gives the audio coded signals to the sub-band signal generation section 331, which decodes the signals into five-channel sub-band signals.

Figure 21:
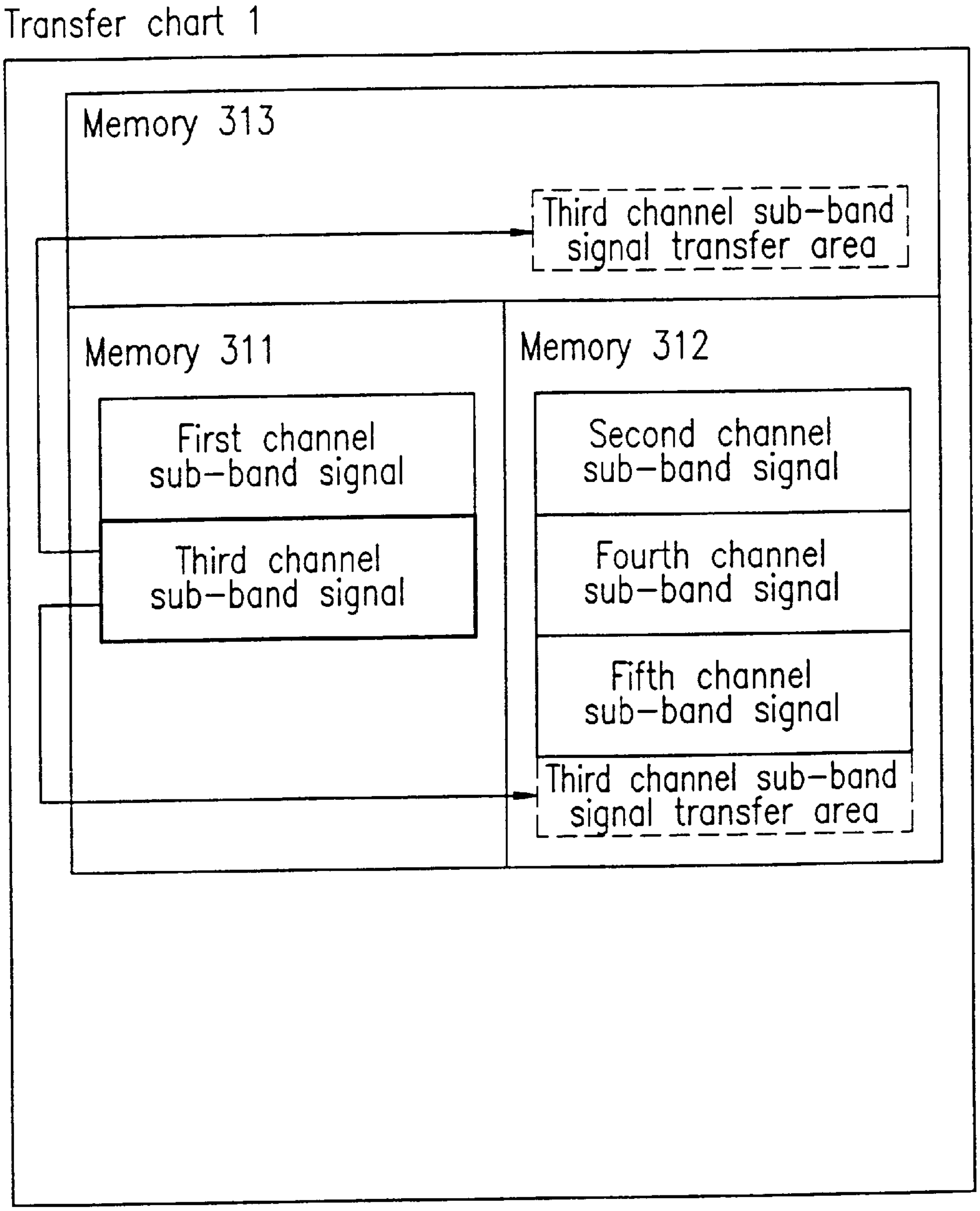
FIG. 21 is a timing chart (No. 1) for data transmission in the audio decoding device according to Example 5 of the present invention.

Transfer chart 1 of FIG. 21 illustrates data transfer within the first memory section 310. Then, the operation section 330 writes the sub-band signals for the i'th channel (i=1 in this example) into the memory area 311B, the sub-band signals for the j'th channel (j=2 in this example) into the memory area 312B, the sub-band signals for the k'th channel (k=3 in this example) into a part of the memory area 311A, and the sub-band signals for the l'th channel (1=4 in this example) and the sub-band signals for the m'th channel (m=5 in this example) respectively into parts of the memory area 312A.

Then, the operation section 330 requests the sub-band signal addition/subtraction section 335 to perform the addition/subtraction operation of the sub-band signals for the third channel. After the addition/subtraction operation of the sub-band signals for the third channel, the operation section 330 instructs the sub-band signal transfer section 336 to transfer the first half of the sub-band signals for the third channel, for which the addition/subtraction operation has been performed, to the memory area 312C and the second half thereof to the memory area 313C.

Figure 22:
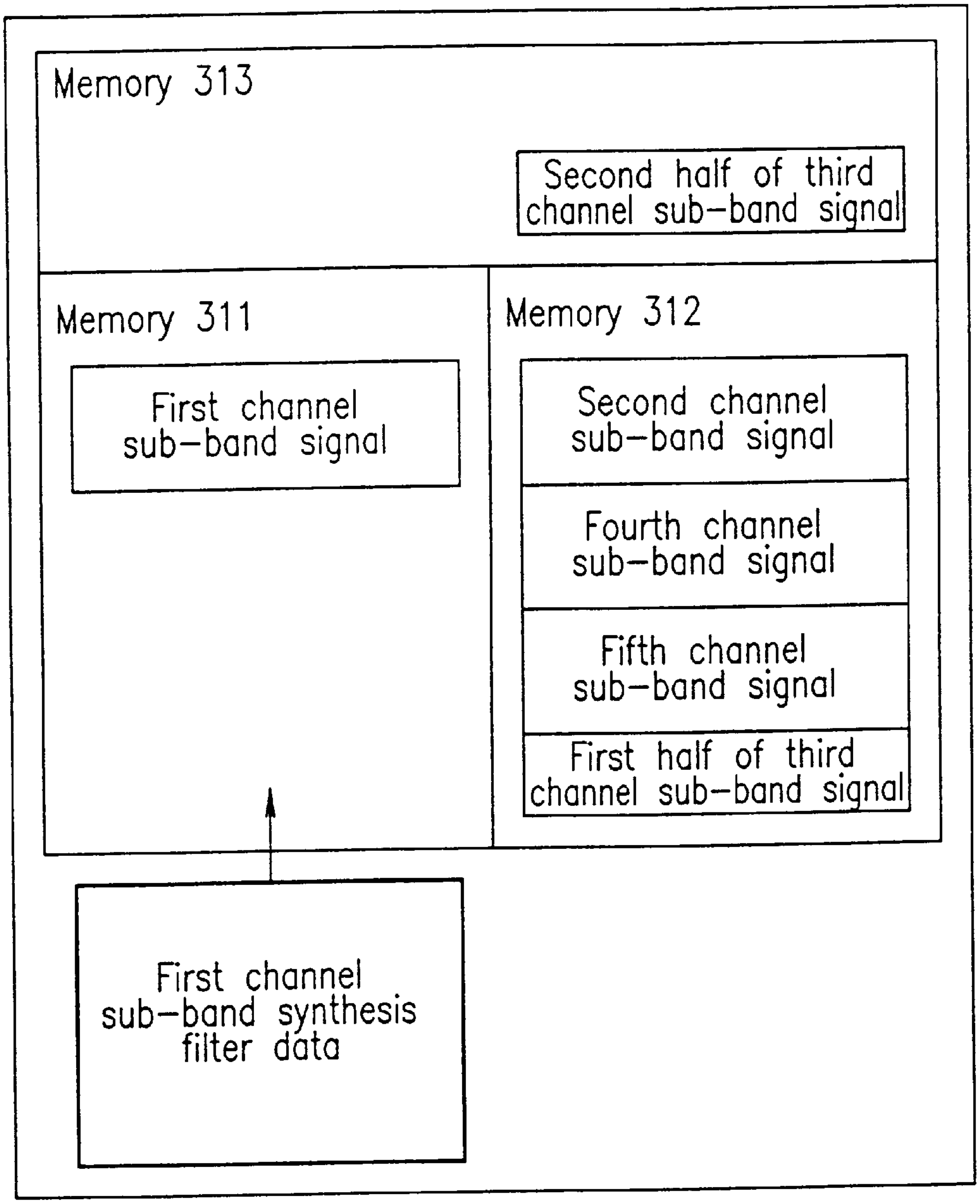
FIG. 22 is a timing chart (No. 2) for data transmission in the audio decoding device according to Example 5 of the present invention.

Transfer chart 2 of FIG. 22 illustrates data transfer in the addition/subtraction operation for the first, second, fourth and fifth channels of sub-band signals. The continuous transfer instruction section 333, based on the request from the operation section 330, instructs the data transfer controller 340 to transfer data in the following manner.

As illustrated in FIG. 22, the continuous transfer instruction section 333 instructs to transfer the sub-band synthesis filter data for the first channel stored in the memory area 321A in the second memory section 320 to the memory area 311A in the first memory section 310.

Thus, the data transfer controller 340 transfers the sub-band signal data for the first channel from the memory area 321A to the memory area 311A. When the data transfer is completed, the data transfer controller 340 notifies the operation section 330 of the completion of the transfer, via the specific data transfer completion detection transmission section 341.

Next, the operation section 330 requests the continuous transfer instruction section 333 to perform data transfer, while making the sub-band signal addition/subtraction section 335 start the addition/subtraction operation of the first, second, fourth and fifth channels of sub-band signals. Thus, the operation section 330 transfers the sub-band synthesis filter data for the first channel from the memory area 321A to the memory area 311A while the addition/subtraction operation of the first, second, fourth and fifth channels of sub-band signals is performed in parallel.

Figure 23:
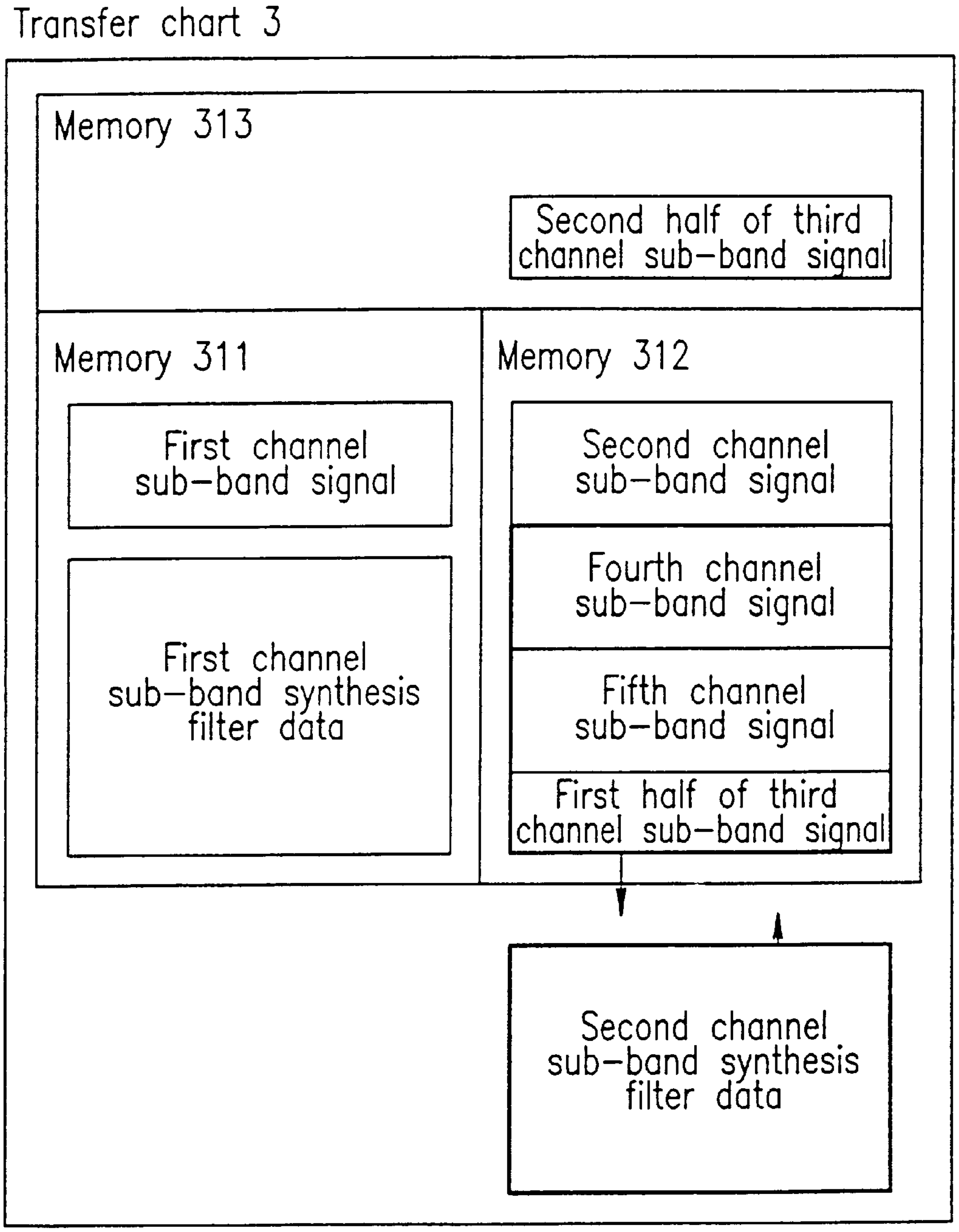
FIG. 23 is a timing chart (No. 3) for data transmission in the audio decoding device according to Example 5 of the present invention.

Transfer chart 3 of FIG. 23 illustrates data transfer in the synthesis operation for the first channel of sub-band signals. When the operation section 330 is notified of the completion of transfer after the completion of the addition/subtraction operation of the first, second, fourth and fifth channels of sub-band signals, the operation section 330 requests the continuous transfer instruction section 333 to transfer data in the following manner.

As illustrated in FIG. 23, the operation section 330 instructs to transfer the sub-band signals for the fourth and fifth channels and the first half of the sub-band signals for the third channel stored in the memory area 321A respectively to the memory areas 324B, 325B and 323B in the second memory section 320. Then, the operation section 330 instructs to transfer the sub-band synthesis filter data for the second channel stored in the memory area 322A to the memory area 312A.

In parallel with this, the operation section 330 starts the sub-band synthesis filter operation of the first channel by the sub-band synthesis section 332 using the data in the first memory area 311. At this point, as in Example 4, the sub-band synthesis filter data in the data area 222-1 (FIG. 9) is updated. In other words, the data at addresses 0x680 through 0x6ff in the first memory area 311 is updated. After that, the 32-sample audio signals are obtained by performing the multiply-accumulate operation, as in the expressions (6) and (7), 16 times.

In order to uniformize the order of assignment of the window coefficient, the sub-band synthesis data used in the operation is assigned sequentially sample by sample, starting from the newly updated sample. Specifically, one sample corresponding to 1/16 of the newly-updated sub-band synthesis filter data, i.e., the data in the data area 201, is first assigned, and next one sample corresponding to 1/16 of the sub-band synthesis filter data updated by the immediately previous operation, i.e., the data in the data area 216, is then assigned, and so on, for the data in the data area 215, 214 . . . to 203 and 202.

When the sub-band synthesis filter data in the data area 206 and later (0x400-) is assigned after the sub-band synthesis filter data in the data area 207 (0xb80 through 0xbff) is assigned, circulating address processing is required on the actual addresses in order to set the addresses. The circulating address processing is performed by the following AND operation. Where the address before conversion is A, the address after the conversion B is:

$$B=\{(A-0x400)\times(0x7ff)\}+0x400$$

where × represents the AND operation.

However, the operation section 330 in this example includes the virtual address allocation section 334 and thus does not require the circulating address processing including the AND operation. The data up to sub-band synthesis filter data at the actual addresses 0x400 through 0x7ff, i.e., data areas 206 through 201, 216 and 215 can be allocated using the virtual addresses 0xc00 through 0xfff.

In the subsequent sub-band synthesis filter operation also, as shown in the rectangular area 222-2 (FIG. 9), the data in the data area 202 is updated, and the multiply-accumulate operation is performed using the sub-band synthesis filter data in the data areas 201, 216 through 207, and 206 through 202, thereby obtaining an audio signal.

Furthermore, also in the subsequent sub-band synthesis filter operation, as shown in the rectangular area 222-3 (FIG. 9), the data in the data area 203 is updated, and the multiply-accumulate operation is performed using the sub-band synthesis filter data in the data areas 202 and 201, 216 through 207, and 206 through 203, thereby obtaining an audio signal.

Also in the sixth sub-band synthesis filter operation immediately before the transfer of the audio signal, as shown in the rectangular area 222-6 (FIG. 9), the data in the data area 206 is updated, and the multiply-accumulate operation is performed using the sub-band synthesis filter data in the data areas 205 through 201, 216 through 207 and 206, thereby obtaining an audio signal. As described above, the multiply-accumulate operation with the window coefficient can be performed without circulating address processing in any of the sub-band synthesis filter operation performed six times.

Figure 24:
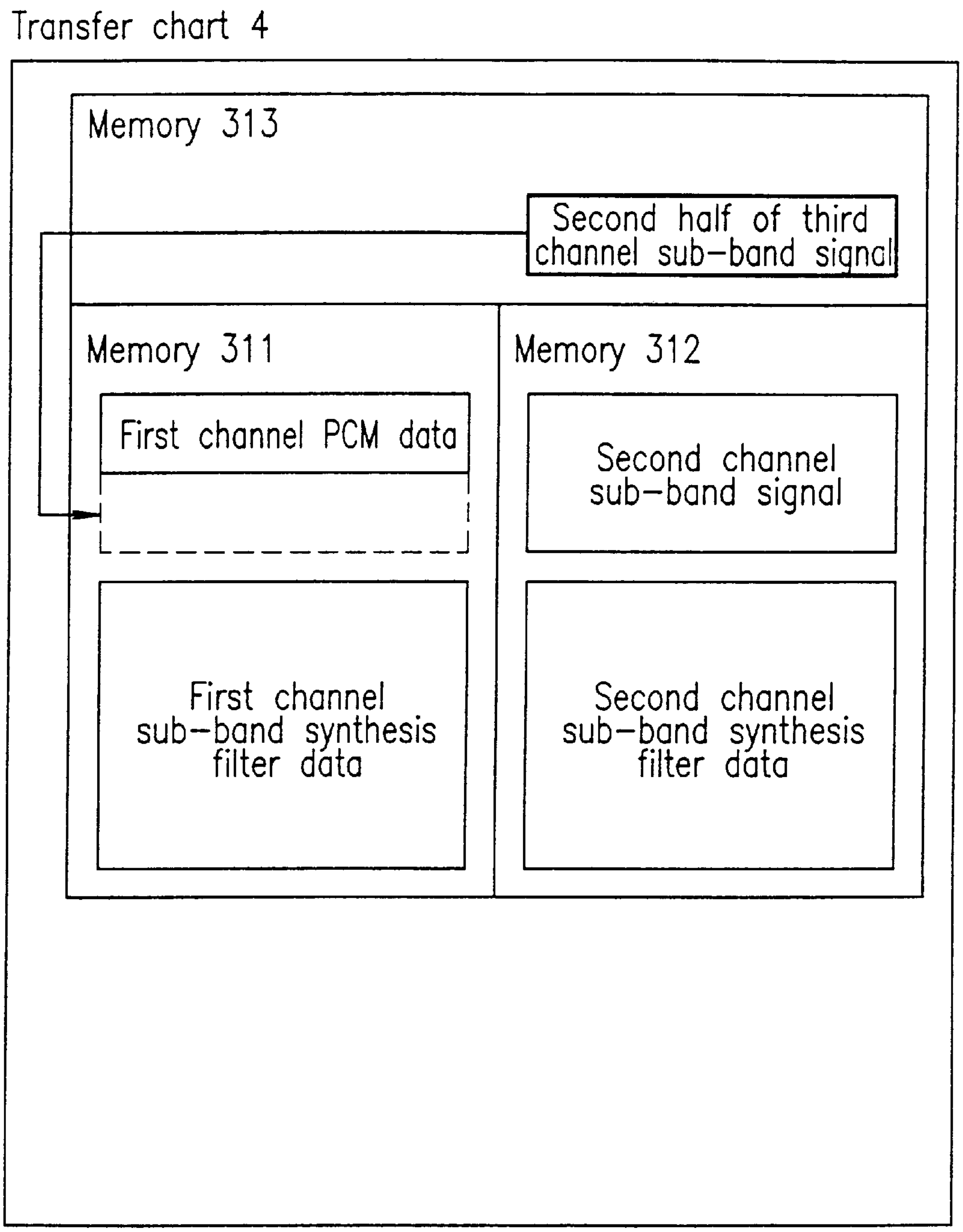
FIG. 24 is a timing chart (No. 4) for data transmission in the audio decoding device according to Example 5 of the present invention.

Transfer chart 4 of FIG. 24 illustrates data transfer of the second half of the sub-band signals for the third channel within the first memory section 310. After the completion of the sub-band synthesis operation for the first channel, the operation section 330 instructs the sub-band signal transfer section 336 to transfer the second half data of the sub-band signals for the third channel stored in the memory area 313C in the first memory section 310 to the second half of the memory area 311B. The first channel PCM data decoded in the sub-band synthesis operation for the first channel in the data area 311B and the second half of the third channel sub-band signals are located so as not to overlap each other.

On the other hand, the data transfer controller 340 performs data transfer while the operation section 330 performs the sub-band synthesis filter operation and, when the transfer is completed, notifies the operation section 330 of the completion of the transfer.

When both the data transfer and the sub-band synthesis filter operation for the first channel are completed, the continuous transfer instruction section 333 instructs the data transfer controller 340 to transfer data in the following manner based on the request from the operation section 330.

Figure 25:
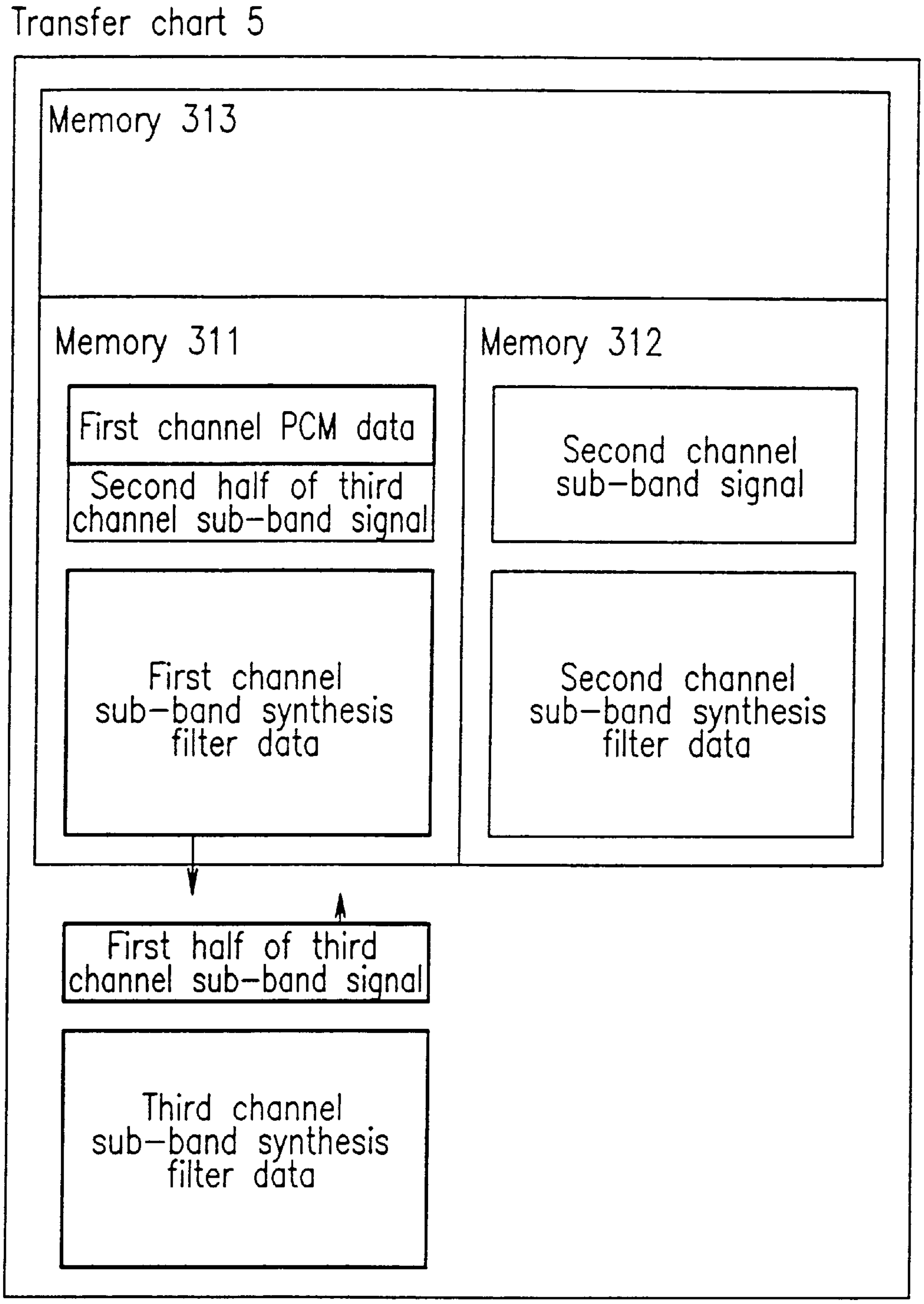
FIG. 25 is a timing chart (No. 5) for data transmission in the audio decoding device according to Example 5 of the present invention.

Transfer chart 5 of FIG. 25 illustrates data transfer in the sub-band synthesis operation for the second channel. As illustrated in FIG. 25, the continuous transfer instruction section 333 instructs to transfer the sub-band synthesis filter data for the first channel stored in the memory area 311A in the first memory section 310 to the memory area 312A in the second memory section 320.

Then, the continuous transfer instruction section 333 instructs the PCM data transfer instruction section 333A to transfer the PCM data for the first channel stored in the memory area 311B in the first memory section 310 to the memory area 321C in the second memory section 320.

Moreover, the continuous transfer instruction section 333 instructs to transfer the sub-band synthesis filter data for the third channel stored in the memory area 323A in the second memory section 320 to the memory area 311A in the first memory section 310. The continuous transfer instruction section 333 also instructs to transfer the first half of the sub-band signals for the third channel stored in the memory area 323B in the second memory section 320 to the first half of the memory area 311B in the first memory section 310.

The first half of the sub-band signals for the third channel which is transferred to the memory area 311B is located to be consecutive and not to overlap with the second half of the sub-band signals for the third channel, which have already been transferred and located. Then, the sub-band synthesis section 332 starts the sub-band synthesis filter operation for the second channel using the data in the second memory area 312.

The data transfer of the sub-band synthesis filter data for the first channel is performed between 222-6 (FIG. 9) and 222-7 (FIG. 10). The area 200 is divided into A1 including the data areas 206 through 201 and 216 through 213 and A2 including the data areas 212 through 207, and the data in one of them is first transferred and the data in the other is then transferred. By such an operation, the order of assigning the addresses of the sub-band synthesis filter data for the subsequent transfer of the data for the first channel is exactly the same as that of the previous transfer.

At this stage, the sub-band synthesis filter operation for the second channel is performed in the same manner as that for the first channel using the second memory area 312. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 26:
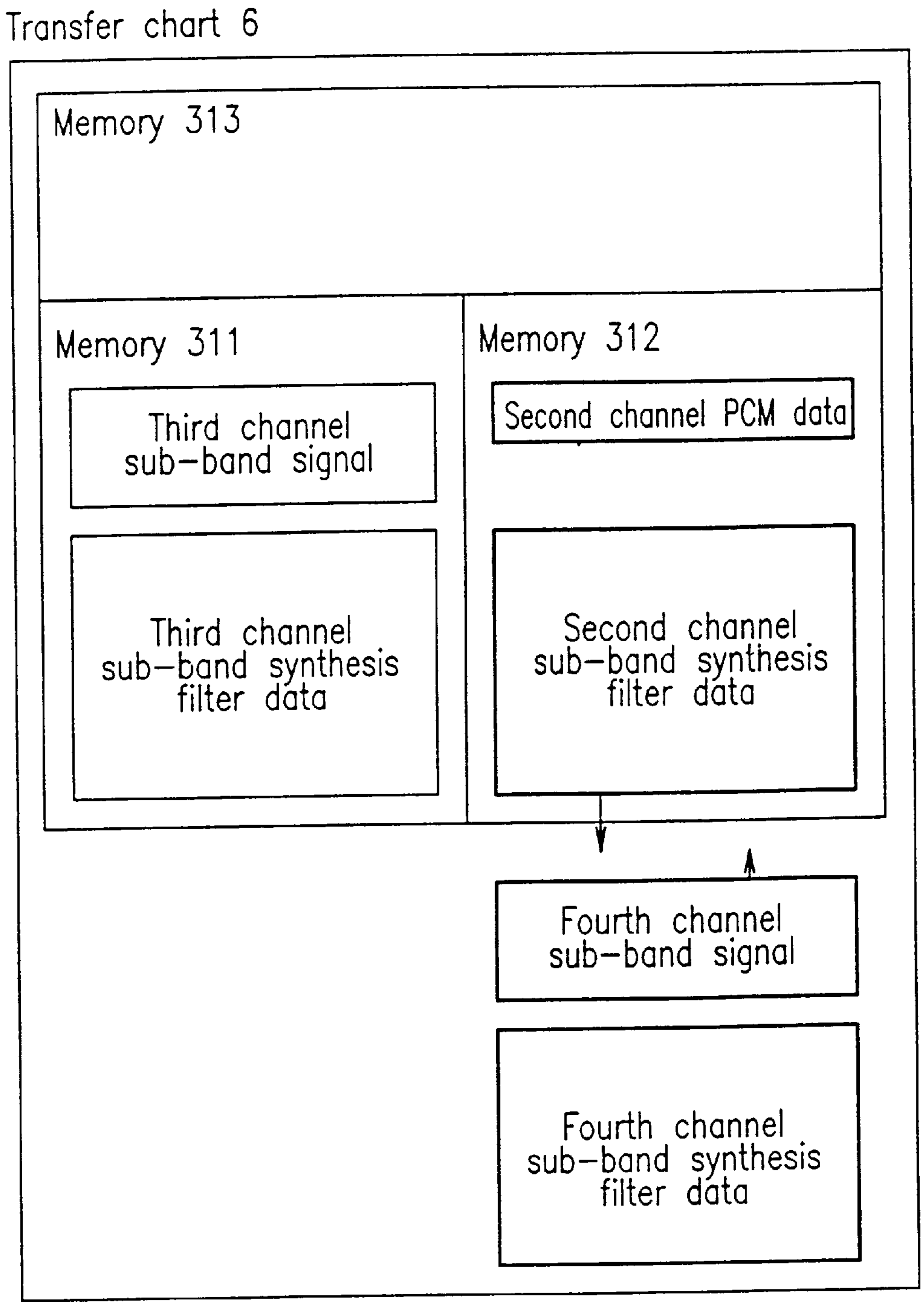
FIG. 26 is a timing chart (No. 6) for data transmission in the audio decoding device according to Example 5 of the present invention.

Transfer chart 6 of FIG. 26 illustrates data transfer in the sub-band synthesis operation for the third channel. When both the data transfer and the sub-band synthesis filter operation for the second channel are completed, the operation section 330 requests the continuous transfer instruction section 333 to transfer data in the following manner.

As shown in transfer chart 6 (FIG. 26), the continuous transfer instruction section 333 instructs to transfer the sub-band synthesis filter data for the second channel stored in the memory area 312A in the first memory section 310 to the memory area 322A in the second memory section 320.

Next, the continuous transfer instruction section 333 instructs the PCM data transfer instruction section 333A to transfer the PCM data for the second channel stored in the memory area 312B in the first memory section 310 to the memory area 322C in the second memory section 320.

Moreover, the continuous transfer instruction section 333 instructs to transfer the sub-band synthesis filter data for the fourth channel stored in the memory area 324A in the second memory section 320 to the memory area 312A in the first memory section 310.

Then, the continuous transfer instruction section 333 instructs to transfer the sub-band signals for the fourth channel stored in the memory areas 324B to the memory area 312B in the first memory section 310.

In parallel with the above transfer operation, the sub-band synthesis section 332 starts the sub-band synthesis filter operation for the third channel using the data in the memory area 311.

The data transfer of the sub-band synthesis filter data for the second channel is performed between 222-6 (FIG. 9) and 222-7 (FIG. 10) in the same manner as that for the first channel. The area 200 is divided into A1 including the data areas 206 through 201 and 216 through 213 and A2 including the data areas 212 through 207, and the data in one of them is first transferred and the data in the other is then transferred.

At this stage, the sub-band synthesis filter operation for the third channel is performed in the same manner as that for the first or second channel using the memory area 311. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 27:
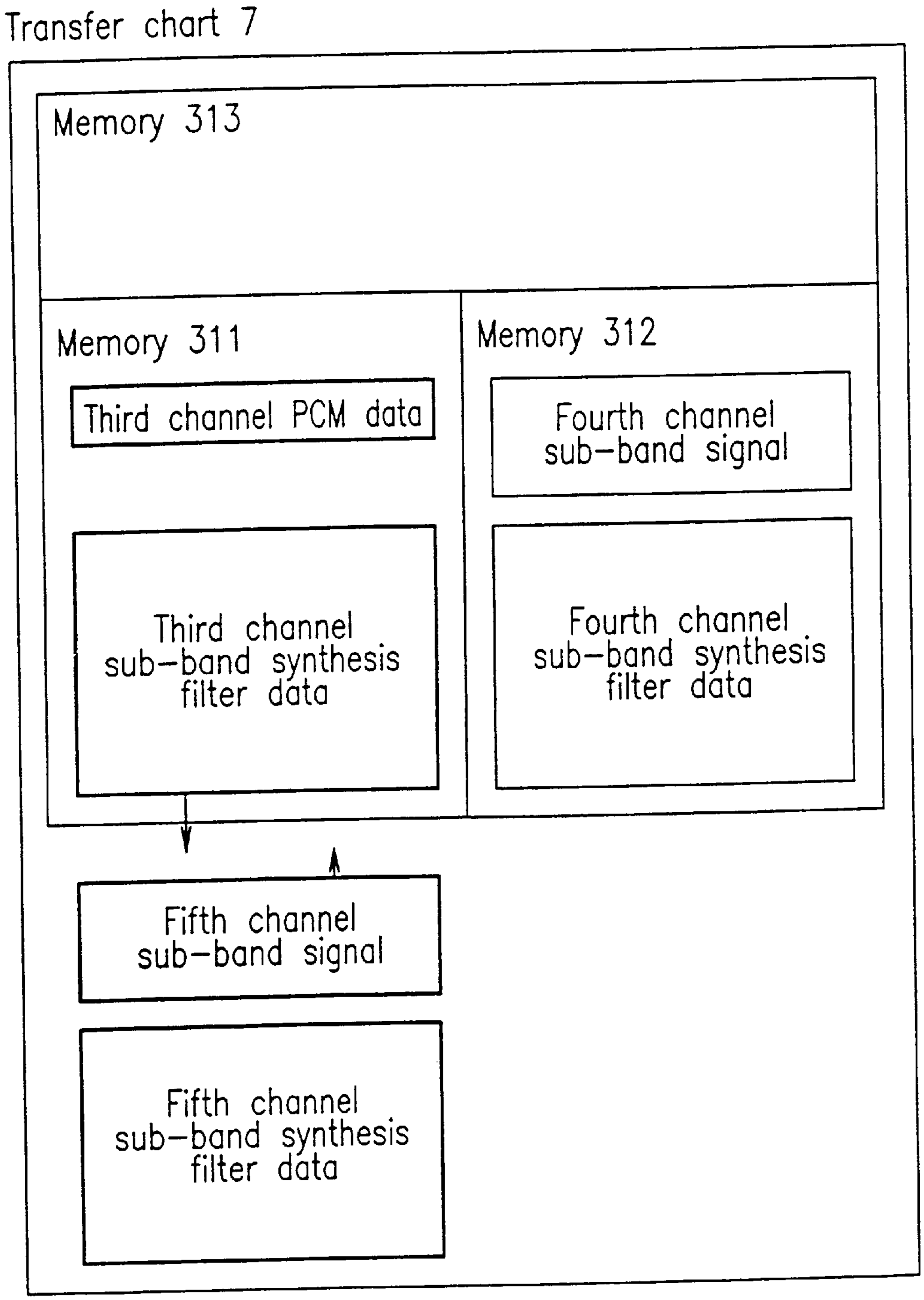
FIG. 27 is a timing chart (No. 7) for data transmission in the audio decoding device according to Example 5 of the present invention.

Transfer chart 7 of FIG. 27 illustrates data transfer in the sub-band synthesis operation for the fourth channel. When both the data transfer and the sub-band synthesis filter operation for the third channel are completed, the operation section 330 requests the continuous transfer instruction section 333 to transfer data in the following manner.

As shown in transfer chart 7 (FIG. 27), the continuous transfer instruction section 333 instructs to transfer the sub-band synthesis filter data for the third channel stored in the memory area 311A in the first memory section 310 to the memory area 323A in the second memory section 320.

Next, the continuous transfer instruction section 333 instructs the PCM data transfer instruction section 333A to transfer the PCM data for the third channel stored in the memory area 311B in the first memory section 310 to the memory area 323C in the second memory section 320.

Moreover, the continuous transfer instruction section 333 instructs to transfer the sub-band synthesis filter data for the fifth channel stored in the memory area 325A in the second memory section 320 to the memory area 311A in the first memory section 310.

Then, the continuous transfer instruction section 333 instructs to transfer the sub-band signals for the fifth channel stored in the memory areas 325B to the memory area 311B in the first memory section 310.

In parallel with the above transfer operation, the sub-band synthesis section 332 starts the sub-band synthesis filter operation for the fourth channel using the data in the memory area 312.

The data transfer of the sub-band synthesis filter data for the third channel is performed between 222-6 (FIG. 9) and 222-7 (FIG. 10) in the same manner as that for the first or second channel. The area 200 is divided into A1 including the data areas 206 through 201 and 216 through 213 and A2 including the data areas 212 through 207, and the data in one of them is first transferred and the data in the other is then transferred.

At this stage, the sub-band synthesis filter operation for the fourth channel is performed in the same manner as that for the first, second or third channel using the memory area 312. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 28:
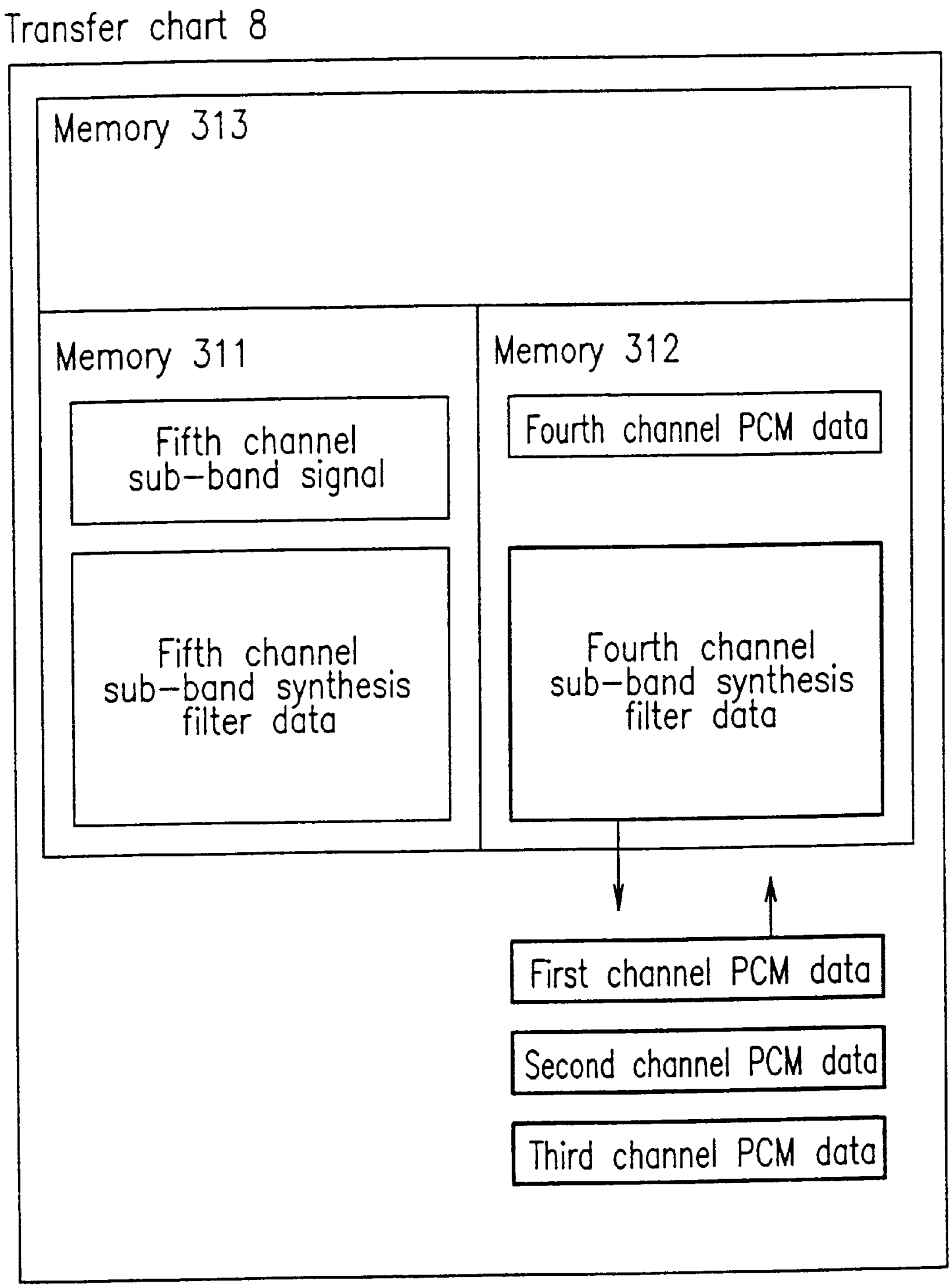
FIG. 28 is a timing chart (No. 8) for data transmission in the audio decoding device according to Example 5 of the present invention.

Transfer chart 8 of FIG. 28 illustrates data transfer in the sub-band synthesis operation for the fifth channel. When both the data transfer and the sub-band synthesis filter operation for the fourth channel are completed, the operation section 330 requests the continuous transfer instruction section 333 to transfer data in the following manner.

As shown in transfer chart 8 (FIG. 28), the continuous transfer instruction section 333 instructs to transfer the sub-band synthesis filter data for the fourth channel stored in the memory area 312A in the first memory section 310 to the memory area 324A in the second memory section 320.

Next, the continuous transfer instruction section 333 instructs a data transform operation, by the PCM data transfer instruction section 333A and the PCM data storage area selection section 333B, of the PCM data for the first, second and third channels from the memory areas 321C, 322C and 323C in the second memory section 320 to the first memory section 310.

In the present example, since the number of channels to be decoded by the sub-band synthesis operation is odd, the PCM data storage area selection section 333B selects an area in the memory area 312 subsequent to the storage area for the fourth channel PCM data as the storage area for the PCM data.

In parallel with the above transfer operation, the sub-band synthesis section 332 starts the sub-band synthesis filter operation for the fifth channel using the data in the memory area 311.

The data transfer of the sub-band synthesis filter data for the fourth channel is performed between 222-6 (FIG. 9) and 222-7 (FIG. 10) in the same manner as that for the first, second or third channel. The area 200 is divided into A1 including the data areas 206 through 201 and 216 through 213 and A2 including the data areas 212 through 207, and the data in one of them is first transferred and the data in the other is then transferred.

At this stage, the sub-band synthesis filter operation for the fifth channel is performed in the same manner as that for the first, second, third or fourth channel using the memory area 311. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 29:
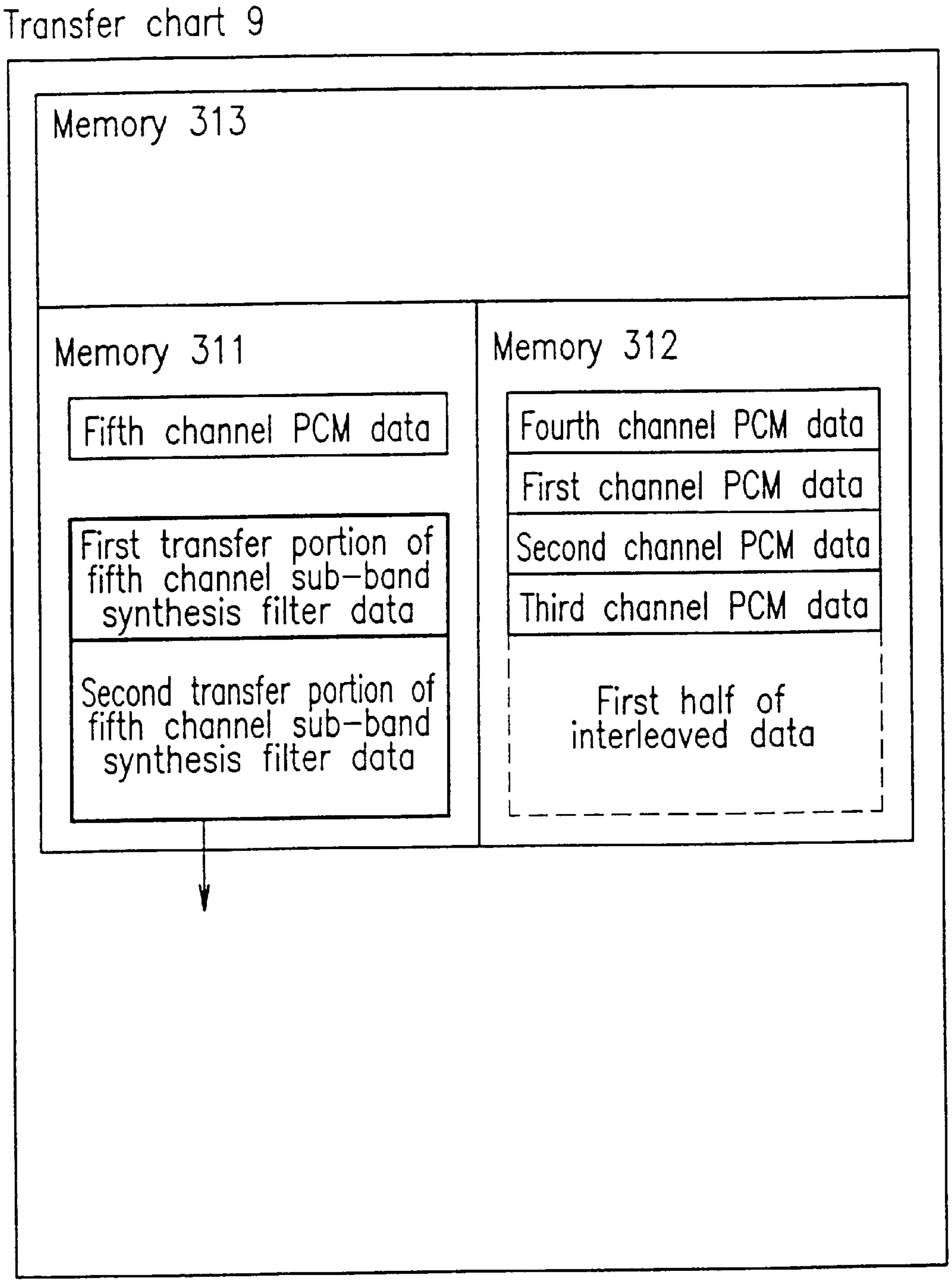
FIG. 29 is a timing chart (No. 9) for data transmission in the audio decoding device according to Example 5 of the present invention.

Transfer chart 9 of FIG. 29 illustrates data transfer in the first half of the interleave operation. When both the data transfer and the sub-band synthesis filter operation for the fifth channel are completed, the operation section 330 requests the continuous transfer instruction section 333 to transfer data in the following manner.

As shown in transfer chart 9 (FIG. 29), the continuous transfer instruction section 333 instructs to transfer the sub-band synthesis filter data for the fifth channel stored in the memory area 311A in the first memory section 310 to the memory area 325A in the second memory section 320.

The data transfer of the sub-band synthesis filter data for the fifth channel is performed between 222-6 (FIG. 9) and 222-7 (FIG. 10) in the same manner as that for the first, second, third or fourth channel. The area 200 is divided into A1 including the data areas 206 through 201 and 216 through 213 and A2 including the data areas 212 through 207, and the data in one of them is first transferred and the data in the other is then transferred.

The fifth channel is the final channel for the sub-band synthesis operation, and the sub-band synthesis filter data for the final channel is transferred in two steps. The completion of the transfer of the first transfer portion illustrated in FIG. 29 is detected by the specific data transfer completion detection indication section 333C, and the data transfer controller 340 is requested to perform a data transfer operation.

In parallel with the above transfer operation, the interleave section 337 starts an interleave operation with the PCM data for the first, second, third and fourth channels stored in the memory area 312 and the PCM data for the fifth channel stored in the memory area 311.

The interleave operation by the interleave section 337 is performed in two steps as divided by the interleave division section 337A. In particular, the first half of the interleave operation is performed with the first 96 samples (i.e., the first half) of the 192 samples of the PCM data for each channel, and then the second half of the interleave operation is performed with the latter 96 samples (i.e., the second half) thereof.

The interleave operation illustrated in transfer chart 9 (FIG. 29) corresponds to the first half of the divided interleave operation. Since the number of channels to be decoded by the sub-band synthesis operation is odd in the present example, the interleave storage area selection section 337B selects an area in the memory area 312 subsequent to the PCM data storage area as the storage area for the first half of the interleaved data.

The data transfer controller 340 performs data transfer while the interleave section 337 performs the first half of the interleave operation. When the first transfer portion of the sub-band synthesis filter data for the fifth channel has been transferred, the specific data transfer completion detection transmission section 341 detects the completion of the transfer of the first transfer portion of the sub-band synthesis filter data for the fifth channel. Then, after the section 341 transmits a signal indicating the detection of the completion to the operation section 330, a data transfer operation for the second transfer portion of the sub-band synthesis filter data for the fifth channel is started.

Figure 30:
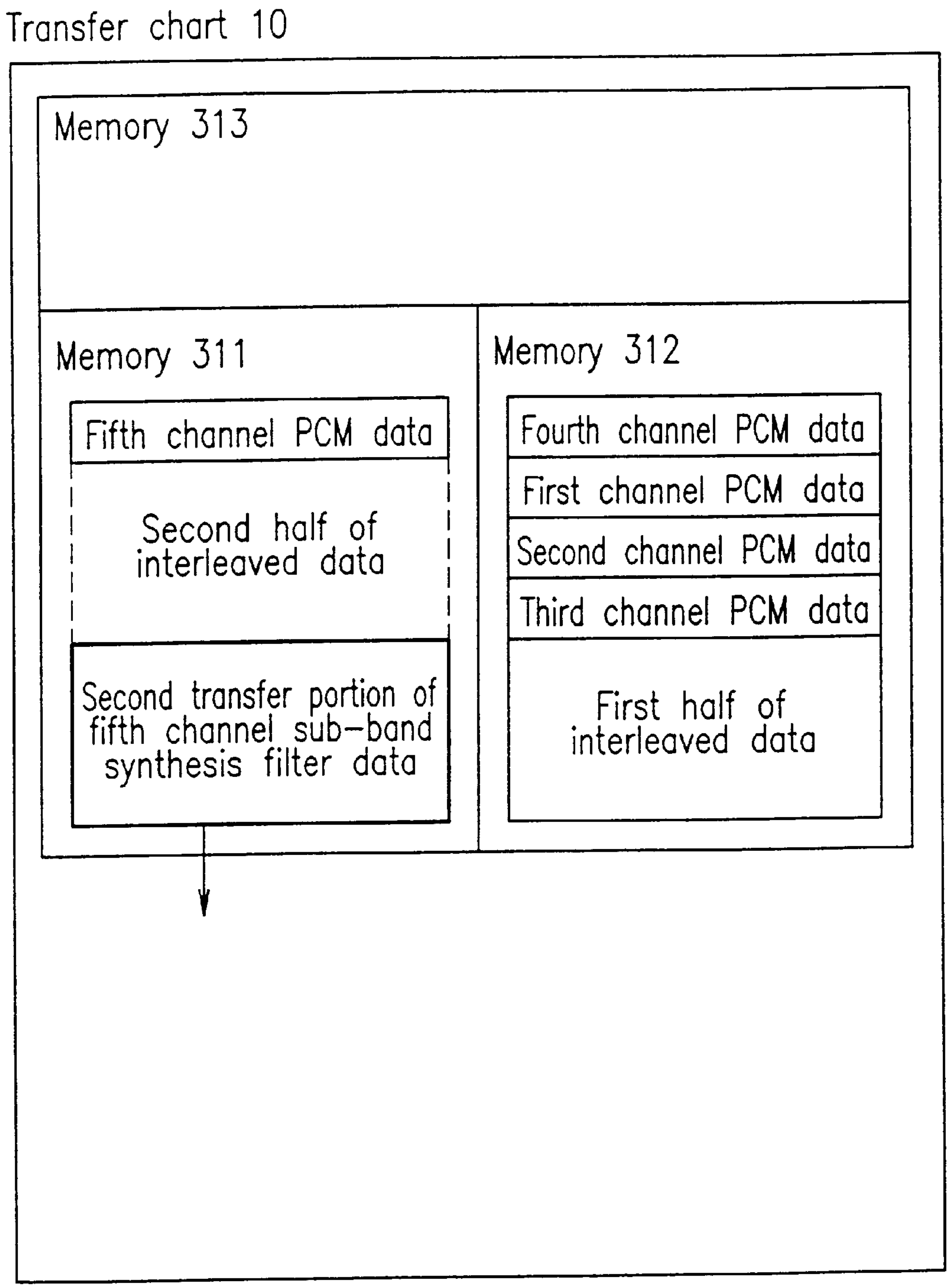
FIG. 30 is a timing chart (No. 10) for data transmission in the audio decoding device according to Example 5 of the present invention.

Transfer chart 10 of FIG. 30 illustrates data transfer in the second half of the interleave operation. The operation section 330 detects completion of the first half of the interleave operation by the interleave section 337 and the completion of the transfer of the first transfer portion of the sub-band synthesis filter data for the fifth channel by the specific data transfer completion detection section 338. Then, the operation section 330 resumes the interleave operation by the interleave section 337.

The interleave operation illustrated in transfer chart 10 (FIG. 30) corresponds to the second half of the divided interleave operation. Since the number of channels to be decoded by the sub-band synthesis operation is odd in the present example, the interleave storage area selection section 337B selects an area in the memory area 311 subsequent to the fifth channel PCM data storage area as the storage area for the second half of the interleaved data.

Figure 31:
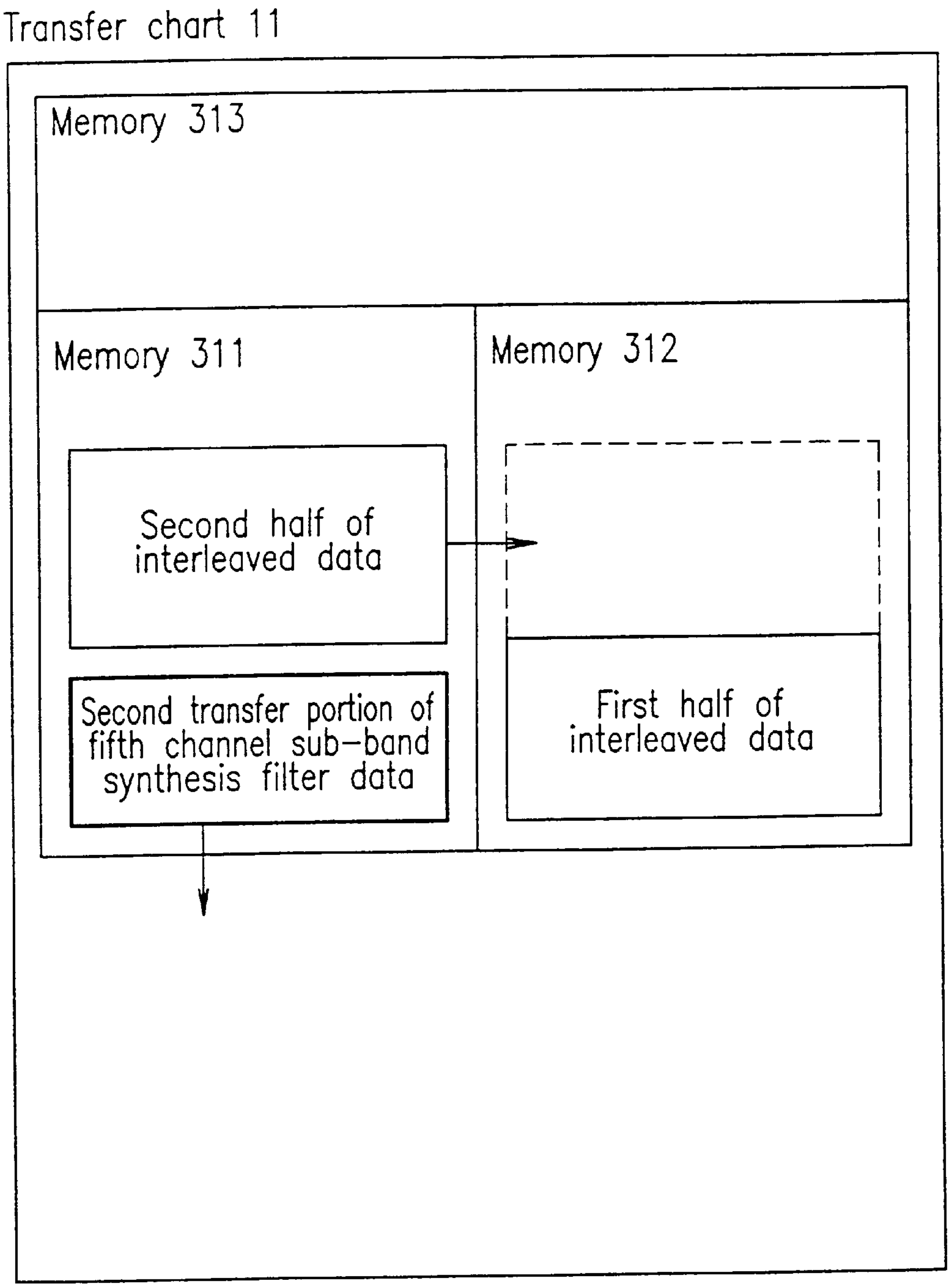
FIG. 31 is a timing chart (No. 11) for data transmission in the audio decoding device according to Example 5 of the present invention.

Transfer chart 11 of FIG. 31 illustrates data transfer in the first memory section 310. When the second half of the interleave operation by the interleave section 337 is completed, the operation section 330 transfers the second half of the interleaved data stored in the memory area 311 in the first memory section 310 to the memory area 312, as illustrated in FIG. 31.

Figure 32:
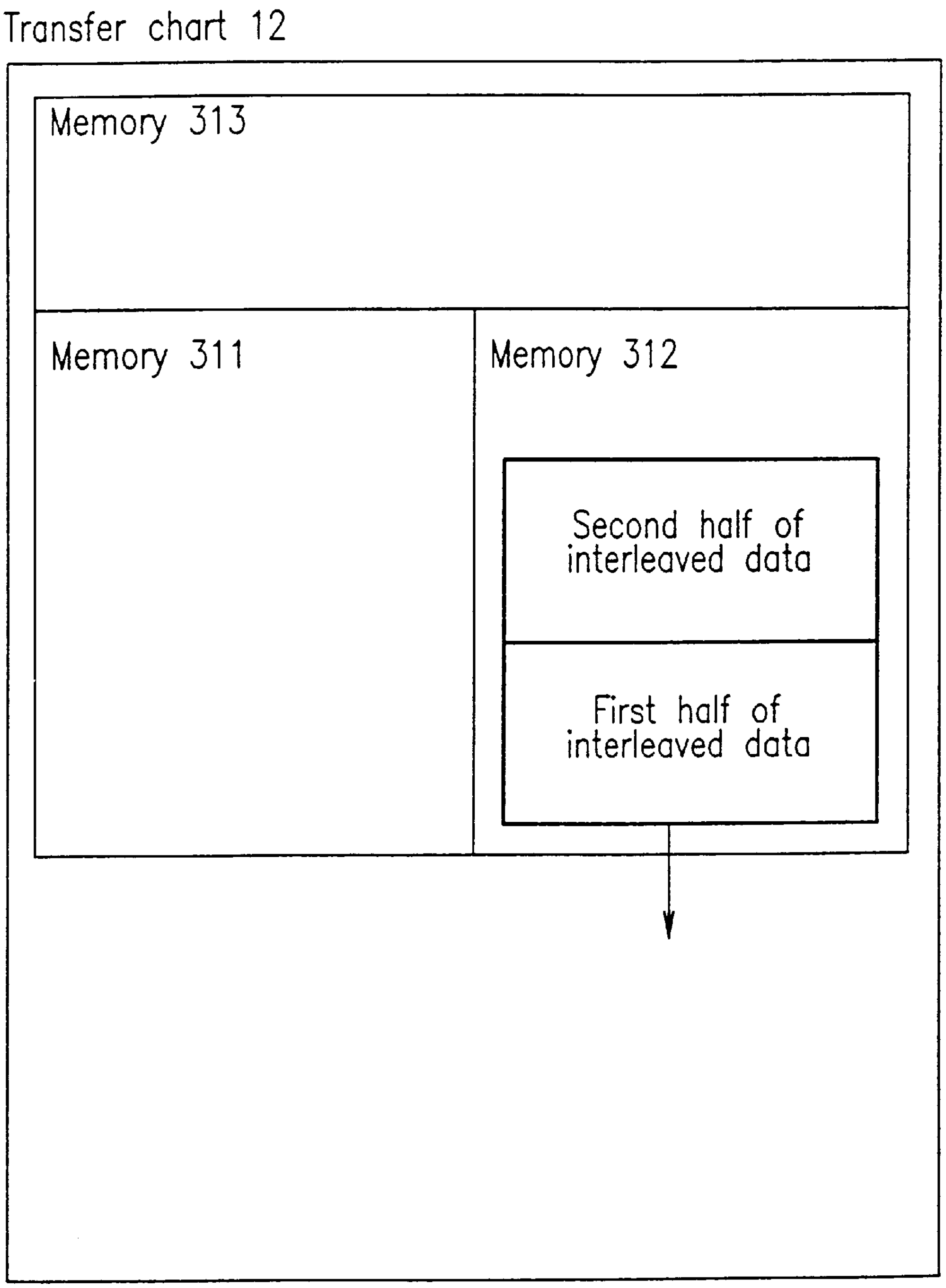
FIG. 32 is a timing chart (No. 12) for data transmission in the audio decoding device according to Example 5 of the present invention.

Transfer chart 12 of FIG. 32 illustrates data transfer of the interleaved data. When the second half of the interleaved data has been transferred to the memory area 312, the operation section 330 requests the continuous transfer instruction section 333 to transfer data in the following manner.

As illustrated in FIG. 32, the continuous transfer instruction section 333 instructs to transfer the interleaved data stored in the memory area 312 in the first memory section 310 to the memory area 326 in the second memory section 320.

The data transfer of the interleaved data is performed in two steps (i.e., the first and second halves). One of the first and second halves of the interleaved data is first transferred and the other half thereof is then transferred. The first half of the interleaved data is stored in the first half of the memory area 326 in the second memory section 320 while the second half of the interleaved data is stored in the second half of the memory area 326 in the second memory section 320.

EXAMPLE 6

An audio decoding device of Example 6 receives coded signals for multi-channels (four channels) of the layer 2 of MPEG2 and decodes the coded signals into an audio signal. The layer 2 of MPEG2 is described in detail in ISO/IEC 11172-3:1993 and 13818-3:1996.

The configuration of the decoding device of Example 6 is similar to that of Example 5 illustrated in FIGS. 19 and 20, and the only difference therebetween is the number of channels. Therefore, the configuration of the decoding device of Example 6 will not be described below.

In Example 6, the arrangement of the sub-band synthesis filter data generated per channel and the change over time are similar to those in Example 4 (FIGS. 9 to 11). The correspondence of the virtual addresses allocated to the first memory section 310 by the virtual address allocation section 334 in FIG. 20 with respect to the actual addresses is also similar to that in Example 4 (FIG. 12).

The operation of the decoding device of Example 6 will be described with reference to data transfer charts illustrated in FIGS. 33 to 43.

First, when a bit stream (including encoded audio signals) of multi-channels of MPEG2 (four channels) is input, the operation section 330 gives the encoded audio signals to the sub-band signal generation section 331, which decodes the encoded audio signals into four-channel sub-band signals. Then, the sub-band signals for the i'th channel (i=1 in this example) are written into the memory area 311B, and the sub-band signals for the j'th channel (j=2 in this example) are written into the memory area 312B. The sub-band signals for the k'th channel (k=3 in this example) are written into a part of the memory area 311A, and the sub-band signals for the l'th channel (1=4 in this example) are written into a part of the memory area 312A.

Figure 33:
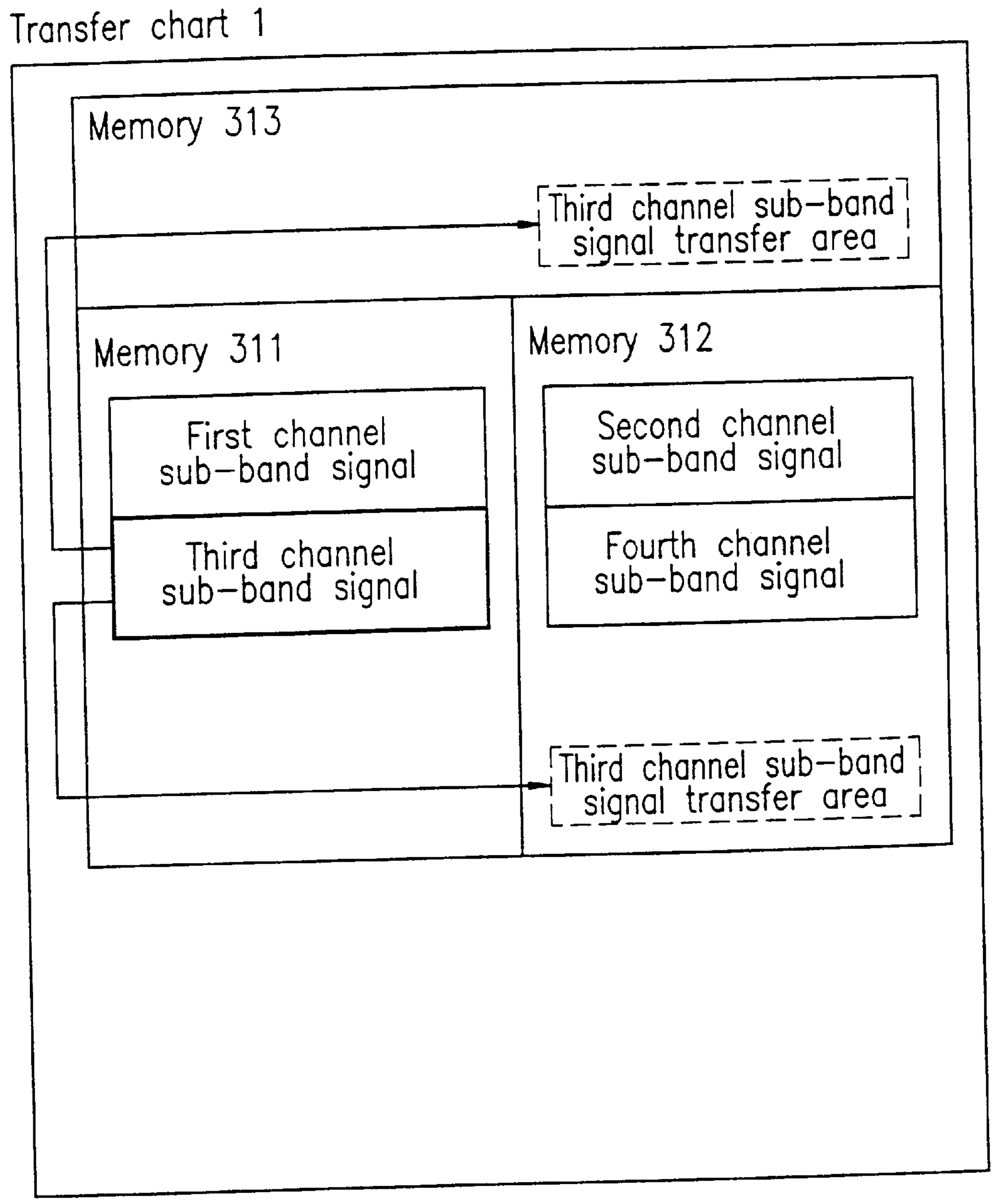
FIG. 33 is a timing chart (No. 1) for data transmission in the audio decoding device according to Example 6 of the present invention.

Transfer chart 1 of FIG. 33 illustrates data transfer within the first memory section 310 in the addition/subtraction operation of the sub-band signals for the third channel. The operation section 330 requests the sub-band signal addition/subtraction section 335 to perform an addition/subtraction of the sub-band signals for the third channel. Then, after the addition/subtraction operation of the sub-band signals for the third channel has been performed, the operation section 330 instructs the first half of the third channel sub-band signals, for which the addition/subtraction operation has been performed, to the memory area 312C and the second half thereof to the memory area 313C.

Figure 34:
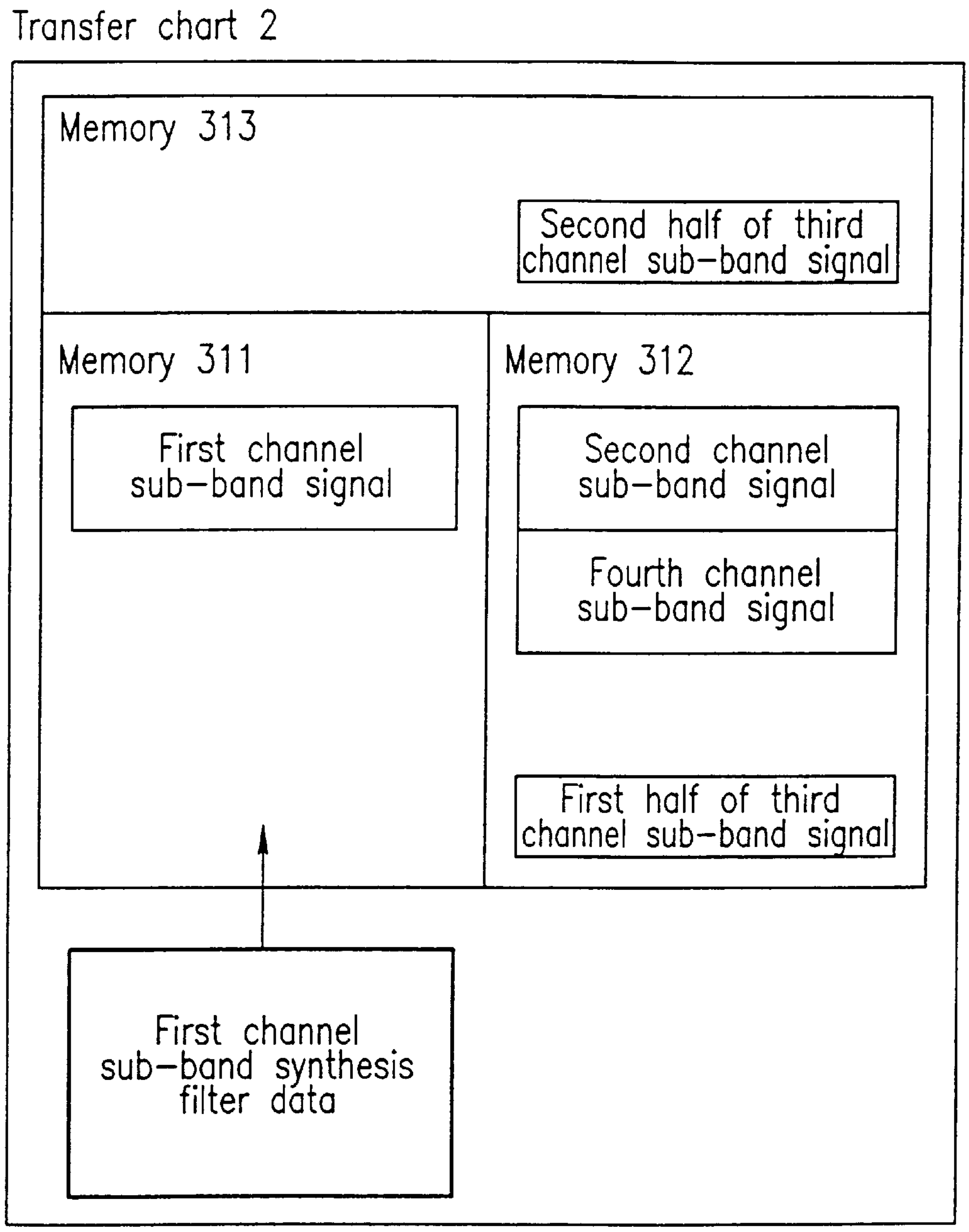
FIG. 34 is a timing chart (No. 2) for data transmission in the audio decoding device according to Example 6 of the present invention.

Transfer chart 2 of FIG. 34 illustrates data transfer in the addition/subtraction operation for the first, second and fourth channels of sub-band signals. The continuous transfer instruction section 333, based on the request from the operation section 330, instructs the data transfer controller 340 to transfer data in the following manner.

As illustrated in FIG. 34, the continuous transfer instruction section 333 instructs to transfer the sub-band synthesis filter data for the first channel stored in the memory area 321A in the second memory section 320 to the memory area 311A in the first memory section 310.

Thus, the data transfer controller 340 transfers the sub-band signal data for the first channel from the memory area 321A to the memory area 311A. When the data transfer is completed, the data transfer controller 340 notifies the operation section 330 of the completion of the transfer.

The operation section 330 further requests the continuous transfer instruction section 333 to perform data transfer, while making the sub-band signal addition/subtraction section 335 start the addition/subtraction operation of the first, second and fourth channels of sub-band signals. Thus, the sub-band synthesis filter data for the first channel is transferred from the memory area 321A to the memory area 311A while the addition/subtraction operation of the first, second and fourth channels of sub-band signals is performed in parallel.

Figure 35:
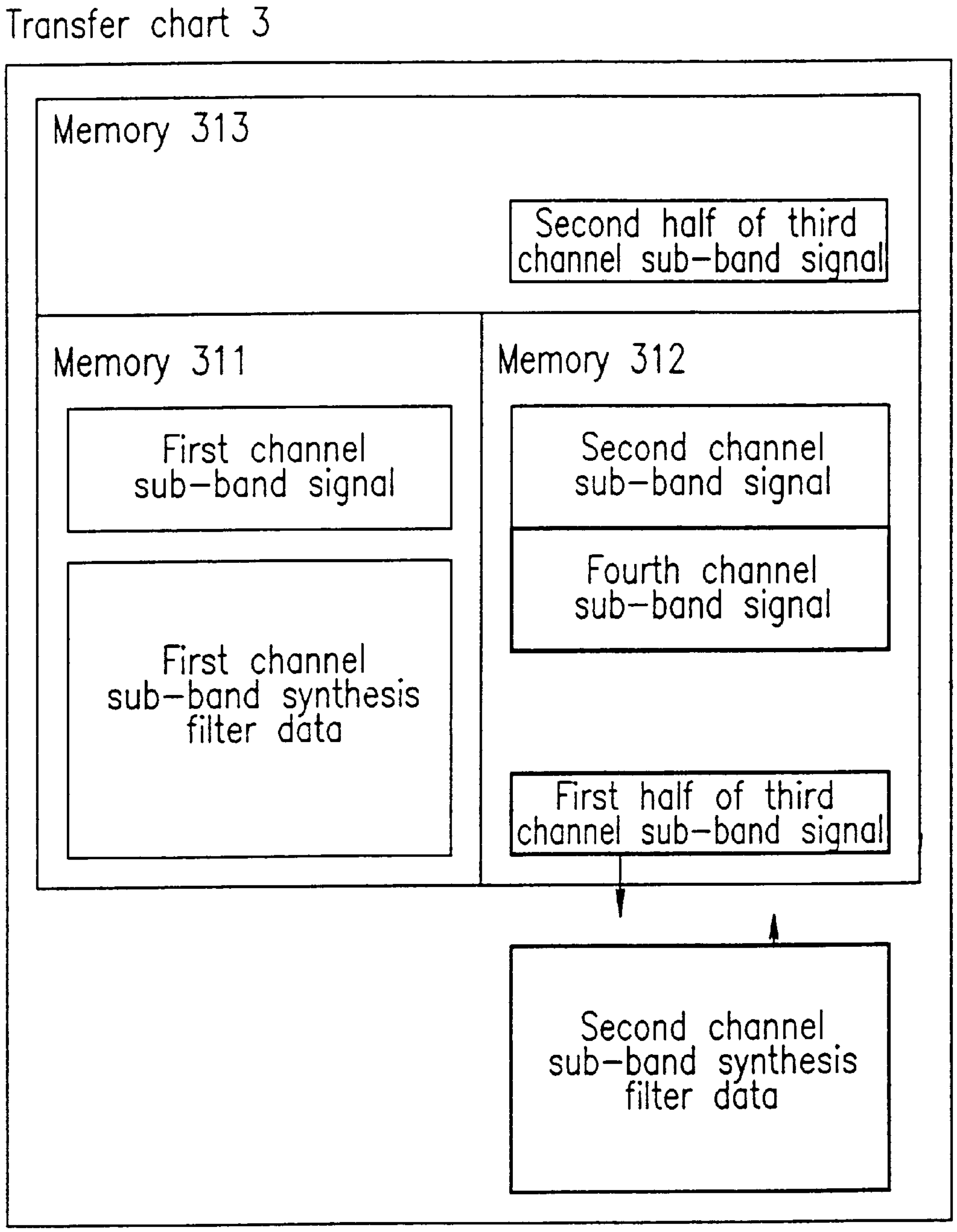
FIG. 35 is a timing chart (No. 3) for data transmission in the audio decoding device according to Example 6 of the present invention.

Transfer chart 3 of FIG. 35 illustrates data transfer in the synthesis operation for the first channel of sub-band signals. When the operation section 330 is notified of the completion of transfer after the completion of the addition/subtraction operation of the first, second and fourth channels of sub-band signals, the operation section 330 requests the continuous transfer instruction section 333 to transfer data in the following manner.

As illustrated in FIG. 35, operation section 330 instructs to transfer the sub-band signals for the second and fourth channels and the first half of the sub-band signals for the third channel stored in the memory area 321A respectively to the memory areas 323B, 324B and 325B in the second memory section 320. Then, operation section 330 instructs to transfer the sub-band synthesis filter data for the second channel stored in the memory area 322A to the memory area 312A.

In parallel with this, the operation section 330 starts the sub-band synthesis filter operation of the first channel by the sub-band synthesis section 332 using the data in the first memory area 311.

Figure 36:
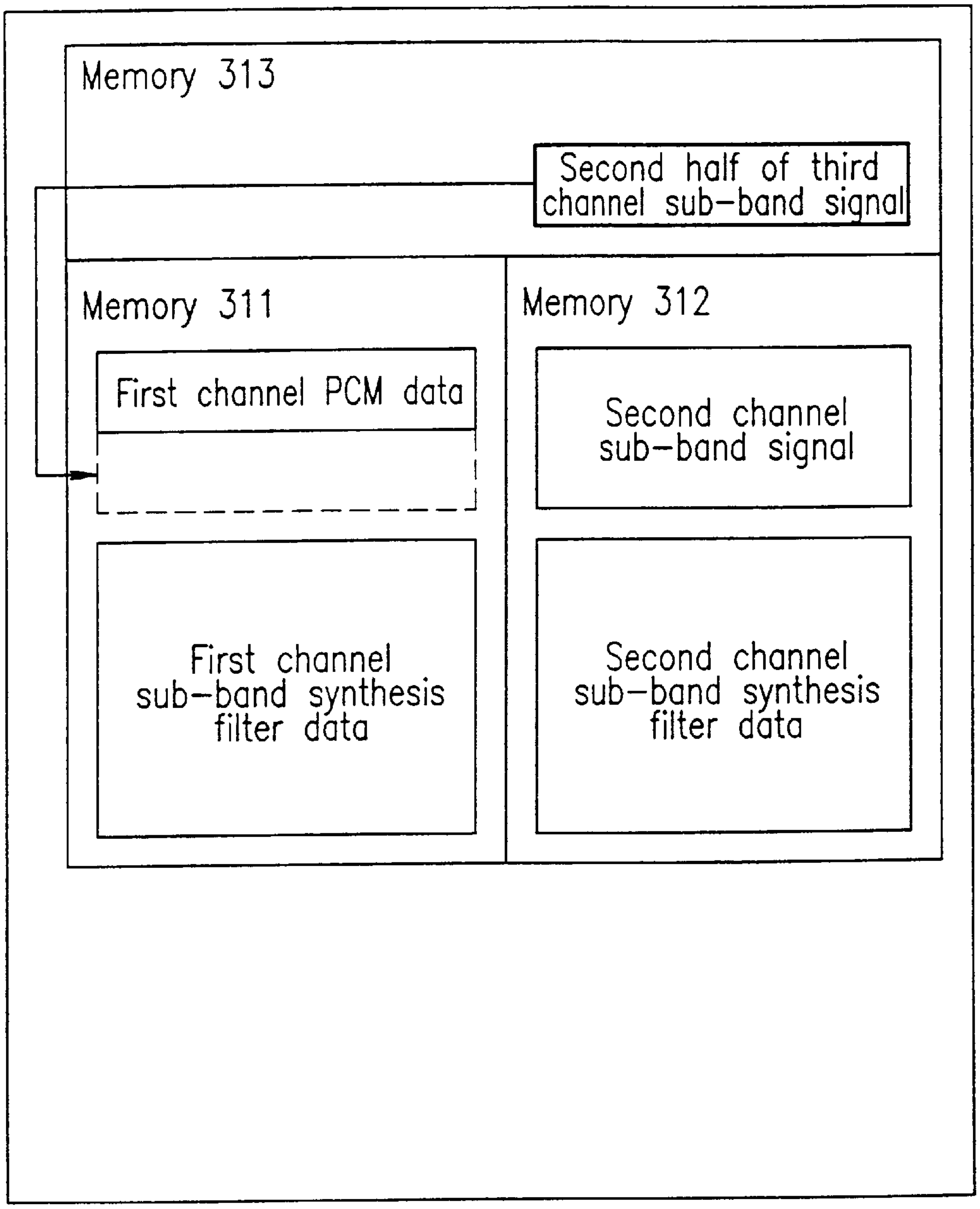
FIG. 36 is a timing chart (No. 4) for data transmission in the audio decoding device according to Example 6 of the present invention.

Transfer chart 4 of FIG. 36 illustrates data transfer of the second half of the sub-band signals for the third channel within the first memory section 310. After the completion of the sub-band synthesis operation for the first channel, the operation section 330 instructs the sub-band signal transfer section 336 to transfer the second half data of the sub-band signals for the third channel stored in the memory area 313C in the first memory section 310 to the second half of the memory area 311B. The first channel PCM data decoded in the sub-band synthesis operation for the first channel in the data area 311B and the second half of the third channel sub-band signals are located so as not to overlap each other.

Figure 37:
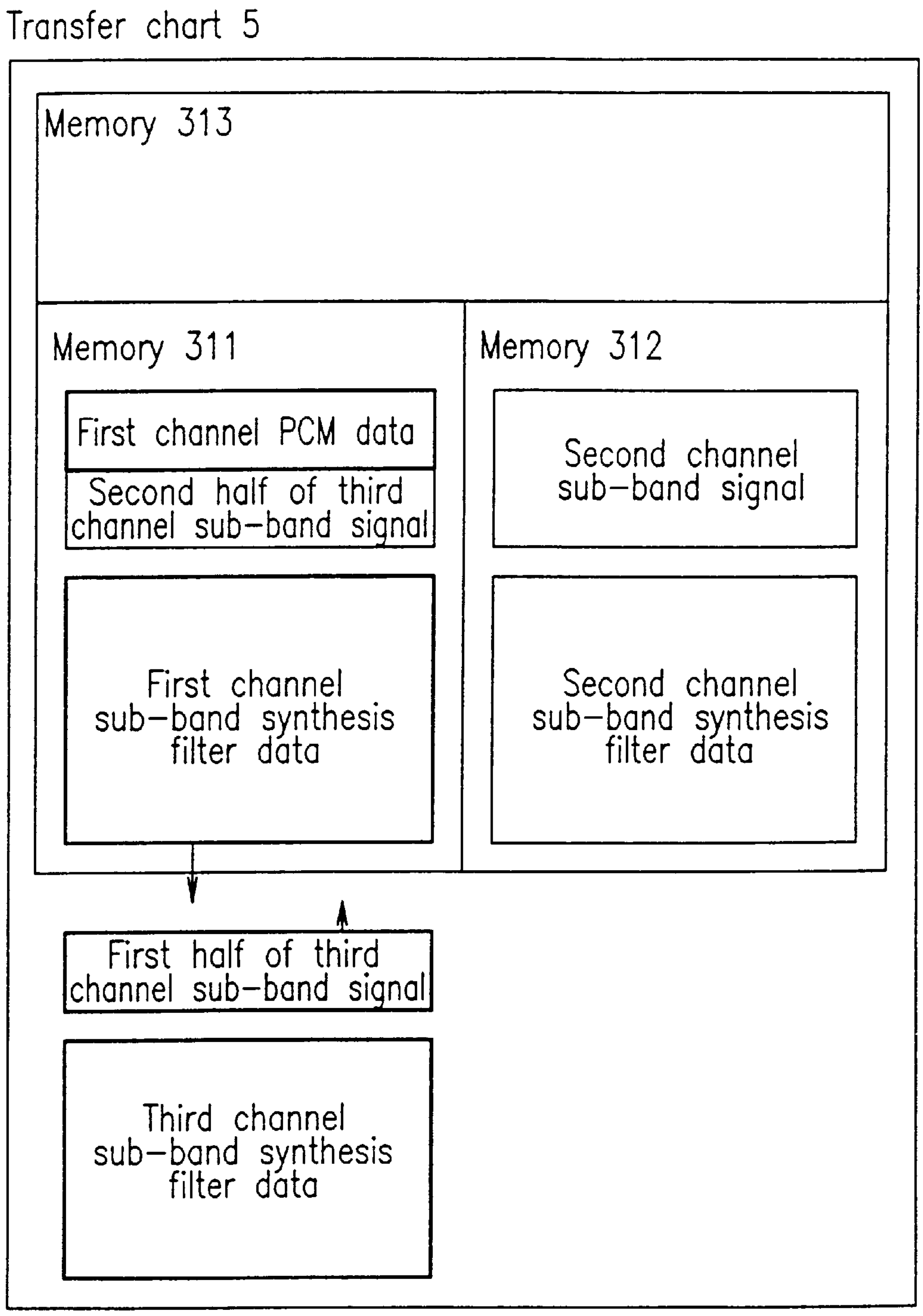
FIG. 37 is a timing chart (No. 5) for data transmission in the audio decoding device according to Example 6 of the present invention.

Transfer chart 5 of FIG. 37 illustrates data transfer in the sub-band synthesis operation for the second channel. The data transfer controller 340 performs data transfer while the operation section 330 performs the sub-band synthesis filter operation and, when the transfer is completed, notifies the operation section 330 of the completion of the transfer.

When both the data transfer and the sub-band synthesis filter operation for the first channel are completed, the continuous transfer instruction section 333 instructs the data transfer controller 340 to transfer data in the following manner based on the request from the operation section 330.

As illustrated in FIG. 37, the continuous transfer instruction section 333 instructs to transfer the sub-band synthesis filter data for the first channel stored in the memory area 311A in the first memory section 310 to the memory area 321A in the second memory section 320.

Next, the continuous transfer instruction section 333 instructs the PCM data transfer instruction section 333A to transfer the PCM data for the first channel stored in the memory area 311B in the first memory section 310 to the memory area 321C in the second memory section 320.

Moreover, the continuous transfer instruction section 333 instructs to transfer the sub-band synthesis filter data for the third channel stored in the memory area 323A in the second memory section 320 to the memory area 311A in the first memory section 310. The continuous transfer instruction section 333 also instructs to transfer the first half of the sub-band signals for the third channel stored in the memory area 323B in the second memory section 320 to the first half of the memory area 311B in the first memory section 310.

The first half of the sub-band signals for the third channel which is transferred to the memory area 311B is located to be consecutive and not to overlap with the second half of the sub-band signals for the third channel, which have already been transferred and located. Then, the sub-band synthesis section 332 starts the sub-band synthesis filter operation for the second channel using the data in the second memory area 312.

At this stage, the sub-band synthesis filter operation for the second channel is performed in the same manner as that for the first channel using the second memory area 312. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 38:
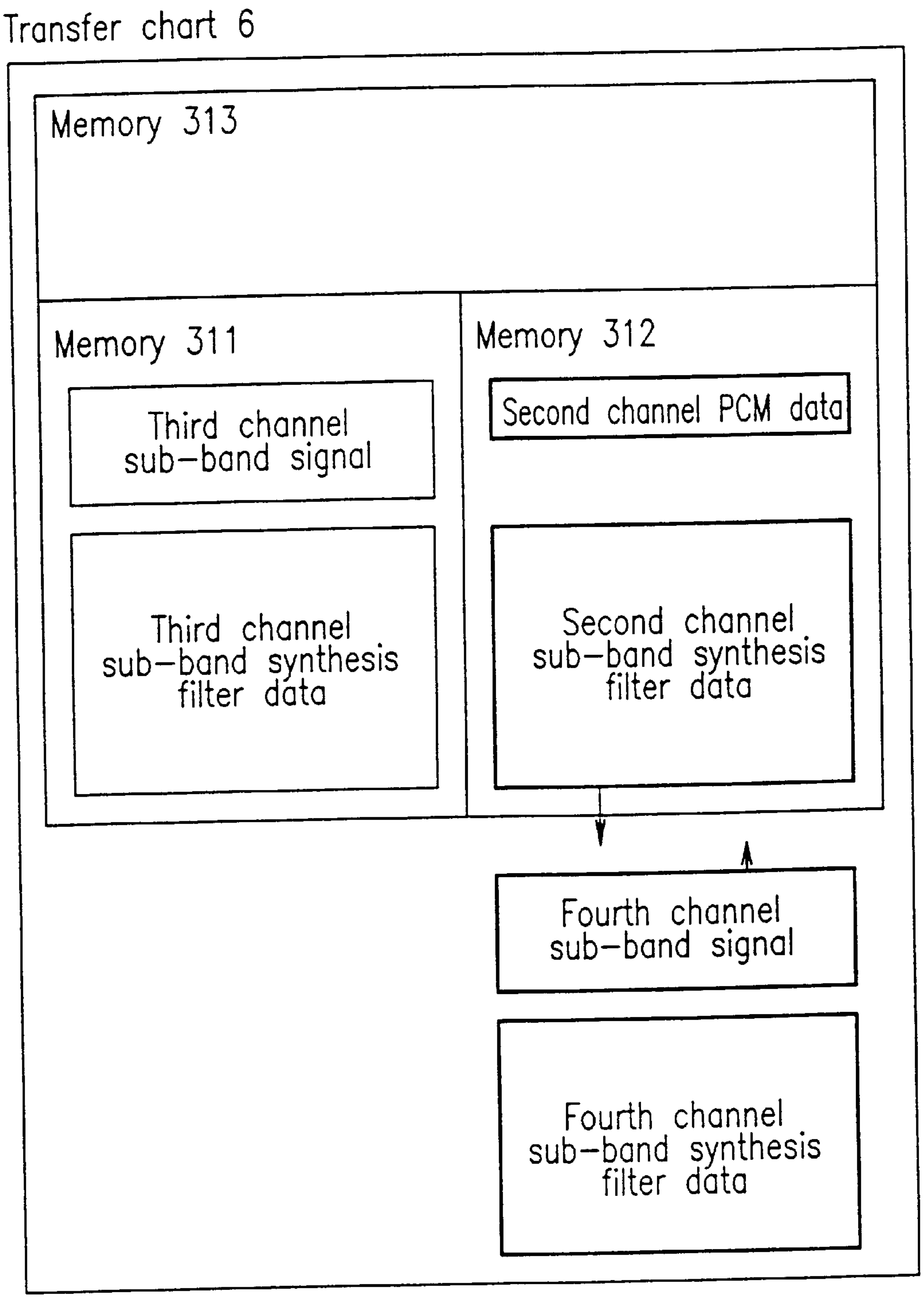
FIG. 38 is a timing chart (No. 6) for data transmission in the audio decoding device according to Example 6 of the present invention.

Transfer chart 6 of FIG. 38 illustrates data transfer in the sub-band synthesis operation for the third channel. When both the data transfer and the sub-band synthesis filter operation for the second channel are completed, the operation section 330 requests the continuous transfer instruction section 333 to transfer data in the following manner.

As shown in transfer chart 6 (FIG. 38), the continuous transfer instruction section 333 instructs to transfer the sub-band synthesis filter data for the second channel stored in the memory area 312A in the first memory section 310 to the memory area 322A in the second memory section 320.

Next, the continuous transfer instruction section 333 instructs the PCM data transfer instruction section 333A to transfer the PCM data for the second channel stored in the memory area 312B in the first memory section 310 to the memory area 322C in the second memory section 320.

Moreover, the continuous transfer instruction section 333 instructs to transfer the sub-band synthesis filter data for the fourth channel stored in the memory area 324A in the second memory section 320 to the memory area 312A in the first memory section 310.

Then, the continuous transfer instruction section 333 instructs to transfer the sub-band signals for the fourth channel stored in the memory areas 324B to the memory area 312B in the first memory section 310.

In parallel with the above transfer operation, the sub-band synthesis section 332 starts the sub-band synthesis filter operation for the third channel using the data in the memory area 311.

At this stage, the sub-band synthesis filter operation for the third channel is performed in the same manner as that for the first or second channel using the memory area 311. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 39:
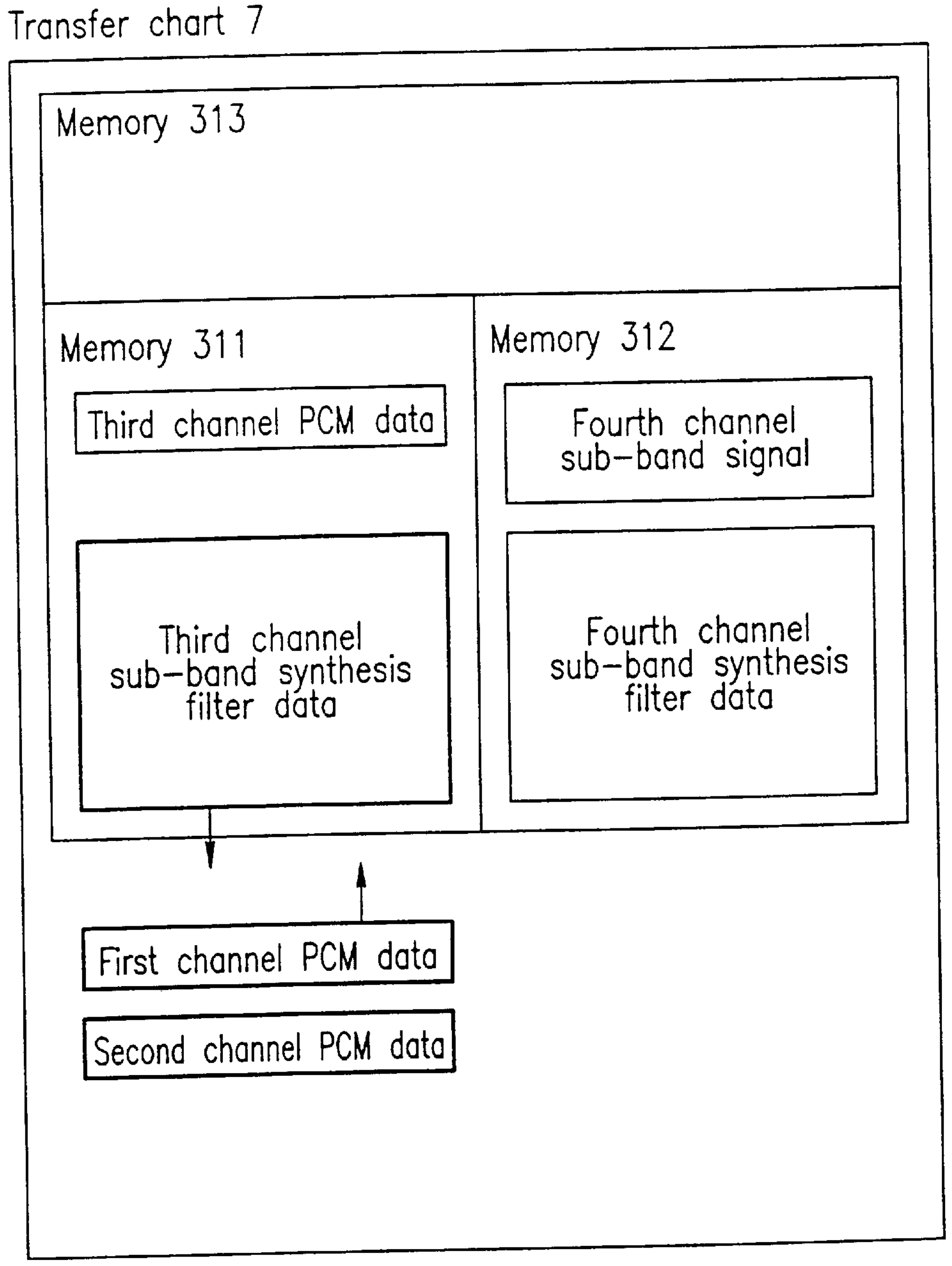
FIG. 39 is a timing chart (No. 7) for data transmission in the audio decoding device according to Example 6 of the present invention.

Transfer chart 7 of FIG. 39 illustrates data transfer in the sub-band synthesis operation for the fourth channel. When both the data transfer and the sub-band synthesis filter operation for the third channel are completed, the operation section 330 requests the continuous transfer instruction section 333 to transfer data in the following manner.

As shown in transfer chart 7 (FIG. 39), the continuous transfer instruction section 333 instructs to transfer the sub-band synthesis filter data for the third channel stored in the memory area 311A in the first memory section 310 to the memory area 323A in the second memory section 320.

Next, the continuous transfer instruction section 333 instructs a data transform operation, by the PCM data transfer instruction section 333A and the PCM data storage area selection section 333B, of the PCM data for the first and second channels from the memory areas 321C and 322C in the second memory section 320 to the first memory section 310.

In the present example, since the number of channels to be decoded by the sub-band synthesis operation is even, the PCM data storage area selection section 333B selects an area in the memory area 311 subsequent to the storage area for the third channel PCM data.

In parallel with the above transfer operation, the sub-band synthesis section 332 starts the sub-band synthesis filter operation for the fourth channel using the data in the memory area 312.

At this stage, the sub-band synthesis filter operation for the fourth channel is performed in the same manner as that for the first, second, or third channel using the memory area 311. The data transfer controller 340 performs data transfer while the sub-band synthesis section 332 performs the sub-band synthesis filter operation. When the transfer is completed, the data transfer controller 340 notifies the operation section 330 of the completion of the data transfer.

Figure 40:
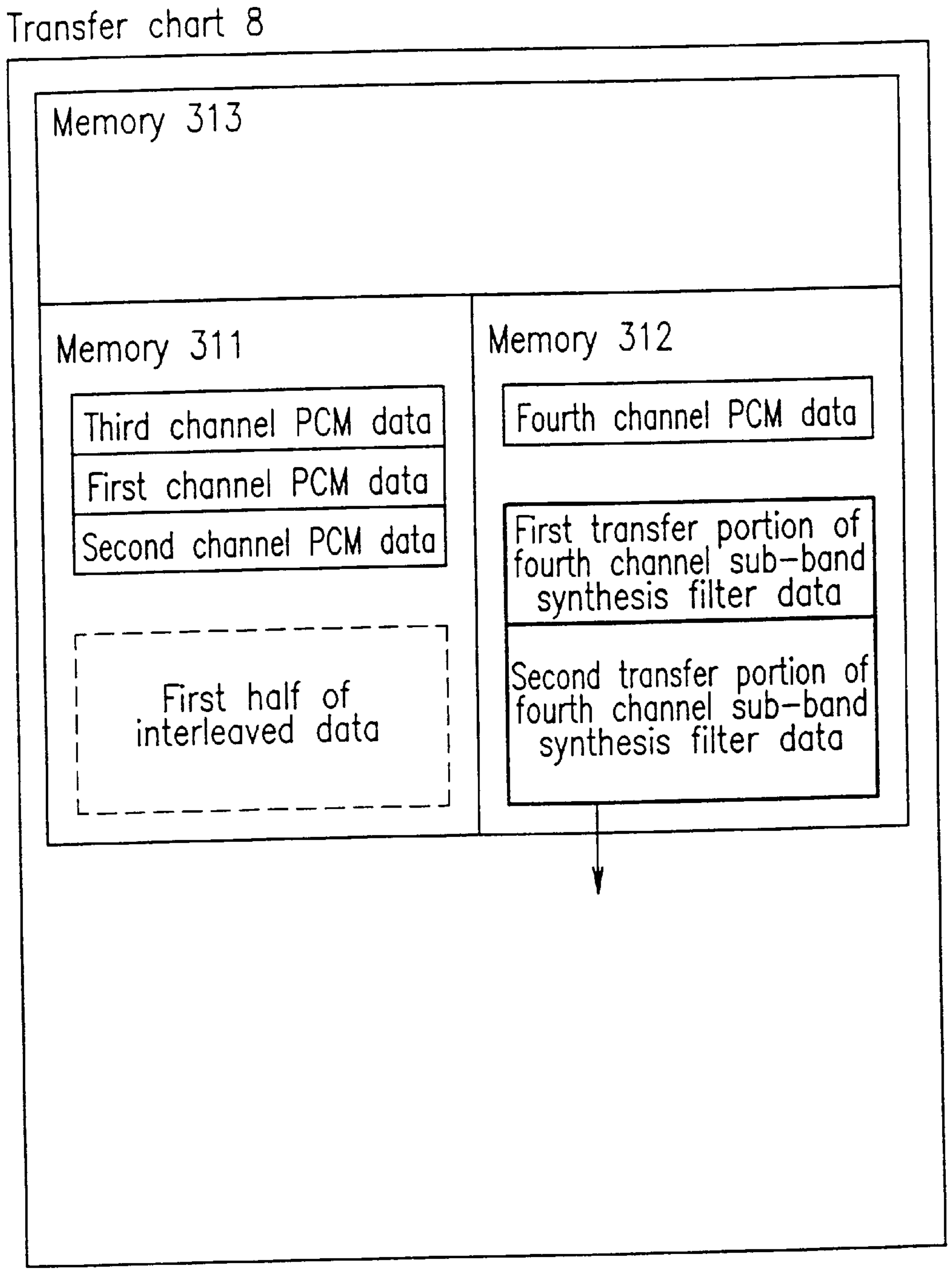
FIG. 40 is a timing chart (No. 8) for data transmission in the audio decoding device according to Example 6 of the present invention.

Transfer chart 8 of FIG. 40 illustrates data transfer in the first half of the interleave operation. When both the data transfer and the sub-band synthesis filter operation for the fourth channel are completed, the operation section 330 requests the continuous transfer instruction section 333 to transfer data in the following manner.

As shown in transfer chart 8 (FIG. 40), the continuous transfer instruction section 333 instructs to transfer the sub-band synthesis filter data for the fourth channel stored in the memory area 312A in the first memory section 310 to the memory area 324A in the second memory section 320.

The data transfer of the sub-band synthesis filter data for the fourth channel is performed, as that for the first, second or third channel, while dividing the data area indicated by 222-6 (FIG. 9) into A1 including the data areas 206 through 201 and 216 through 213 and A2 including the data areas 212 through 207, and the data in one of them is first transferred and the data in the other is then transferred.

The fourth channel is the final channel for the sub-band synthesis operation, and the sub-band synthesis filter data for the final channel is transferred in two steps. The completion of the transfer of the first transfer portion illustrated in FIG. 29 is detected by the specific data transfer completion detection indication section 333C, and the data transfer controller 340 is requested to perform a data transfer operation.

In parallel with the above transfer operation, the interleave section 337 starts an interleave operation with the PCM data for the first, second and third channels stored in the memory area 311 and the PCM data for the fourth channel stored in the memory area 312.

In the present example, the interleave operation by the interleave section 337 is divided into two steps by the interleave division section 337A. In particular, the first half of the interleave operation is performed with the first 96 samples (i.e., the first half) of the 192 samples of the PCM data for each channel, and then the second half of the interleave operation is performed with the latter 96 samples (i.e., the second half) thereof.

The interleave operation illustrated in transfer chart 8 (FIG. 40) corresponds to the first half of the divided interleave operation. Since the number of channels to be decoded by the sub-band synthesis operation is even in the present example, the interleave storage area selection section 337B selects an area in the memory area 311 subsequent to the PCM data storage area as the storage area for the first half of the interleaved data.

The data transfer controller 340 performs data transfer while the interleave section 337 performs the first half of the interleave operation. When the first transfer portion of the sub-band synthesis filter data for the fourth channel has been transferred, the specific data transfer completion detection transmission section 341 detects the completion of the transfer of the first transfer portion of the sub-band synthesis filter data for the fourth channel. Then, after the section 341 transmits a signal indicating the detection of the completion to the operation section 330, a data transfer operation for the second transfer portion of the sub-band synthesis filter data for the fourth channel is started.

Figure 41:
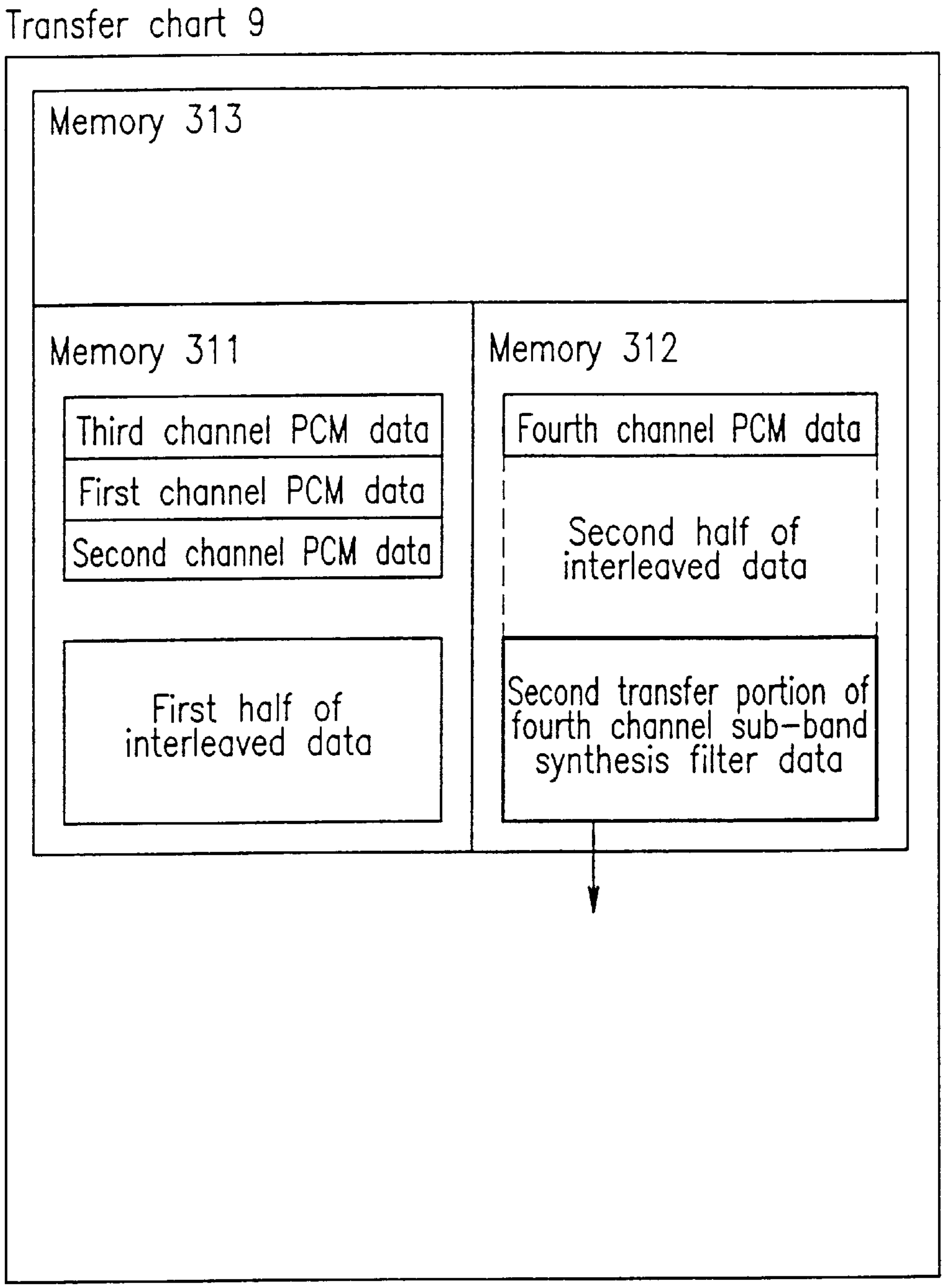
FIG. 41 is a timing chart (No. 9) for data transmission in the audio decoding device according to Example 6 of the present invention.

Transfer chart 9 of FIG. 41 illustrates data transfer in the second half of the interleave operation. The operation section 330 detects completion of the first half of the interleave operation by the interleave section 337 and the completion of the transfer of the first transfer portion of the sub-band synthesis filter data for the fourth channel by the specific data transfer completion detection section 338. Then, the operation section 330 resumes the interleave operation by the interleave section 337.

The interleave operation illustrated in transfer chart 9 (FIG. 41) corresponds to the second half of the divided interleave operation. Since the number of channels to be decoded by the sub-band synthesis operation is even in the present example, the interleave storage area selection section 337B selects an area in the memory area 312 subsequent to the fourth channel PCM data storage area as the storage area for the second half of the interleaved data.

Figure 42:
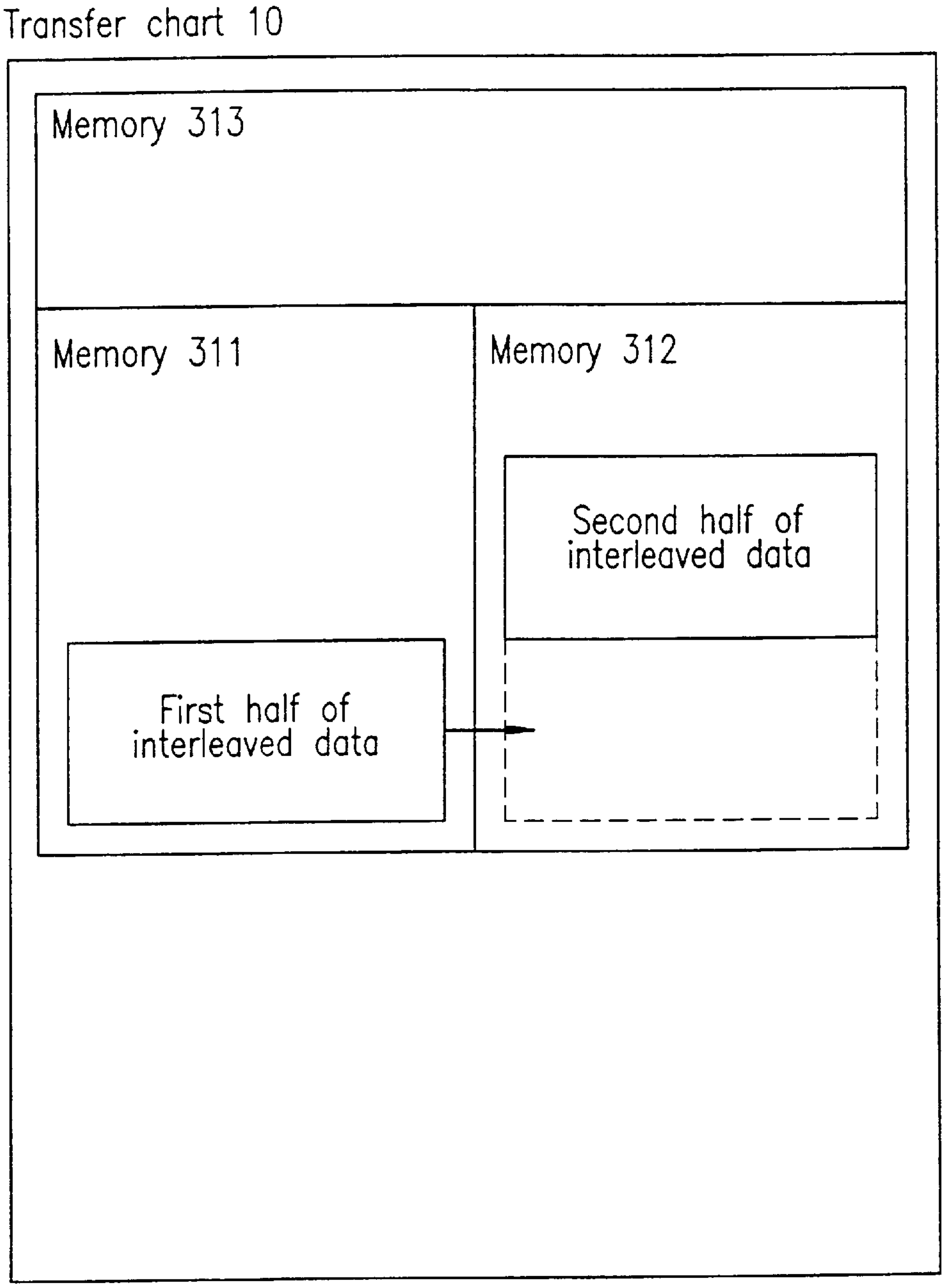
FIG. 42 is a timing chart (No. 10) for data transmission in the audio decoding device according to Example 6 of the present invention.

Transfer chart 10 of FIG. 42 illustrates data transfer for finishing the second half of the interleave operation. When the data transfer and the second half of the interleave operation by the interleave section 337 are completed, the operation section 330 transfers the first half of the interleaved data stored in the memory area 311 in the first memory section 310 to the memory area 312, as illustrated in FIG. 42.

Figure 43:
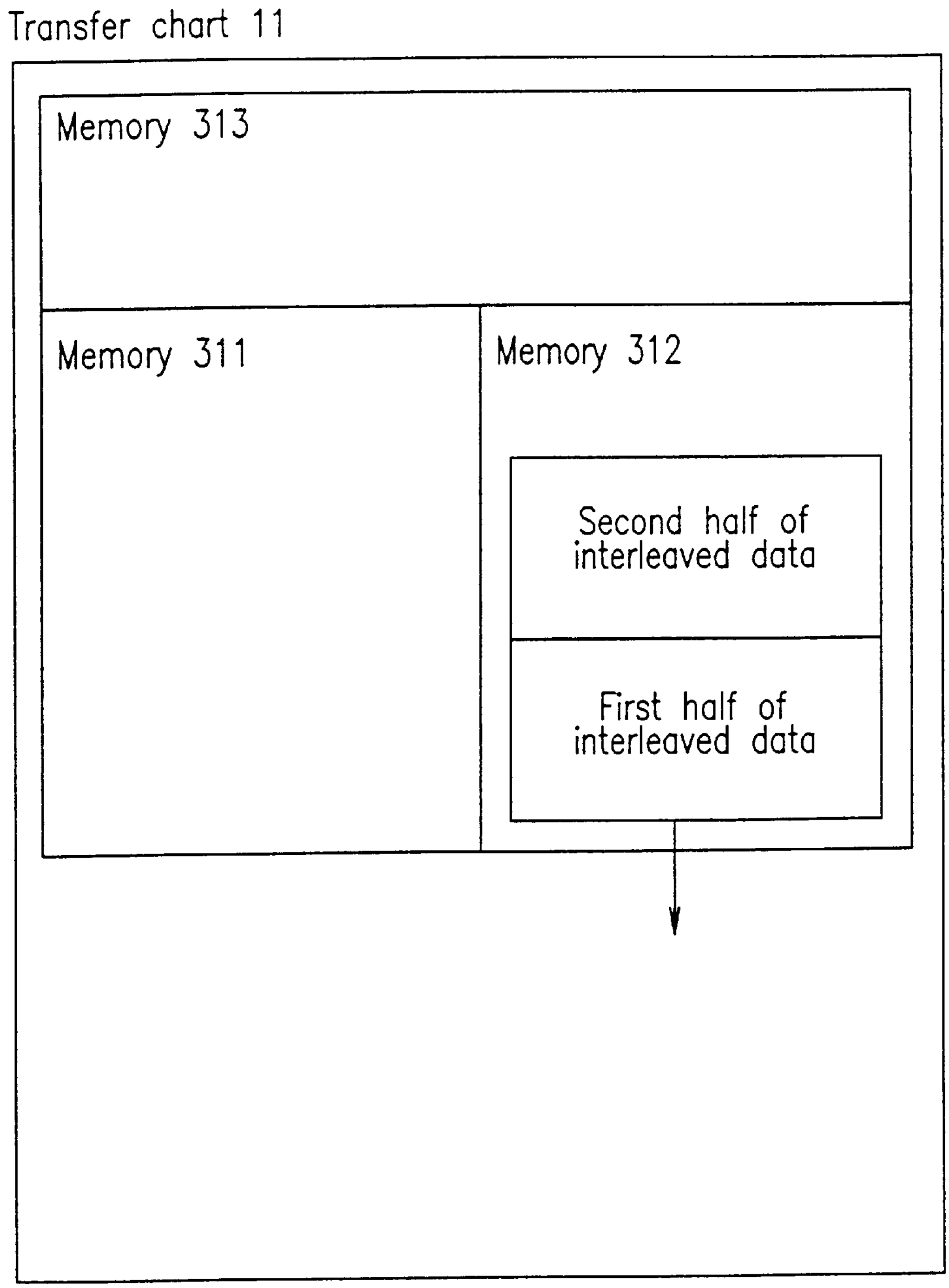
FIG. 43 is a timing chart (No. 11) for data transmission in the audio decoding device according to Example 6 of the present invention.
Figure 44:
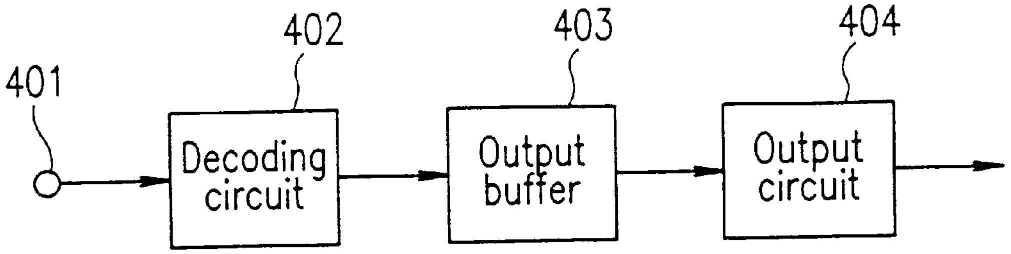
FIG. 44 is a block diagram illustrating an exemplary configuration of a conventional compressed code decoding device.
Figure 45:
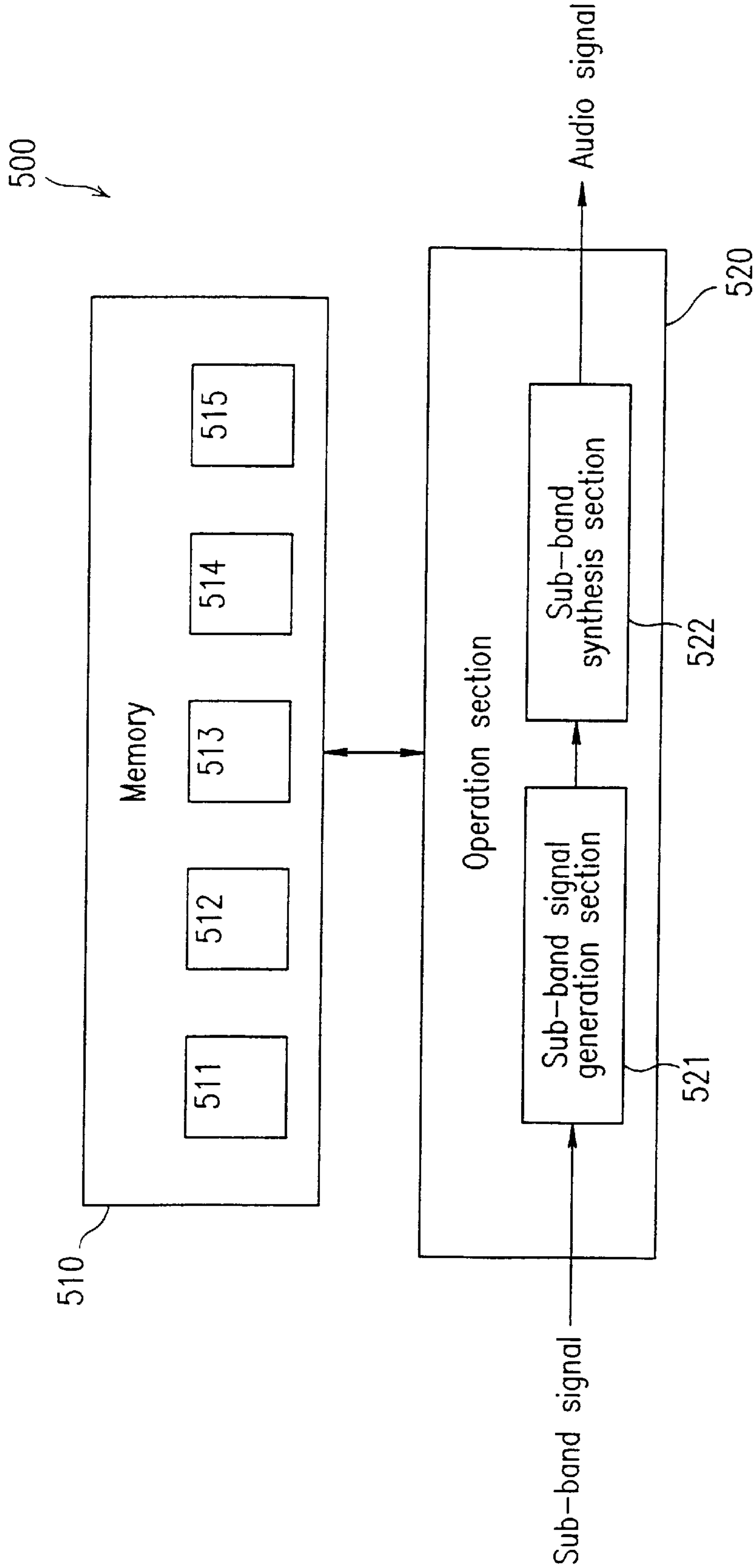
FIG. 45 PRIOR ART
FIG. 45 is a block diagram illustrating an exemplary configuration of a conventional audio decoding device.

Transfer chart 11 of FIG. 43 illustrates data transfer of the interleaved data within the first memory section 310. When the second half of the interleaved data has been transferred to the memory area 312, the operation section 330 requests the continuous transfer instruction section 333 to transfer data in the following manner.

As illustrated in FIG. 43, the continuous transfer instruction section 333 instructs to transfer the interleaved data stored in the memory area 312 in the first memory section 310 to the memory area 326 in the second memory section 320.

The data transfer of the interleaved data is performed in two steps (i.e., the first and second halves). One of the first and second halves of the interleaved data is first transferred and the other half thereof is then transferred. The first half of the interleaved data is stored in the first half of the memory area 326 in the second memory section 320 while the second half of the interleaved data is stored in the second half of the memory area 326 in the second memory section 320.

Thereafter, the four channels of decoded PCM audio signals are simultaneously output.

The decoding devices of Examples 5 and 6 each use a DRAM, which is less expensive than an SRAM, as the second memory section 320. Data for all of the channels is stored in the second memory section 320, and the data therein can be transferred to the first memory section 310 using the data transfer controller 340 as necessary. Thus, it is possible to reproduce multiple channels of encoded audio signals at a high speed without increasing the size of the internal memory provided in the processor. Moreover, an externally-provided SRAM can be eliminated, thereby reducing the cost of the device.

Moreover, each of the decoding devices of Examples 5 and 6 allows for the sub-band synthesis filter operation to be performed in parallel with the data transfer, and thus the time period required for the operation processing can be shortened by the time period required for the data transfer. Since an amount of data corresponding to a plurality of transfer operations can be transferred by a single transfer operation, the circulating address processing and the shift processing of the sub-band synthesis filter data are not required in the sub-band synthesis operation, where a virtual address allocation section is used.

Furthermore, in each of the decoding devices of Examples 5 and 6, the k'th channel of sub-band signals is temporarily transferred to the first memory section 310, whereby the time period required for the data transfer is reduced.

Furthermore, in each of the decoding devices of Examples 5 and 6, the addition/subtraction operation of the sub-band signals is performed in parallel with the data transfer of the sub-band synthesis filter data for the i'th channel from the second memory section 320 to the first memory section 310, thereby reducing the waiting time for the data transfer.

Furthermore, in each of the decoding devices of Examples 5 and 6, the addition/subtraction operations of the sub-band signals for the i'th, j'th, l'th and m'th channels are performed in parallel with the data transfer of the sub-band synthesis filter data for the i'th channel from the second memory section 320 to the first memory section 310, thereby reducing the waiting time for the data transfer.

Furthermore, in each of the decoding devices of Examples 5 and 6, after the sub-band synthesis operation for the final channel has been completed, the interleave operation is performed by the interleave section in parallel with the transfer of the sub-band synthesis filter data from the first memory section to the second memory section, thereby reducing the waiting time for the data transfer.

Furthermore, each of the decoding devices of Examples 5 and 6 includes the interleave division section for dividing the interleave operation into r steps (r=2 in the above examples). Therefore, since the interleave operation can be divided into a plurality of steps, it is not necessary to provide successive memory areas for storing the interleaved data. The required memory size of the first memory section is accordingly reduced, thereby reducing the cost of the device. Moreover, such division of the interleave operation reduces the consecutive amount of time required for one operation step, thereby facilitating the scheduling of operations to be performed in parallel with the data transfer operations.

Furthermore, in each of the decoding devices of Examples 5 and 6, a particular data transfer operation in a series of data transfer operations can be detected, thereby, with the use of the divided interleave operation, allowing for highly-efficient signal process scheduling.

Furthermore, each of the decoding devices of Examples 5 and 6 includes the PCM data transfer instruction section for temporarily moving the PCM data to the second memory section in parallel with the sub-band synthesis operation. Thus, it is only necessary to ensure a storage area for storing PCM data for all channels, which is needed for an interleave operation, from a time in the sub-band synthesis operation for the final channel to the time of interleave operation. After the sub-band synthesis filter data for the previous channel has been transferred to the second memory section, the areas in the first memory section, in which some of the sub-band signals and the sub-band synthesis filter data for the previous channel have been stored, may be assigned for the PCM data which has been transferred to and temporarily stored in the second memory section. Therefore, it is not necessary to provide a special memory area for PCM data in the first memory section, thereby accordingly reducing the size of the first memory section.

Furthermore, each of the decoding devices of Examples 5 and 6 includes the PCM data storage area selection section. Therefore, when the PCM data necessary for the interleave operation is transferred from the second memory section 320 to the first memory section 310, the data transfer can be performed in parallel with the sub-band synthesis operation for the final channel, regardless of whether the number of channels to be decoded by the sub-band synthesis operation is odd or even. Thus, the amount of calculation required can be accordingly reduced.

Furthermore, each of the decoding devices of Examples 5 and 6 includes the interleave storage area selection section, which makes it possible to start the interleave operation using a memory area which does not overlap with the data transfer area used for the sub-band synthesis operation for the final channel, regardless of whether the number of channels to be decoded by the sub-band synthesis operation is odd or even. Thus, the interleave operation can be performed in parallel with a data transfer operation.

Furthermore, each of the decoding devices of Examples 5 and 6 includes the division decoding section for dividing one frame into six portions for a decoding operation, whereby only a memory area corresponding to 1/6 frame is required for the sub-band signals for each channel. Thus, the memory size of the first memory section is accordingly reduced.

In Examples 5 and 6, for simplicity of the description, the number of channels for input signals is assumed to be five and four, respectively. However, the number of channels is not limited to any specific value.

Moreover, in each of the decoding devices of Examples 5 and 6, for simplicity of the description, the number of steps into which the interleave operation is divided by the interleave division section is assumed to be 2. However, the interleave operation can be divided into three or more steps, or it does not necessarily have to be equally divided.

Furthermore, in each of the decoding devices of Examples 5 and 6, for simplicity of the description, the memory areas 312 and 313 are assumedly used as the destination to which the sub-band signals are transferred by the sub-band signal transfer section. However, the destination is not limited to the above. Moreover, the number and data size of divisions of the sub-band signals for transfer operations are not limited to the above.

In each of the decoding devices of Examples 5 and 6, when the number of channels to be decoded by the sub-band synthesis operation is even, the first memory area 311 is selected for storing the first half of the interleaved data while the second memory area 312 is selected for storing the second half of the interleaved data. When the number of channels to be decoded by the sub-band synthesis operation is odd, the second memory area 312 is selected for storing the first half of the interleaved data while the first memory area 311 is selected for storing the second half of the interleaved data. However, such a selection is not limited thereto and can be changed depending upon the operation and data transfer schedules.

Furthermore, in each of the decoding devices of Examples 5 and 6, for simplicity of the description, it is assumed that the PCM data storage area selection section 333B selects the first memory area 311 when the number of channels to be decoded by the sub-band synthesis operation is even, while it selects the second memory area 312 when the number of channels to be decoded is odd. However, such a selection is not limited thereto and can be changed depending upon the operation and data transfer schedules.

The above-described compressed code decoding devices of Examples 4 to 6 provide the following effects.

It is possible to reduce the required capacity of the high-speed access memory. Thus, the cost of the decoding device can be accordingly reduced from that of the conventional device.

The sub-band synthesis filter operation can be performed in parallel with a data transfer operation. Thus, the amount of time required for data transfer operations is substantially eliminated, thereby considerably reducing the processing time.

A plurality of data transfer operations can be instructed with a single issuance of instruction, whereby it is possible to divide the data to be transferred using a predetermined address and then to transfer the divided data one after another. Thus, it is possible to reduce the amount of time required for the circulating address processing. Moreover, since it is possible to perform a multiple data transfer operations, it is easier to schedule data transfer operations in accordance with the amount of time required for generating output data. For example, while a plurality of data transfer operations are performed in parallel with the sub-band synthesis operation, it is not necessary to discontinue the sub-band synthesis operation, to wait for or confirm completion of the data transfer, or to issue a transfer instruction. Thus, time loss caused by the data transfer can be reduced, thereby also the entire processing time.

Since the virtual address allocation section is provided, the operations required for circulating address processing are eliminated, thereby reducing the entire processing time.

The sub-band signal transfer section is provided for temporarily transferring the sub-band signals for the third channel to the first memory section, thereby reducing the amount of data transfer required. Accordingly, the amount of time required for data transfer is reduced, thus reducing the amount of calculation required.

The sub-band signal transfer section is provided independently of the sub-band synthesis section. Therefore, the sub-band signal addition/subtraction operation is performed in parallel with the first data transfer operation conducted for the sub-band synthesis filter data from the second memory section to the first memory section after the input encoded audio data is encoded into sub-band signals for different sub-bands. Thus, the waiting time for data transfer is reduced, thereby accordingly reducing the amount of computation required.

The interleave section is provided for performing the interleave operation in parallel with the transfer operation conducted for the sub-band synthesis filter data from the first memory section to the second memory section after the sub-band synthesis operation for the final channel has been completed. Thus, the waiting time for data transfer is reduced, thereby accordingly reducing the amount of computation required.

Since the interleave division section is provided for dividing the interleave operation, it is not necessary to provide successive memory areas for storing the interleaved data. Thus, the required memory size of the first memory section is accordingly reduced, thereby reducing the cost of the device. Moreover, such division of the interleave operation reduces the consecutive amount of time required for one operation step, thereby facilitating the scheduling of operations to be performed in parallel with the data transfer operations.

A particular data transfer operation in a series of data transfer operations can be detected, thereby, with the use of the divided interleave operation, allowing for highly-efficient signal process scheduling.

Since the interleave storage area selection section is provided, it is possible to start the interleave operation using a memory area which does not overlap with the data transfer area used for the sub-band synthesis operation for the final channel, regardless of whether the number of channels to be decoded by the sub-band synthesis operation is odd or even. Thus, the interleave operation can be performed in parallel with a data transfer operation, thereby accordingly reducing the amount of calculation required.

The PCM data transfer instruction section for temporarily moving the PCM data to the second memory section in parallel with the sub-band synthesis operation. Thus, it is only necessary to ensure a storage area for storing PCM data for all channels, which is needed for an interleave operation, from a time in the sub-band synthesis operation for the final channel to the time of interleave operation. After the sub-band synthesis filter data for the previous channel has been transferred to the second memory section, the areas in the first memory section, in which some of the sub-band signals and the sub-band synthesis filter data for the previous channel have been stored, may be assigned for the PCM data which has been transferred to and temporarily stored in the second memory section. Therefore, it is not necessary to provide a special memory area for PCM data in the first memory section, thereby accordingly reducing the size of the first memory section.

Since the PCM data storage area selection section is provided, when the PCM data necessary for the interleave operation is transferred from the second memory section to the first memory section, the data transfer can be performed in parallel with the sub-band synthesis operation for the final channel, regardless of whether the number of channels to be decoded by the sub-band synthesis operation is odd or even. Thus, the amount of calculation required can be accordingly reduced.

Since the division decoding section is provided, the memory areas required for the sub-band signals for the respective channels can be reduced, thereby accordingly reducing the memory size of the first memory section.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A compressed code decoding device, comprising:

a decoding section for receiving a plurality of groups of blocks of compressed codes and decoding each of the blocks of compressed codes;

a buffer section for storing decoded signals decoded by the decoding section;

a reproduction time acquisition section for acquiring a reproduction time at which to reproduce a predetermined one of the blocks;

an output section for externally outputting the decoded signals stored in the buffer section;

a detection section for detecting that the predetermined block of compressed codes has been decoded and output via the output section;

an addition section for, at a time when the detection section detects that the predetermined block has been output, adding a time required for reproducing the predetermined block to the reproduction time acquired by the reproduction time acquisition section so as to produce a synchronization time;

a synchronization section for comparing the synchronization time produced by the addition section and a current time so as to determine whether the synchronization time is ahead of or behind the current time;

a code discarding section for, if the synchronization section determines that the synchronization time is ahead of the current time, discarding either compressed codes of one of the blocks next to the predetermined block or compressed codes of one of the groups next to the group including the predetermined block; and a reproduction delay section for, if the synchronization section determines that the synchronization time is behind the current time, delaying output of either decoded signals of the compressed codes of one of the blocks next to the predetermined block or decoded signals of the compressed codes of one of the groups next to the group including the predetermined block.

2. A compressed code decoding device according to claim 1, wherein the synchronization section comprises a timer for timing a clock and compares the synchronization time with an output from the timer as the current time.

3. A compressed code decoding device according to claim 1, wherein the synchronization section compares the synchronization time with a video reproduction time as the current time, the video reproduction time being provided to a video signal which is reproduced in synchronization with the decoded signal.

4. A compressed code decoding device according to claim 1, wherein the synchronization section compares the synchronization time with a reference reproduction time as the current time, the reference reproduction time being provided to a code other than the decoded signal.

5. A compressed code decoding device according to claim 1, wherein, the synchronization section compares the synchronization time with the current time by determining whether the synchronization time is ahead of or behind the current time based on whether a value obtained by subtracting the current time from the synchronization time is greater than a predetermined threshold value.

6. A compressed code decoding device, comprising:

a decoding section for receiving a plurality of groups of blocks of compressed codes and decoding each of the blocks of compressed codes;

a buffer section for storing decoded signals decoded by the decoding section;

a reproduction time acquisition section for acquiring a reproduction time at which to reproduce a predetermined one of the blocks;

an output section for externally outputting the decoded signals stored in the buffer section;

a detection section for detecting that the predetermined block of compressed codes has been decoded and output via the output section;

a time setting section for externally setting a start time and a finish time of a gap provided between two outputs of decoded signals;

an addition section for, at a time when the detection section detects that the predetermined block has been output, adding a time required for reproducing the predetermined block to the reproduction time acquired by the reproduction time acquisition section so as to produce a first synchronization time;

a time detection section for determining whether the start time set by the time setting section is between the first synchronization time produced by the addition section and a second synchronization time, the second synchronization time being obtained by adding a time required for reproducing one block of compressed codes to the first synchronization time;

a gap-based reproduction delay section for delaying, if the start time is between the first synchronization time and the second synchronization time, until the finish time of the gap, output of either the compressed codes of the predetermined block or the compressed codes of one of the groups including the predetermined block.

7. A compressed code decoding device, comprising:

a decoding section for receiving a plurality of groups of blocks of compressed codes and decoding each of the blocks of compressed codes;

first and second memory sections for alternately storing blocks of the decoded signals from the decoding section;

an output section for externally outputting the decoded signals stored in the first and second memory sections;

a block detection section for detecting that each of the blocks of compressed codes has been decoded and externally output via the output section;

a state section for indicating whether a decoded signal being currently output by the output section is from the first memory section or from the second memory section;

a write control section for, at a time when the output of each of the blocks is detected by the block detection section, controlling a write operation of the block so that the block is written to one of the first memory section and the second memory section which is not indicated by the state section and alternately switching between read and write operations of the first and second memory sections.

8. A compressed code decoding device according to claim 7, wherein the write control section controls the write operation so that the decoded signals from a first and second ones of the blocks are respectively written to the first and second memory sections, while the decoded signals from a third one of the blocks are written to one of the first memory section and the second memory section which is not indicated by the state section.

* * * * *